(12) United States Patent
Shu et al.

(10) Patent No.: US 12,141,878 B2
(45) Date of Patent: Nov. 12, 2024

(54) METHOD AND APPARATUS FOR COLLECTING, DETECTING AND VISUALIZING FAKE NEWS

(71) Applicants: Kai Shu, Mesa, AZ (US); Deepak Mahudeswaran, Tempe, AZ (US); Huan Liu, Tempe, AZ (US)

(72) Inventors: Kai Shu, Mesa, AZ (US); Deepak Mahudeswaran, Tempe, AZ (US); Huan Liu, Tempe, AZ (US)

( * ) Notice: Subject to any disclaimer, the term of this patent is extended or adjusted under 35 U.S.C. 154(b) by 0 days.

(21) Appl. No.: 17/267,765

(22) PCT Filed: Sep. 23, 2019

(86) PCT No.: PCT/US2019/052495
§ 371 (c)(1),
(2) Date: Feb. 10, 2021

(87) PCT Pub. No.: WO2020/061578
PCT Pub. Date: Mar. 26, 2020

(65) Prior Publication Data
US 2021/0334908 A1 Oct. 28, 2021

Related U.S. Application Data

(60) Provisional application No. 62/734,945, filed on Sep. 21, 2018.

(51) Int. Cl.
*G06Q 50/00* (2024.01)
*G06Q 30/0201* (2023.01)

(52) U.S. Cl.
CPC ......... *G06Q 50/01* (2013.01); *G06Q 30/0201* (2013.01)

(58) Field of Classification Search
None
See application file for complete search history.

(56) References Cited

U.S. PATENT DOCUMENTS 9,378,200 B1  6/2016  Cohen et al.
9,544,381 B2  1/2017  Zafarani et al.
(Continued)

FOREIGN PATENT DOCUMENTS

WO  2020061578 A1  3/2020

OTHER PUBLICATIONS

Sha et al., Fake News Detection on Social Media: A Data Mining Perspective, Sep. 3, 2017, (Year: 2017).*
(Continued)

*Primary Examiner* — Allison M Robinson
(74) *Attorney, Agent, or Firm* — Shumaker & Sieffert, P.A.

(57) ABSTRACT

Detecting fake news involves receiving a plurality of allegedly real news stories and allegedly fake news stories from one or more websites, receiving a plurality of user posts to a social media platform relating to the plurality of allegedly real news stories and allegedly fake news stories; receiving a plurality of user engagements related to the plurality of user posts, receiving user profile information, and social media network information, for users creating the plurality of user posts to the social media platform, and users participating in the engagements related to the plurality of user posts, and classifying each of the received plurality of allegedly real news stories and allegedly fake news stories as one of a real news story and a fake news story based on the analyzed content and analyzed social media context.

18 Claims, 39 Drawing Sheets

(56) References Cited

U.S. PATENT DOCUMENTS

| | | | |
|---|---|---|---|
| 9,705,837 B2* | 7/2017 | Enoki | G06F 16/95 |
| 10,127,304 B1 | 11/2018 | Cohen et al. | |
| 10,534,983 B1 | 1/2020 | Tung et al. | |
| 10,628,467 B2 | 4/2020 | Bergs et al. | |
| 10,664,764 B2 | 5/2020 | Gundecha et al. | |
| 10,942,939 B2 | 3/2021 | Li et al. | |
| 11,157,574 B2* | 10/2021 | Li | H04L 51/216 |
| 2009/0157490 A1 | 6/2009 | Lawyer | |
| 2012/0005221 A1* | 1/2012 | Ickman | G06F 16/24575 707/769 |
| 2013/0018699 A1* | 1/2013 | Stibel | G06Q 30/0201 705/7.29 |
| 2015/0248736 A1* | 9/2015 | Myslinski | G06F 3/0488 705/319 |
| 2016/0063053 A1* | 3/2016 | Myslinski | G06F 16/24578 705/14.4 |
| 2016/0164888 A1* | 6/2016 | Chang | H04L 63/1441 726/22 |
| 2016/0321260 A1* | 11/2016 | Owens | G06F 16/9535 |
| 2016/0328482 A1 | 11/2016 | Shah et al. | |
| 2017/0139921 A1 | 5/2017 | Ball et al. | |
| 2017/0195125 A1* | 7/2017 | Heppe | H04L 63/123 |
| 2017/0213153 A1 | 7/2017 | Wang et al. | |
| 2018/0018709 A1 | 1/2018 | Sela et al. | |
| 2019/0379628 A1 | 12/2019 | Wu et al. | |
| 2020/0004882 A1* | 1/2020 | Kulkarni | G06F 17/18 |
| 2020/0019840 A1 | 1/2020 | Guo et al. | |
| 2020/0065292 A1 | 2/2020 | Li et al. | |
| 2020/0202071 A1* | 6/2020 | Ghulati | G06Q 50/01 |
| 2021/0049441 A1* | 2/2021 | Bronstein | G06F 17/18 |
| 2021/0089579 A1 | 3/2021 | Shu et al. | |
| 2021/0272217 A1 | 9/2021 | Shu et al. | |
| 2021/0279369 A1 | 9/2021 | Beigi et al. | |

OTHER PUBLICATIONS

Jin et al., News Credibility Evaluation on Microblog with a Hierarchical Propagation Model, 2014, IEEE (Year: 2014).*

Zhang et al., Fake News Detection with Diffusive Network Model, 2018, Arizona State University (Year: 2018).*

Shu et al., FakeNewsTracker: a tool for fake news collection, detection, and visualization, 2018, Springer (Year: 2018).*

Shu et al., Fake News Detection on Social Media: A Data Mining Perspective, 2018, vol. 19, Issue 1, SIGKDD Explorations (Year: 2017).*

Shu et al., Exploring Tri-Relationship for Fake News Detection, 2017, Arizona State University (Year: 2017).*

Wang, W. Y., "liar, liar pants on fire": A new benchmark dataset for fake news detection, (2017) preprint arXiv:1705.00648, 5 pages.

Written Opinion and Search Report for International Application No. PCT/US2019/52495 dated Dec. 6, 2019, 8 pages.

Wu, L, et al., "Tracing fake-news footprints: Characterizing social media messages by how they propagate," (2018) in WSDM, pp. 637-645. ACM.

Wu, Y, et al., "Toward computational fact-checking," (2014) Proceedings of the VLDB Endowment 7(7); pp. 589-600.

Yang, S, et al., "Unsupervised fake news detection on social media: A generative approach," in AAAI'19, pp. 5644-5651.

Zubiaga, A, et al., "Towards real-time, country-level location classification of worldwide tweets," TKDE'17; pp. 2053-2066.

Allcott, H., et al., "Social media and fake news in the 2016 election," Technical report, National Bureau of Economic Research, 2017, entire document.

Babcock, M., et al., Which fake fits? How the diffusion of disinformation varies by campaign type and community in the Black Panther Twitter discussion (2018), 2 pages.

Babcock, M., et al., Which fake fits? How the diffusion of disinformation varies by campaign type and community in the Black Panther Twitter discussion Poster (2018), 1 page.

Baccianella, S, et al., "Sentiwordnet 3.0: an enhanced lexical resource for sentiment analysis and opinion mining," (2010) in Lrec, vol. 10, pp. 2200-2204.

Bovet, A., et al., "Influence of fake news in twitter during the 2016 US presidential election" (2018), arXiv preprint arXiv:1803.08491, entire document.

Castillo, C, et al., "Characterizing the life cycle of online news stories using social media reactions," in CHI'14, entire document.

Castillo, C, et al., "Information credibility on twitter," in Proceedings of the 20th international conference on World wide web, pp. 675-684. ACM (2011).

Chen, Y, et al., "Misleading online content: Recognizing clickbait as false news," (2015) in Proceedings of the 2015 ACM on Workshop on Multimodal Deception Detection, pp. 15-19. ACM.

Davis, C.A., et al., "Botornot: A system to evaluate social bots," in WWW'16, entire document.

Del Vicario, M, et al., "Echo chambers: Emotional contagion and group polarization on facebook," (2016) Scientific reports 6:37825, entire document.

Farajtabar, M, et al., "Fake news mitigation via point process based intervention," (2017) arXiv preprint arXiv:1703.07823, entire document.

Goel, S, et al., "The structural virality of online diffusion," (2015) Management Science 62(1):180-196.

Gupta, A., et al., "Faking sandy: characterizing and identifying fake images on twitter during hurricane sandy," In WWW'13, entire document.

Hosseinimotlagh, S., et al., "Unsupervised content based identification of fake news articles with tensor decomposition ensembles," (2018), entire document.

Hutto, C.J., et al., "Vader: A parsimonious rule-based model for sentiment analysis of social media text" (2014), 10 pages.

Ji, Y., et al., "Representation learning for text-level discourse parsing," (2014) in ACL'2014, vol. 1, pp. 13-24.

Jin, Z., et al., "News verification by exploiting conflicting social viewpoints in microblogs," (2016) in AAAI, pp. 2972-2978.

Kim, A., et al., "Says who?: How news presentation format influences perceived believability and the engagement level of social media users" (2017), entire document.

Kwon, S, et al., "Prominent features of rumor propagation in online social media," (2013) in ICDM'13, pp. 1103-1108. IEEE.

Liu, Y., et al., "Early detection of fake news on social media through propagation path classification with recurrent and convolutional networks," (2018) in Thirty-Second AAAI Conference on Artificial Intelligence, entire document.

Magdy, A., et al., "Web-based statistical fact checking of textual documents," (2010) in Proceedings of the 2nd International workshop on Search and mining user-generated contents, pp. 103-110. ACM.

Manning, C, et al., "The stanford corenlp natural language processing toolkit," (2014) in ACL'14, pp. 55-60.

Mitra, T., et al., "Credbank: A large-scale social media corpus with associated credibility annotations," in ICWSM'15, entire document.

Mohammad, S., et al., "Stance and sentiment in tweets," (2017) ACM Transactions on Internet Technology (TOIT) 17 (3):26, entire document.

Pedregosa, F., et al., "Scikit-learn: Machine learning in python," (2011) JMLR 12(Oct); pp. 2825-2830.

Pennebaker, J.W., et al., "The development and psychometric properties of LIWC2015," (2015) Technical report, entire document.

Potthast, M, et al., "A stylometric inquiry into hyperpartisan and fake news," (2017) arXiv preprint arXiv:1702.05638, entire document.

Qazvinian, V, et al., "Rumor has it: Identifying misinformation in microblogs," in EMNLP'11, entire document.

Qian, F, et al., "Neural user response generator: Fake news detection with collective user intelligence," in IJCAI'18, entire document.

Rubin, V. L., et al., "Truth and deception at the rhetorical structure level," (2015) Journal of the Association for Information Science and Technology 66(5); pp. 905-917.

Ruchansky, N., et al., "CSI: A hybrid deep model for fake news detection," (2017) In CIKM, pp. 797-806, ACM.

Santia, G.C., et al., "Buzzface: A news veracity dataset with facebook user commentary and egos," in ICWSM'18, entire document.

(56) References Cited

OTHER PUBLICATIONS

Shao, C, et al., "The spread of fake news by social bots," (2017) arXiv preprint arXiv:1707.07592v1 (Jul. 24, 2017), 16 pages.
Shao, C, et al., "The spread of fake news by social bots," (2017) arXiv preprint arXiv:1707.07592v2 (Sep. 26, 2017), 16 pages.
Shao, C, et al., "The spread of information by social bots," (2017) arXiv preprint arXiv:1707.07592v3 (Dec. 30, 2017), 27 pages.
Shao, C., et al., "The spread of low-credibility content by social bots," arXiv preprint arXiv:1707.07592v4 (May 24, 2018), 41 pages.
Shu, K, et al., "Beyond news contents: The role of social context for fake news detection," in WSDM'19, 9 pages.
Shu, K, et al., "Deep headline generation for clickbait detection," in ICDM'18, 10 pages.
Shu, K, et al., "Fake news detection on social media: A data mining perspective," (2017) KDD exploration newsletter, 15 pages.
Shu, K, et al., "Studying fake news via network analysis: Detection and mitigation," (2018) CoRR abs/1804.10233, 2 pages.
Shu, K, et al., "Understanding user profiles on social media for fake news detection," (2018) in 2018 IEEE Conference on Multimedia Information Processing and Retrieval (MIPR), 6 pages.
Shu, K., et al., "FakeNewsNet: A Data Repository with News Content, Social Context and Spatiotemporal Information for Studying Fake News on Social Media," Association for the Advancement of Artificial Intelligence (https://arxiv.org/pdf/1809.01286.pdf), (Mar. 27, 2019), 11 pages.
Shu, K., et al., "Hierarchical Propagation Networks for Fake News Detection: Investigation and Exploitation," (2019), 10 pages.
Swift, A., "Americans trust in mass media sinks to new low," (2016) gallup.com, Sep. 14, 8 pages.
Tacchini, E, et al., "Some like it hoax: Automated fake news detection in social networks," (2017) arXiv preprint arXiv:1704.07506, 12 pages.
U.S. Appl. No. 16/525,148, filed Jul. 29, 2019, Shu et al., entire document.
U.S. Appl. No. 16/525,148, filed Feb. 5, 2020, Beigi et al., entire document.
Vosoughi, S, et al., "The spread of true and false news online," (2018) Science 359(6380); pp. 1146-1151.
Wang, S, et al., "'cure or poison?' identity verification and the spread of fake news on social media," (2018), 42 pages.
International Preliminary Report on Patentability from International Application No. PCT/US2019/052495 dated Mar. 23, 2021, 7 pp.
Shu et al., "FakeNews Tracker: a tool for fake new collection, detection, and visualization", Computational and Mathematical Organization Theory, vol. 25, Springer, Oct. 13, 2018, pp. 60-71, https://doi.org/10.1007/s10588-018-09280-3.
Shao et al., "Hoaxy: A Platform for Tracking Online Misinformation", International World Wide Web Conference Committee, Apr. 11, 2016, pp. 745-750.
U.S. Appl. No. 17/018,877, filed Sep. 19, 2022, naming inventors Shu et al.
Office Action from U.S. Appl. No. 17/018,877 dated Apr. 1, 2022, 25 pp.
Abbasi et al., "Measuring user credibility in social media", Social Computing, Behavioral-Cultural Modeling and Prediction: 6th International Conference, Springer Berlin Heidelberg, Apr. 2, 2013, pp. 441-448.
Afroz et al., "Detecting hoaxes, frauds, and deception in writing style online", 2012 IEEE symposium on security and privacy, IEEE, May 20, 2012, pp. 461-475.
Bowman et al., "Generating sentences from a continuous space", arXiv:1511.06349, May 12, 2016, 12 pp.
Boyd et al., "Convex optimization", Tutorial lectures, 18th Machine Learning Summer School, Cambridge university press, Sep. 13, 2004, 179 pp.
Burger et al., "Discriminating gender on Twitter", Proceedings of the 2011 conference on empirical methods in natural language processing, Association for Computational Linguistics, Jul. 27, 2011, pp. 1301-1309.
Celli et al., "Pr2: A Language Independent Unsupervised Tool for Personality Recognition from Text", arXiv: 1402.2796, Feb. 12, 2014, 4 pp.
Clauset et al., "Power-law distributions in empirical data", SIAM Review, vol. 51, No. 4, Feb. 2, 2009, pp. 661-703.
Entman, "Framing Bias: Media in the Distribution of Power", Journal of Communication, vol. 57, No. 1, Mar. 1, 2007, pp. 163-173.
Feng et al., "Syntactic Stylometry for Deception Detection", Proceedings of the 50th Annual Meeting of the Association for Computational Linguistics, vol. 2, Association for Computational Linguistics, Jul. 8, 2012, pp. 171-175.
Gentzkow et al., "Media bias in the marketplace: Theory", Handbook of media economics, Feb. 2014, pp. 623-645, (Applicant points out, in accordance with MPEP 609.04(a), that the year of publication, 2014, is sufficiently earlier than the effective U.S. filing date, so that the particular month of publication is not an issue.).
Golbeck et al., "Predicting personality with social media", CHI'11 extended abstracts on human factors in computing systems, ACM, May 7, 2011, pp. 253-262.
Gupta et al., "Evaluating event credibility on twitter", Proceedings of the 2012 SIAM International Conference on Data Mining, SIAM, Society for Industrial and Applied Mathematics, Jan. 7, 2012, pp. 153-164.
Hurtz et al., "Personality and Job Performance: The Big Five Revisited", Journal of Applied Psychology, vol. 85, No. 6, Dec. 2000, pp. 869-879, (Applicant points out, in accordance with MPEP 609.04(a), that the year of publication, 2000, is sufficiently earlier than the effective U.S. filing date, so that the particular month of publication is not an issue.).
Jin et al., "Novel Visual and Statistical Image Features for Microblogs News Verification", IEEE transactions on multimedia, vol. 19, No. 3, IEEE, Oct. 12, 2016, pp. 598-608.
Klein et al., "Fake News: A legal perspective", Journal of Internet Law, vol. 20, No. 10, Apr. 2017, pp. 11-17, (Applicant points out, in accordance with MPEP 609.04(a), that the year of publication, 2017, is sufficiently earlier than the effective U.S. filing date, so that the particular month of publication is not an issue.).
Le et al., "Distributed representations of sentences and documents", International conference on machine learning, vol. 32, PMLR, Jun. 18, 2014, pp. 1188-1196.
Lee et al., "Algorithms for Non-negative Matrix Factorization", Advances in neural information processing systems, 2001, pp. 556-562, (Applicant points out, in accordance with MPEP 609.04(a), that the year of publication, 2001, is sufficiently earlier than the effective U.S. filing date, so that the particular month of publication is not an issue.).
Liu et al., "What's in a name? using first names as features for gender inference in twitter", AAAI spring symposium series, Mar. 15, 2013, pp. 10-16.
Ma et al., "Detect rumors using time series of social context information on microblogging websites", Proceedings of the 24th ACM international on conference on information and knowledge management, Oct. 17, 2015, pp. 1751-1754.
Mccrae et al., "Age differences in personality across the adult life span: Parallels in five cultures", APA PsycNet, vol. 35, No. 2, Mar. 1999, pp. 466-477, (Applicant points out, in accordance with MPEP 609.04(a), that the year of publication, 1999, is sufficiently earlier than the effective U.S. filing date, so that the particular month of publication is not an issue.).
Morstatter et al., "Understanding Twitter Data with TweetXplorer", 19th Acm Sigkdd international conference on Knowledge discovery and data mining, ACM, Aug. 11, 2013, pp. 1482-1485.
Nguyen et al., "How old do you think I am? A study of language and age in Twitter", Proceedings of the international AAAI conference on Web and social media, vol. 7, No. 1, 2013, pp. 439-448, (Applicant points out, in accordance with MPEP 609.04(a), that the year of publication, 2013, is sufficiently earlier than the effective U.S. filing date, so that the particular month of publication is not an issue.).
Nyhan et al., "When corrections fail: The persistence of political misperceptions", Political Behavior, vol. 32, No. 2, Springer Science+Business Media, Mar. 30, 2010, pp. 303-330.

(56) References Cited

OTHER PUBLICATIONS

Paul et al., "The Russian "Firehose of Falsehood" Propaganda Model", Rand Corporation, vol. 2, No. 7, Jul. 2016, 16 pp.
Rubin et al., "Towards news verification: Deception detection methods for news discourse", Hawaii international conference on system sciences, Jan. 5, 2015, 12 pp.
Sap et al., "Developing age and gender predictive lexica over social media", Proceedings of the 2014 conference on empirical methods in natural language processing, Association for Computational Linguistics, Oct. 25, 2014, pp. 1146-1151.
Schwartz et al., "Personality, gender, and age in the language of social media: The open-vocabulary approach", PloS one, vol. 8, No. 9, Sep. 25, 2013, 16 pp.
Shahnaz et al., "Document clustering using nonnegative matrix factorization", Information Processing & Management, vol. 42, No. 2, Elsevier Ltd., Mar. 1, 2006, pp. 373-386.
Shu et al., "Exploiting Tri-Relationship for Fake News Detection", arXiv: 1712.07709, Dec. 20, 2017, 10 pp.
Shu et al., "User Identity Linkage across Online Social Networks: A Review", Acm Sigkdd Explorations Newsletter, vol. 18, No. 2, Mar. 22, 2017, pp. 5-17.
Sloan et al., "Who Tweets with Their Location? Understanding the Relationship between Demographic Characteristics and the Use of Geoservices and Geotagging on Twitter", PloS one, vol. 10, No. 11, Nov. 6, 2015, 15 pp.
Su et al., "Men and things, women and people: a meta-analysis of sex differences in interests", Psychological Bulletin, vol. 135, No. 6, American Psychological Association, Nov. 2009, pp. 859-884, (Applicant points out, in accordance with MPEP 609.04(a), that the year of publication, 2009, is sufficiently earlier than the effective U.S. filing date, so that the particular month of publication is not an issue.).
Tang et al., "Node classification in signed social networks", Proceedings of the 2016 SIAM international conference on data mining, Society for Industrial and Applied Mathematics, Jun. 30, 2016, pp. 54-62.
Wang et al., "Attributed signed network embedding", Proceedings of the 2017 ACM on Conference on Information and Knowledge Management, ACM, Nov. 6, 2017, pp. 137-146.
Xu et al., "Document clustering based on non-negative matrix factorization", Proceedings of the 26th annual international ACM SIGIR conference on Research and development in informaion retrieval, ACM, Jul. 28, 2003, pp. 267-273.
Zubiaga et al., "Stance Classification of Social Media Users in Independence Movements", arXiv: 1702.08388, vol. 2, No. 8599, IEEE, Jun. 20, 2017, 6 pp.

\* cited by examiner

| Dataset/ Features | PolitiFact | | GossipCop | |
|---|---|---|---|---|
| | Fake | Real | Fake | Real |
| Total news articles | 432 | 624 | 6,048 | 16,817 |
| News articles with text content | 353 | 400 | 785 | 16,765 |
| News articles with social engagements | 342 | 314 | 4,298 | 82,902 |
| News articles with both social engagements and news content | 286 | 202 | 675 | 2,895 |
| News articles with social engagements containing at least 1 reply | 236 | 180 | 945 | 752 |
| News articles with social engagements containing at least 1 like | 283 | 219 | 2,911 | 845 |
| News articles with social engagements containing at least 1 retweet | 282 | 242 | 2,249 | 1,254 |
| No. of tweets with replies | 6,686 | 20,720 | 3,040 | 2,546 |
| No. of tweets with likes | 18,453 | 52,082 | 10,685 | 2,264 |
| No. of tweets with retweets | 13,226 | 42,059 | 7,614 | 5,025 |
| Total no. of tweets | 116,005 | 261,262 | 71,009 | 154,383 |

FIG. 2

| Features | News Content | | Social Context | | | | Spatiotemporal Information | |
|---|---|---|---|---|---|---|---|---|
| Dataset | Linguistic | Visual | User | Post | Response | Network | Spatial | Temporal |
| BuzzFeedNews | ✓ | | | | | | | |
| LIAR | ✓ | | | | | | | |
| BS Detector | ✓ | | | | | | | |
| CREDBANK | ✓ | | ✓ | ✓ | | | ✓ | ✓ |
| BuzzFace | ✓ | | | ✓ | ✓ | | | |
| FacebookHoax | ✓ | | ✓ | ✓ | ✓ | | | |
| FakeNewsNet | ✓ | ✓ | ✓ | ✓ | ✓ | ✓ | ✓ | ✓ |

FIG. 3

| Platform | PolitiFact | BuzzFeed |
|---|---|---|
| # Candidate news | 394 | 174 |
| # True news | 197 | 87 |
| # Fake news | 197 | 87 |
| # Users | 18,013 | 6,118 |
| # Social engagements | 23,106 | 9,740 |

FIG. 6

| Dataset | Metric | SAF/S | SAF/A | SAF |
|---|---|---|---|---|
| PolitiFact | Accuracy | 0.633 | 0.620 | 0.670 |
| | Precision | 0.625 | 0.595 | 0.600 |
| | Recall | 0.541 | 0.594 | 0.891 |
| | F1 | 0.578 | 0.595 | 0.717 |
| BuzzFeed | Accuracy | 0.623 | 0.571 | 0.742 |
| | Precision | 0.526 | 0.444 | 0.777 |
| | Recall | 0.714 | 0.286 | 0.500 |
| | F1 | 0.606 | 0.348 | 0.608 |

FIG. 7

| Dataset | Metric | SVM | LR | GNB |
|---|---|---|---|---|
| PolitiFact | Accuracy | 0.684 | 0.683 | 0.620 |
| | Precision | 0.607 | 0.606 | 0.574 |
| | Recall | 0.919 | 0.910 | 0.729 |
| | F1 | 0.731 | 0.728 | 0.643 |
| BuzzFeed | Accuracy | 0.543 | 0.542 | 0.486 |
| | Precision | 0.455 | 0.453 | 0.409 |
| | Recall | 0.714 | 0.786 | 0.643 |
| | F1 | 0.555 | 0.579 | 0.500 |

FIG. 10

| Platform | BuzzFeed | PolitiFact |
| --- | --- | --- |
| # Candidate news | 182 | 240 |
| # True news | 91 | 120 |
| # Fake news | 91 | 120 |
| # Users | 15,257 | 23,865 |
| # Engagements | 25,240 | 37,259 |
| # Social Links | 634,750 | 574,744 |
| # Publisher | 9 | 91 |

FIG. 13

| Method | News Content | Social Engagements | Publisher Partisan |
|---|---|---|---|
| RST(28) | ✓ | | |
| LIWC(93) | ✓ | | |
| Castillo(10) | | ✓ | |
| RST+Castillo(38) | ✓ | ✓ | |
| LIWC+Castillo(103) | ✓ | ✓ | |
| TriFN\P | ✓ | ✓ | |
| TriFN\S | ✓ | | ✓ |
| TriFN\PS | ✓ | | |
| TriFN | ✓ | ✓ | ✓ |

FIG. 14

| Datasets | Metric | RST | LIWC | Castillo | RST+Castillo | LIWC+Castillo | TriFN |
|---|---|---|---|---|---|---|---|
| BuzzFeed | Accuracy | 0.610 ± 0.023 | 0.655 ± 0.075 | 0.747 ± 0.061 | 0.758 ± 0.030 | 0.791 ± 0.036 | 0.864 ± 0.026 |
| | Precision | 0.602 ± 0.066 | 0.683 ± 0.065 | 0.735 ± 0.080 | 0.795 ± 0.060 | 0.825 ± 0.061 | 0.849 ± 0.040 |
| | Recall | 0.561 ± 0.057 | 0.628 ± 0.021 | 0.783 ± 0.048 | 0.784 ± 0.074 | 0.834 ± 0.094 | 0.893 ± 0.013 |
| | F1 | 0.555 ± 0.057 | 0.623 ± 0.066 | 0.756 ± 0.051 | 0.789 ± 0.056 | 0.802 ± 0.023 | 0.870 ± 0.019 |
| PolitiFact | Accuracy | 0.571 ± 0.039 | 0.637 ± 0.021 | 0.779 ± 0.025 | 0.812 ± 0.026 | 0.821 ± 0.052 | 0.878 ± 0.020 |
| | Precision | 0.595 ± 0.032 | 0.621 ± 0.025 | 0.777 ± 0.051 | 0.823 ± 0.040 | 0.856 ± 0.071 | 0.867 ± 0.034 |
| | Recall | 0.533 ± 0.031 | 0.667 ± 0.091 | 0.791 ± 0.026 | 0.792 ± 0.026 | 0.767 ± 0.120 | 0.893 ± 0.023 |
| | F1 | 0.544 ± 0.042 | 0.615 ± 0.044 | 0.783 ± 0.015 | 0.793 ± 0.032 | 0.813 ± 0.070 | 0.880 ± 0.017 |

FIG. 15

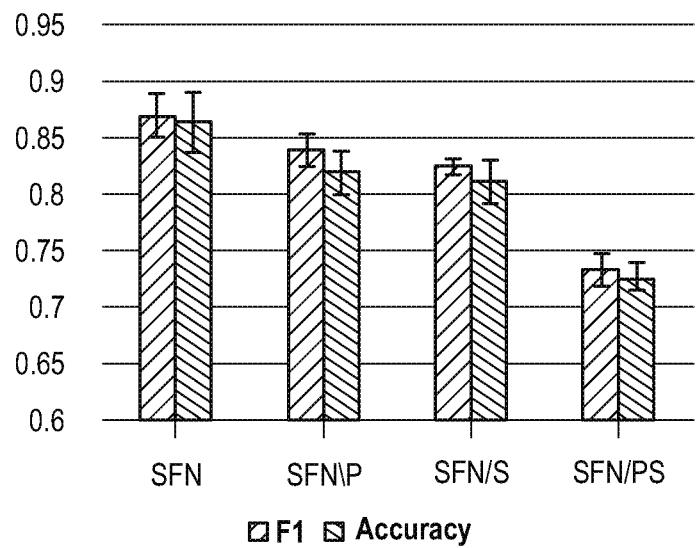
(a) BuzzFeed
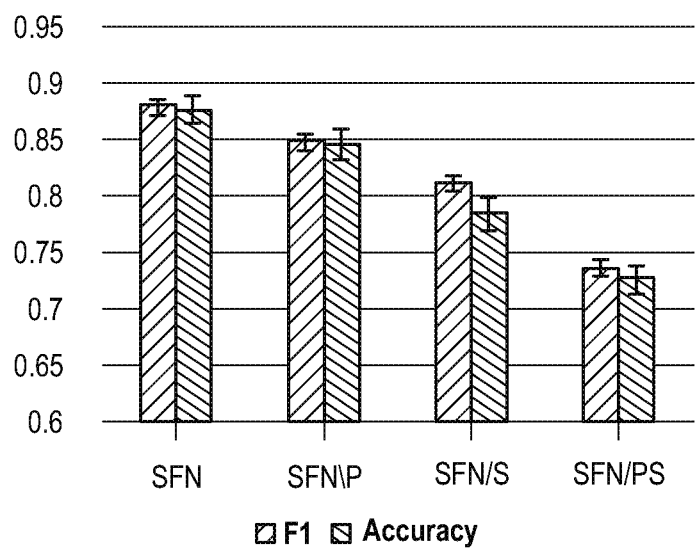
(b) PolitiFact
FIG. 16

| Platform | Buzzfeed | PolitiFact |
|---|---|---|
| # True news | 91 | 120 |
| # Fake news | 91 | 120 |
| # Users | 15,257 | 23,865 |
| # Engagements | 25,240 | 37,259 |

FIG. 20

|            | BuzzFeed | PolitiFact |
|------------|----------|------------|
| Only Fake  | 7,406    | 18,899     |
| Only Real  | 7,316    | 4,437      |
| Fake & Real| 535      | 529        |
| Total      | 15,257   | 23,865     |

FIG. 22

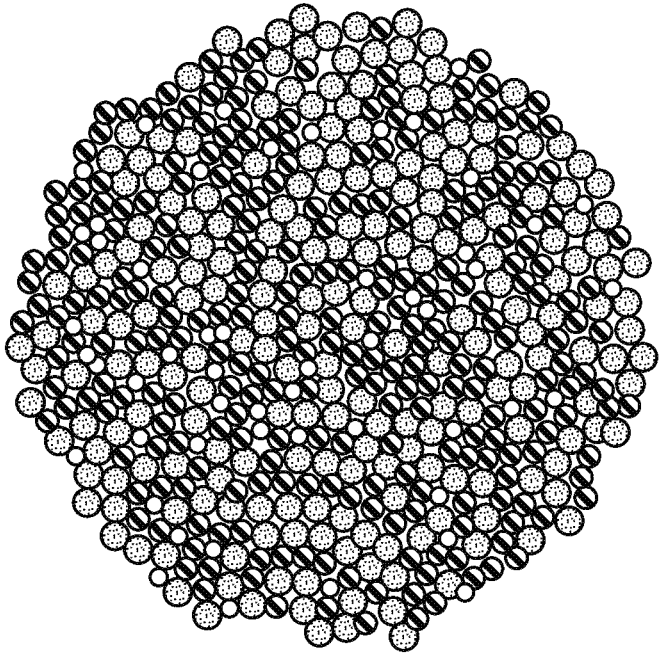
(a) BuzzFeed
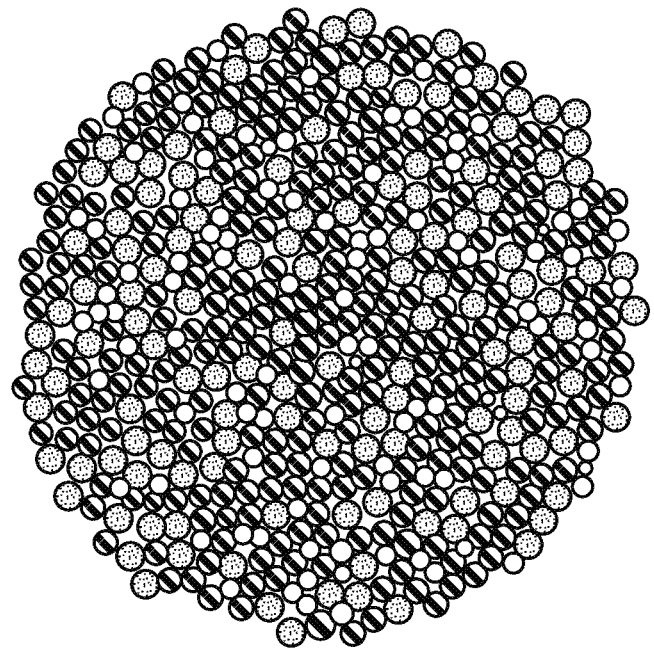
(b) PolitiFact
FIG. 23

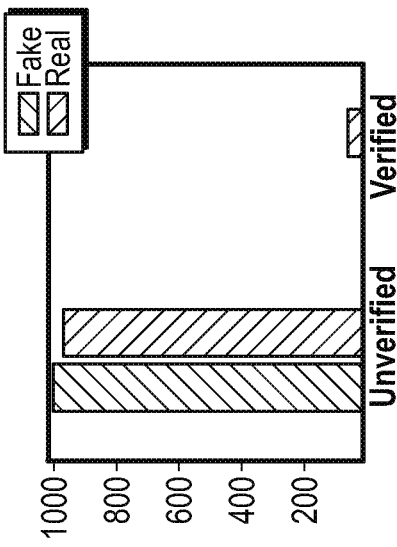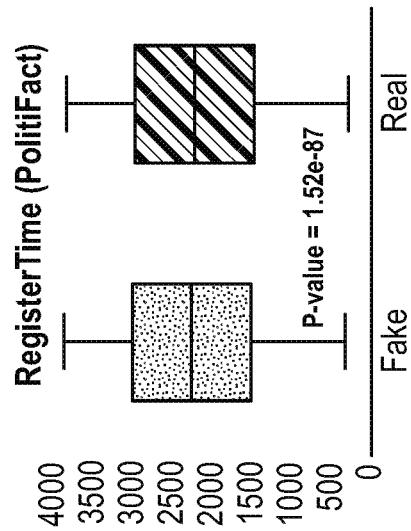
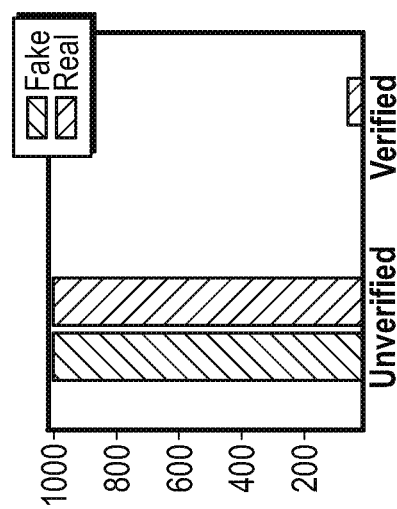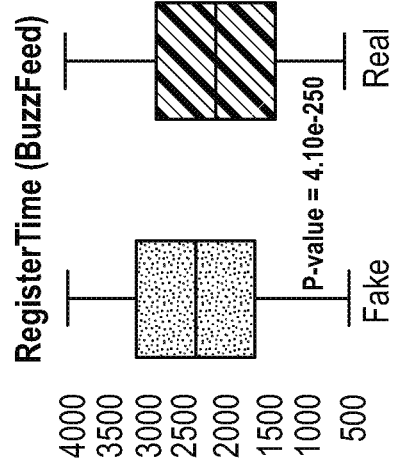
FIG. 24

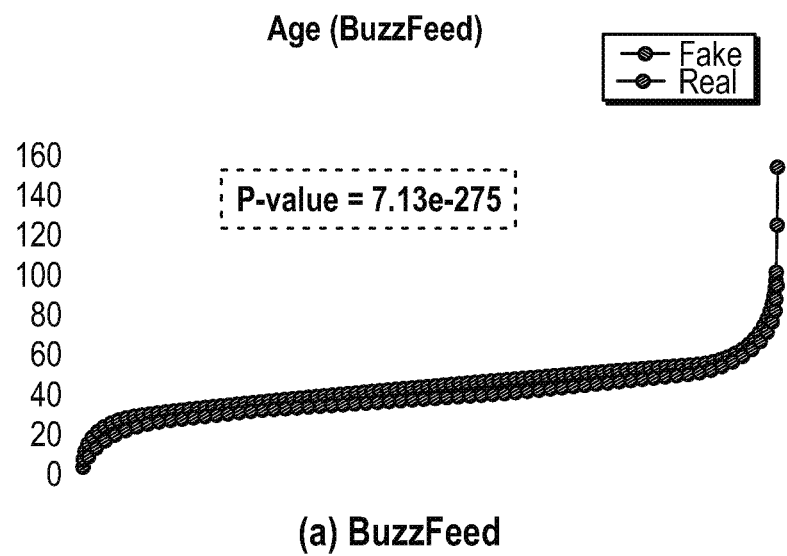
(a) BuzzFeed
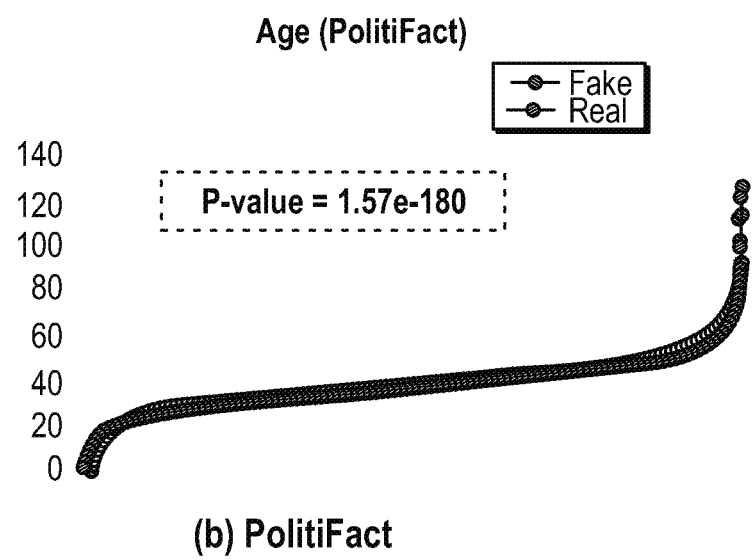
(b) PolitiFact
FIG. 28

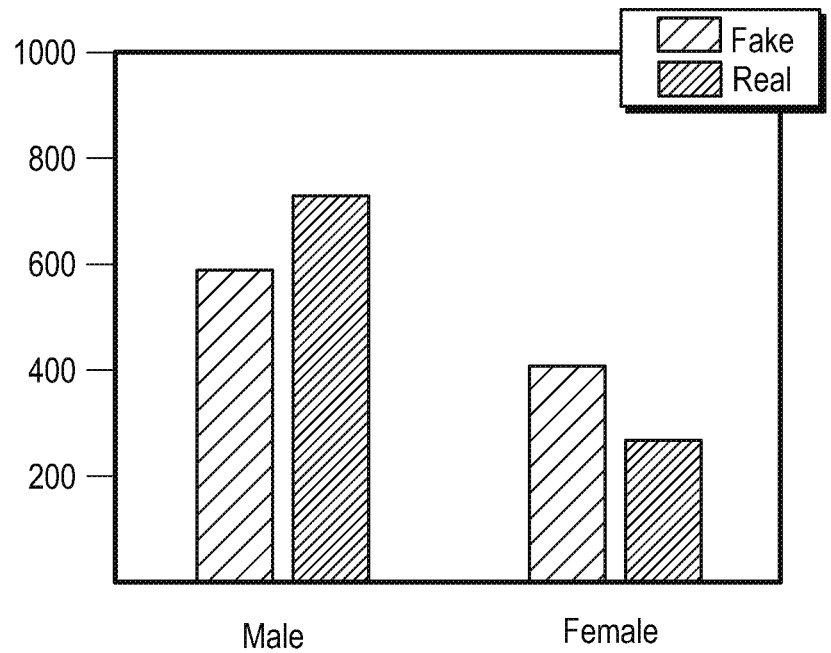
(a) BuzzFeed
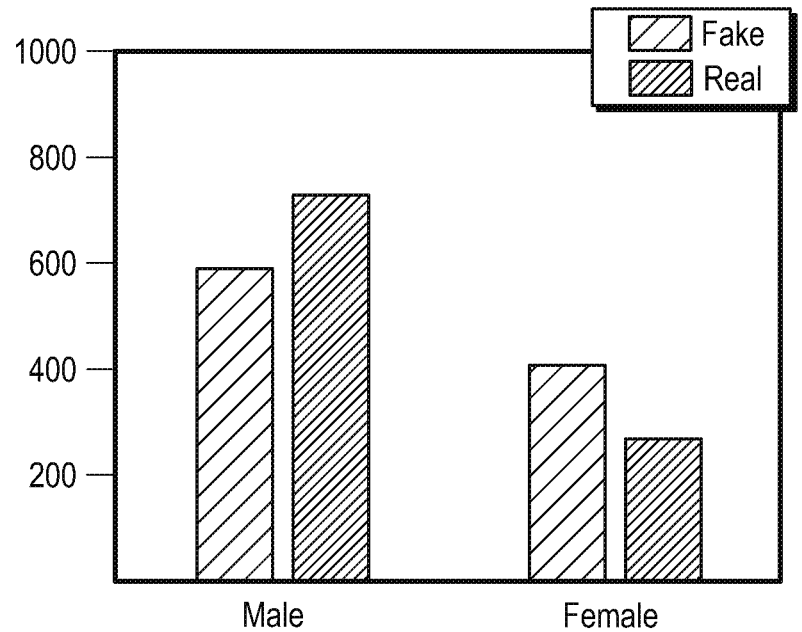
(b) PolitiFact
FIG. 29

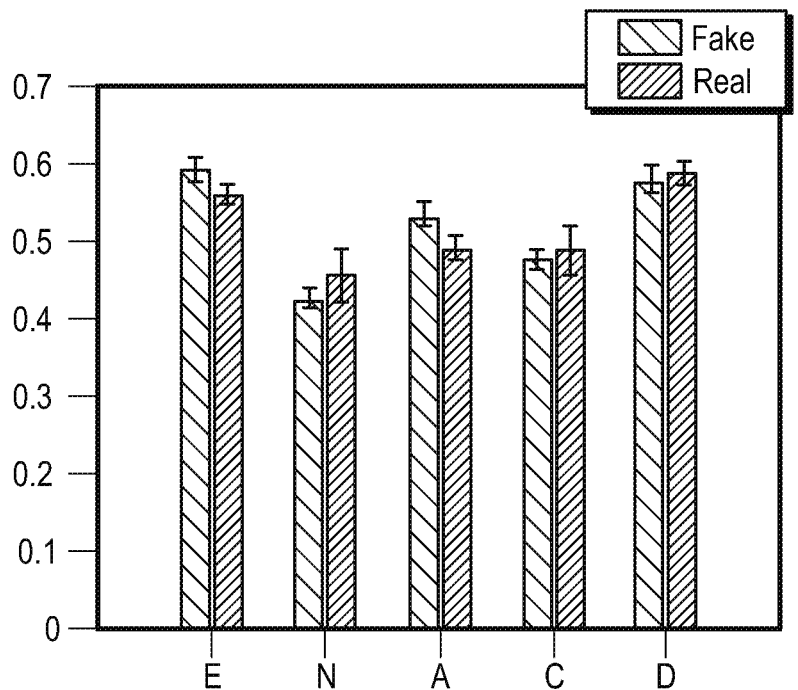
(a) BuzzFeed
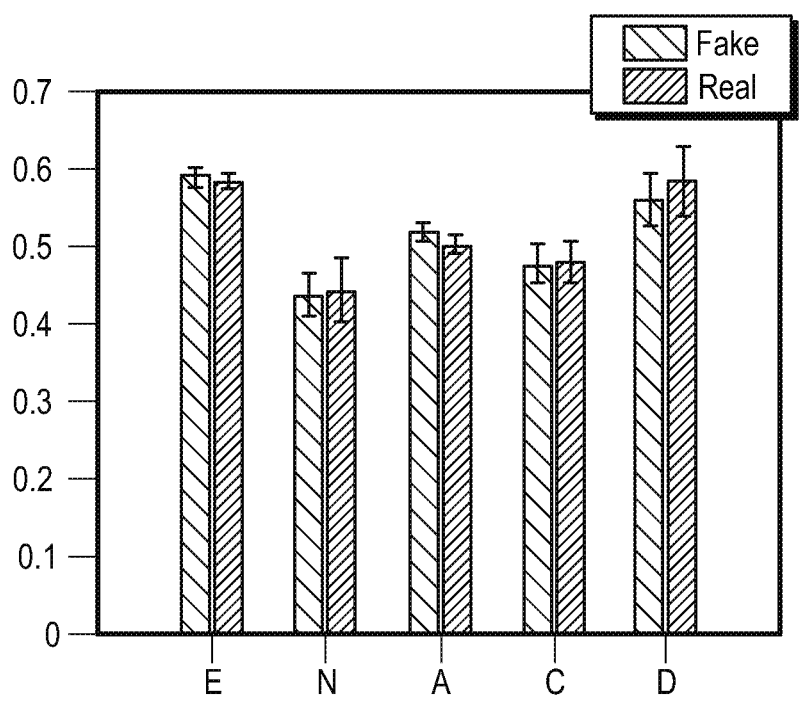
(b) PolitiFact
FIG. 30

FIG. 32

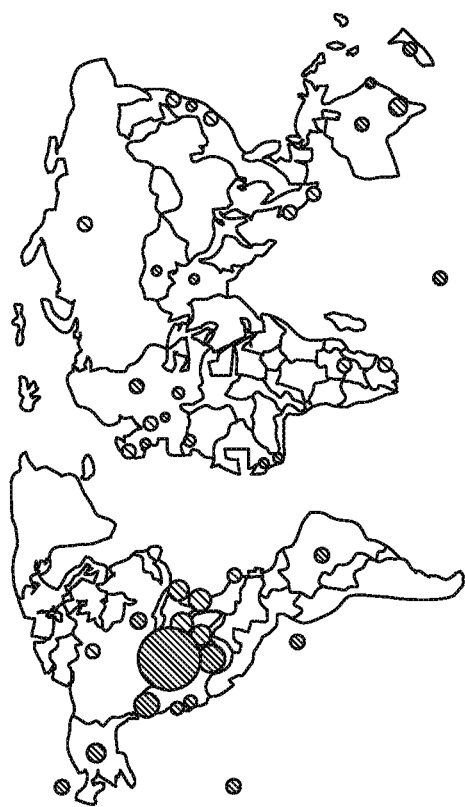
FIG. 33

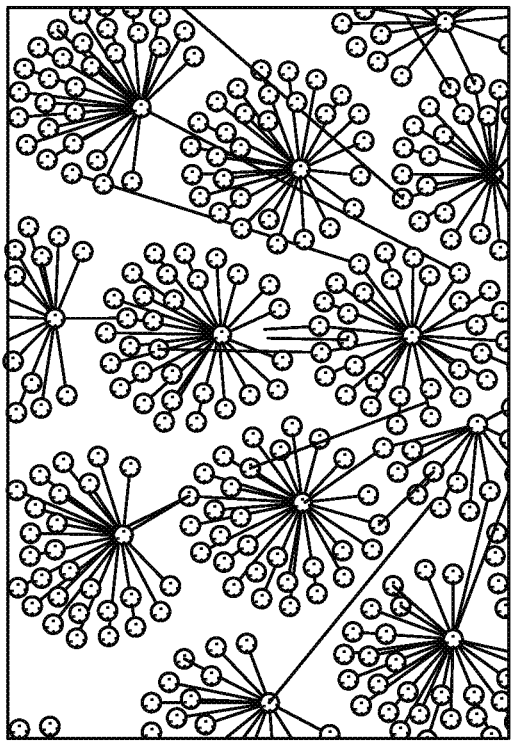
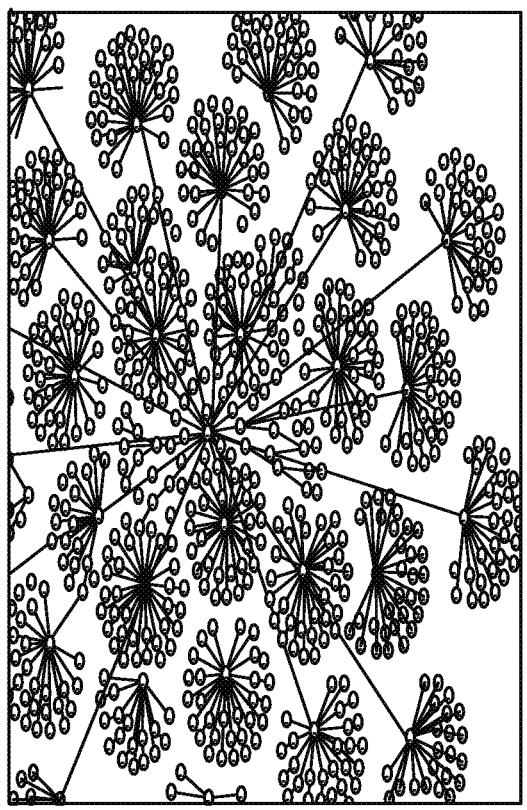
FIG. 34

METHOD AND APPARATUS FOR COLLECTING, DETECTING AND VISUALIZING FAKE NEWS

CROSS-REFERENCE TO RELATED APPLICATIONS

This application is a U.S. National Phase application under 35 U.S.C. § 371 of International Application No. PCT/US2019/052495, filed Sep. 23, 2019, entitled "METHOD AND APPARATUS FOR COLLECTING, DETECTING AND VISUALIZING FAKE NEWS", and this application claims the benefit of U.S. Provisional Application No. 62/734,945, filed Sep. 21, 2018, the entire contents of which are hereby incorporated by reference herein.

STATEMENT REGARDING FEDERALLY SPONSORED RESEARCH

This invention was made with government support under grants N00014-16-1-2257 and N00014-13-1-0835 awarded by the Office of Naval Research, and grant W911NF-15-1-0328 awarded by the Army Research Office. The government has certain rights in the invention.

TECHNICAL FIELD

Embodiments of the invention relate to detection of online fake news, and in particular, collecting news articles and detecting and visualizing a news article as fake or not.

BACKGROUND

There are challenges in fake news detection including a lack of a quality labeled dataset and the dynamic nature of fake news, as well as a model that adequately classifies a news article as fake or not. What is needed is a system that provides a quality labeled data set and takes into consideration that dynamic nature of fake news, and makes use of a model that better classifies a news article as fake or not.

Regarding online fake news, the prior art classifies a given user profile as a real user or bot user which does not help identify fake news and real news. Fake profiles are created in social media for several purposes like influencing user opinions, performing cyber-attacks, etc. So, there can be situations where real news can be spread by bots to influence the social media to suppress other information in the social media. Furthermore, prior art systems require human intervention in the process of fake news detection. What is needed is an automated process that enables fake news detection to be applied at scale and that could benefit those that process data on a large scale.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 includes a table providing statistics of data collected according to embodiments of the invention;

FIG. 3 is a table providing a comparison with existing fake news detection datasets according to embodiments of the invention;

FIG. 6 is a table of statistics of a dataset according to embodiments of the invention;

FIG. 7 is a table showing the performance comparison for fake news detection according to embodiments of the invention;

FIG. 10 includes a table of performance of using semi-supervised learned features from SAF for a detection task according to embodiments of the invention;

FIG. 13 includes statistics of datasets according to embodiments of the invention;

FIG. 14 includes a table of a summary of the detection methods for comparison with embodiments of the invention;

FIG. 15 includes a performance comparison for fake news detection with embodiments of the invention;

FIG. 16 illustrates user engagements and publisher partisanship impact according to embodiments of the invention;

FIG. 20 includes a table of statistics of datasets according to embodiments of the invention;

FIG. 22 includes a table of statistics of a user community according to embodiments of the invention;

FIG. 23 illustrates a fake news ratio (FNR) distribution according to embodiments of the invention;

FIG. 24 illustrates a profile feature comparison according to embodiments of the invention;

FIG. 28 illustrates an age distribution comparison according to embodiments of the invention;

FIG. 29 illustrates a gender distribution comparison according to embodiments of the invention;

FIG. 30 illustrates personality scores comparison according to embodiments of the invention;

FIG. 32 is a word cloud of fake news content and true news content according to embodiments of the invention;

FIG. 33 is a geo-visualization of tweets of fake news and real news according to embodiments of the invention;

FIG. 34 illustrates a social network of users who share fake news and real news according to embodiments of the invention;

WRITTEN DESCRIPTION

I. Overview

Embodiments of the invention provide a system for online news collection, detection of fake news, and visualization of the fake news. As used herein, the term fake news is a broad term generally meant to include any form of disinformation, such as conspiracy theories, fake news, discussions of political scandals, and negative campaigns. The rise of social media provides individuals with significant power to create and/or share disinformation with each other, allowing for the transmission of information that portrays political candidates or groups negatively and has no, or low, evidential basis. As used herein, the term real news is a broad term that encompasses information and news that is the antithesis of fake news.

Figure 1:
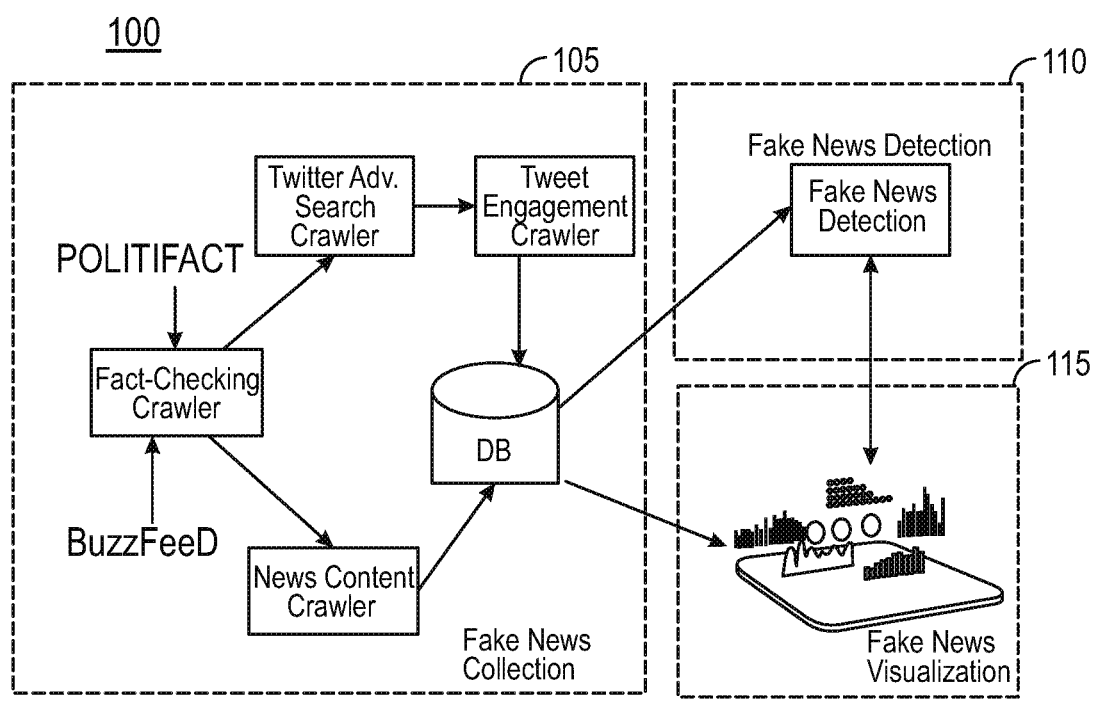
FIG. 1 is a flow chart according to embodiments of the invention.

Embodiments of the invention facilitate detecting fake news. FIG. 1 shows the various components according to embodiments of the invention 100. The functional blocks of embodiments of the invention are as follows:

A. Fake News Collection 105: collecting news content, social media context, and spatiotemporal information, automatically, which provides valuable datasets for the study and detection of fake news;

B. Fake News Detection 110: extracting useful features from the collected news content, social media context, and spatiotemporal information, and building various machine learning models to detect fake news; and C. Fake News Visualization 115: presenting the characteristics of fake news dissemination through effective visualization techniques.

Embodiments of the invention provide an end to end framework for collecting data related to fake news, detecting fake news in the collected data, and visualizing the fake news data, which provides insights into the nature of the data. The data collected in embodiments of the invention is comprehensive for purposes of fake news detection because it includes news content and the social media context, and in some embodiments, spatiotemporal information. The spatiotemporal information relates to, for example, locations of users that post or repost news articles on social media platforms, and timestamps associated with such postings and repostings. Embodiments of the invention use some or all of this information in a classification task and provide a software interface for visualization of the data in different manners. A more detailed discussion of each of the above-mentioned functional blocks follows.

A. Collecting News Data

A.1. Collecting Fake News Data and Social Media Context Information

Fake news is widely spread across various online platforms. Embodiments of the invention collect news, for example, using a web crawler that looks for news content, and also make use of fact-checking websites like PolitiFact as a source for collecting alleged fake news information. In these fact-checking sites, fake news information is provided by trusted authors and relevant claims are made by the authors on why the mentioned news is not true. A web crawler, or simply, a crawler, also referred to as a spider or spiderbot, is an Internet bot that systematically browses the World Wide Web, typically for the purpose of web indexing. Web search engines and some web sites use web crawling or spidering software to update their web content or indices of others sites' web content. Web crawlers copy pages for processing by a search engine which indexes the downloaded pages so users can search more efficiently.

Embodiments of the invention collect fake news in a periodic manner to update a repository. First, embodiments of the invention collect verified fake news and true news from fact-checking websites like PolitiFact on a daily basis. Then, using a social media platform's API, e.g., Twitter's advanced search API, embodiments of the invention crawl and gather the social media posts, e.g., the tweets, which spread the fake/real news in Twitter. Moreover, embodiments of the invention crawl and gather social media engagements of users such as replies to the tweets, retweets, and favorites through Twitter APIs.

Users who interact with social media posts, e.g., tweets, related to fake news are more vulnerable to them. If the user likes the post/tweet related to fake news they are prone to be affected by the fake news. Based on the comments on a post or repost, e.g., retweets, embodiments of the invention infer whether the user is able to differentiate fake news or not. In social media, users form social media groups and so people in the same group will also be affected by the fake news because of the so-called "echo chamber" effect. So, embodiments of the invention also collect the followers and followees of the users who engage with fake news to help characterize user features in the detection task.

The table in FIG. 2 provides statistics of data collected according to embodiments of the invention. Embodiments of the invention use websites, such as fact-checking websites, e.g., www.PolitiFact.com and www.GossipCop.com, to collect the online news articles related to fake news and real news. Embodiments also collect social media posts and engagements, for example, from Twitter using Twitter's advanced search Application Programmatic Interface (API). The collected dataset contains news articles, and tweets, related to fake news and real news posted on Twitter as well as social media engagements including likes, replies, and retweets related to those tweets. In addition to this information, user profile information and the social media network of each of the users is also collected. Embodiments collect the data in a dynamic manner to get a comprehensive dataset.

Embodiments of the invention provide a deep learning based model that uses the collected news content and social media context to detect fake news. The model captures the latent representation of the news content using an autoencoder (a type of Artificial Neural Network (ANN) used to automatically discover representations needed for feature detection or classification of data), captures social media engagements using Long Short-Term Memory (LSTM), a well-known variation of a Recurrent Neural Network (RNN), and predicts whether a news article is fake or not, based thereon.

For the autoencoder, embodiments use the well-known Sequence to Sequence model for deep learning (Seq2Seq) to encode and decode news articles. In natural language processing (NLP), a branch of artificial intelligence (AI), Seq2Seq is a method of encoder-decoder based machine translation that maps an input of sequence to an output of sequence with a tag and attention value. The approach uses two RNNs that work together with a special token and tries to predict the next state sequence from the previous sequence.

In the encoder part, an LSTM is used, wherein each word in a news article sequence is provided as an input and the last timestamp's hidden state of the neural network is considered as the latent representation. The decoder part of the neural network takes the latent representation as input and attempts to reconstruct the original news article sequence. As for the social media engagements, embodiments use Singular-Value Decomposition (SVD) to decompose a user and news article engagement matrix to get the features related to a user. Further, embodiments use the doc2vec model to represent the tweet's text content in the latent space, doc2vec creates a numeric representation of a document, in this case, the text string in a tweet, regardless of its length. Embodiments combine both user features and the text's latent representation together and provide it as an input to the LSTM network to capture the temporal pattern of news diffusion in the neural network for social media content. Finally, the embodiments combine the features learned from both the news content neural network and the neural network for social media content and predict the output. Both the neural networks are learned together in a supervised fashion to extract significant features for the fake news classification task.

Figure 36:
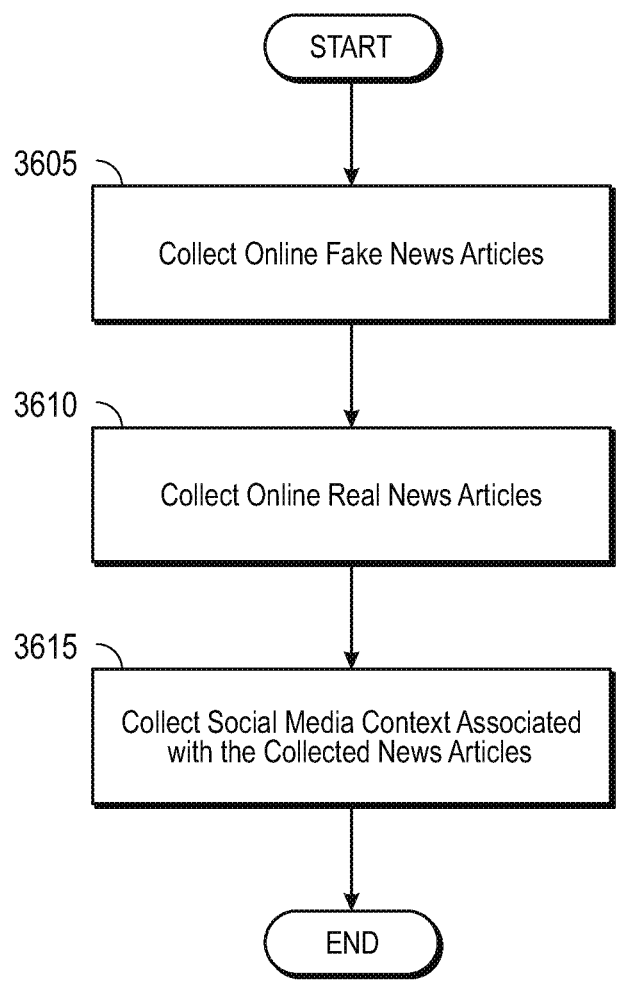
FIG. 36 is flow chart of embodiments of the invention including logic for collecting online fake news articles and logic for collecting online real news articles according to embodiments of the invention.

Thus, as illustrated in the flow chart of FIG. 36, embodiments of the invention 3600 include logic 3605 for collecting online fake news articles and logic 3610 for collecting online real news articles. In one embodiment, the logic collects the online news articles via fact-checking websites. In one embodiment, the logic uses an autoencoder, which in turn uses the seq2seq approach, to capture latent representations of the news articles. Further logic 3615 collects social media context associated with the collected online fake and real news articles. According to one embodiment, collecting the social media context includes collecting social media posts relating to the online fake and real news articles, collecting subsequent social media engagements with such posts, collecting user profile information, and collecting social media platform and/or network information for the users that created the collected social media posts and the subsequent social media engagements.

A.2. Collecting Fake News Data, Social Media Context Information, and Spatiotemporal Information A.2.1. Introduction Social media has become a popular means for people to consume and share the news. At the same time, however, it has also enabled the wide dissemination of fake news, i.e., news with intentionally false information, causing significant negative effects on society. To mitigate this problem, the research of fake news detection has recently received a lot of attention. Despite several existing computational solutions for the detection of fake news, however, the lack of comprehensive and community-driven fake news datasets has become one of major roadblocks. Not only are existing datasets scarce, they do not contain the features often required in the study of such, including news content, social media context, and spatiotemporal information. Therefore, embodiments of the invention, to facilitate fake news detection, provide for a fake news data repository, referred to herein as FakeNewsNet, which contains two comprehensive datasets with diverse features in news content, social media context, and spatiotemporal information. A description of the FakeNewsNet follows, including an analysis of the two datasets from different perspectives, and a discussion of the benefits of the FakeNewsNet for potential applications on fake news study on social media.

Detecting fake news on social media presents unique challenges. First, fake news articles, or pieces, may be intentionally written to mislead consumers, which makes it difficult to spot fake news from news content itself. Thus, there is a need to explore information in addition to news content, such as user engagements and social behaviors of users on social media. For example, a credible user's comment that "this is fake news" is a strong signal that the news may be fake. Second, the research community lacks datasets which contain spatiotemporal information to understand how fake news propagates over time in different regions, how users react to fake news, and how useful temporal patterns can be extracted for (early) fake news detection and intervention. Thus, it is necessary to have comprehensive datasets that have news content, social media context and spatiotemporal information to facilitate fake news research. However, existing datasets only cover one or two aspects.

Therefore, embodiments construct and publish a multi-dimensional data repository, termed herein FakeNewsNet, which currently contains two datasets with news content, social media context, and spatiotemporal information. The dataset is constructed using an end-to-end system FakeNewsTracker according to the embodiments. The constructed FakeNewsNet repository has the potential to boost the study of various open research problems related to fake news study.

First, a rich set of features in the datasets provides an opportunity to apply different methods for fake new detection, understand the diffusion of fake news in social networks and intervene in it. Second, the temporal information enables the study of early fake news detection by generating synthetic user engagements from historical temporal user engagement patterns in the dataset. Third, it is possible to investigate the fake news diffusion process by identifying provenances, persuaders, and developing better fake news intervention strategies. The data repository can serve as a starting point for many studies regarding fake news, and provide a better, shared insight into disinformation tactics. Update can be made to this data repository, to expand it with new sources and features, as well as maintain completeness. Embodiments of the invention include constructing and publishing a multi-dimensional data repository for various fake news detection related research such as fake news detection, evolution, and mitigation; and analyzing the datasets from different perspectives to demonstrate the quality of the datasets, understand their characteristics and provide baselines for future fake news detection.

A.2.2. Background

Fake news detection in social media aims to extract useful features and build effective models from existing social media datasets for detecting fake news. Thus, a comprehensive and large-scale dataset with multi-dimensional information in online fake news ecosystem is important. The multi-dimensional information not only provides more signals for detecting fake news but can also be used for research such as understanding fake news propagation and fake news intervention. Though there exist several datasets for fake news detection, the majority of them only contain linguistic features. Few contain both linguistic and social media context features. To facilitate research on fake news, embodiments provide a data repository which includes not only news contents and social media context information, but also spatiotemporal information. For a better comparison of the differences, existing popular fake news detection datasets are discussed and compared with the FakeNewsNet repository, according to an embodiment, in the table of FIG. 3.

BuzzFeedNews: This dataset comprises a complete sample of news published in Facebook from nine news agencies over a week close to the 2016 U.S. election from September 19-23, 26 and 27. Every post and corresponding linked article were fact-checked claim-by-claim by five Buzz Feed journalists. The dataset contains 1,627 articles 826 considered mainstream, 356 articles considered left-wing, and 545 alleged right-wing articles.

LIAR: This dataset was collected from the fact-checking website PolitiFact. It has 12,800 human labeled short statements collected from PolitiFact. The statements are labeled into six categories ranging from completely false to completely true, ranging from: pants on fire, false, barely-true, half-true, mostly true, and true.

BS Detector: This dataset was collected from a browser extension called BS detector developed for checking news veracity. The detector searched all links on a given web page for references to unreliable sources by checking against a manually compiled list of domains. The labels are the outputs of the BS detector, rather than human annotators.

CREDBANK: This is a large-scale crowd-sourced dataset of around 60 million tweets that cover 96 days starting from October 2015. The tweets are related to over 1,000 news events. Each event is assessed for credibility by 30 annotators from Amazon Mechanical Turk.

BuzzFace: This dataset is collected by extending the BuzzFeed dataset with comments related to news articles on Facebook. The dataset contains 2263 news articles and 1.6 million comments discussing news content.

FacebookHoax: This dataset comprises information related to posts from the Facebook pages related to scientific news (non-hoax) and conspiracy (hoax) pages collected using the Facebook Graph API. The dataset contains 15,500 posts from 32 pages (14 conspiracy and 18 scientific) with more than 2,300,000 likes.

From the table in FIG. 3, it is seen that no existing public dataset can provide all possible features of news content, social media context, and spatiotemporal information. Existing datasets have some limitations that the embodiments address in the data repository. For example, BuzzFeedNews only contains headlines and text for each news piece and covers news articles from very few news agencies. The LIAR dataset contains mostly short statements instead of entire news articles with the meta-attributes. The BS Detector data is collected and annotated by using a developed news veracity checking tool, rather than using human expert annotators. The CREDBANK dataset was originally collected for evaluating tweet credibilities—the tweets in the dataset are not related to fake news articles and hence cannot be effectively used for fake news detection. The BuzzFace dataset has basic news content and social media context information but it does not capture the temporal information. The FacebookHoax dataset consists of very few instances about conspiracy theories and scientific news.

To address the disadvantages of existing fake news detection datasets, the FakeNewsNet repository, according to the embodiments, collects multi-dimension information from news content, social media context, and spatiotemporal information from different types of news domains such as political and entertainment sources.

A.2.3. Dataset Integration

A description follows of the dataset integration process, according to embodiments of the invention, for the FakeNewsNet repository, including a discussion of how to collect news content with reliable ground truth labels, as well as how to obtain additional social media context and spatial temporal information.

Figure 4:
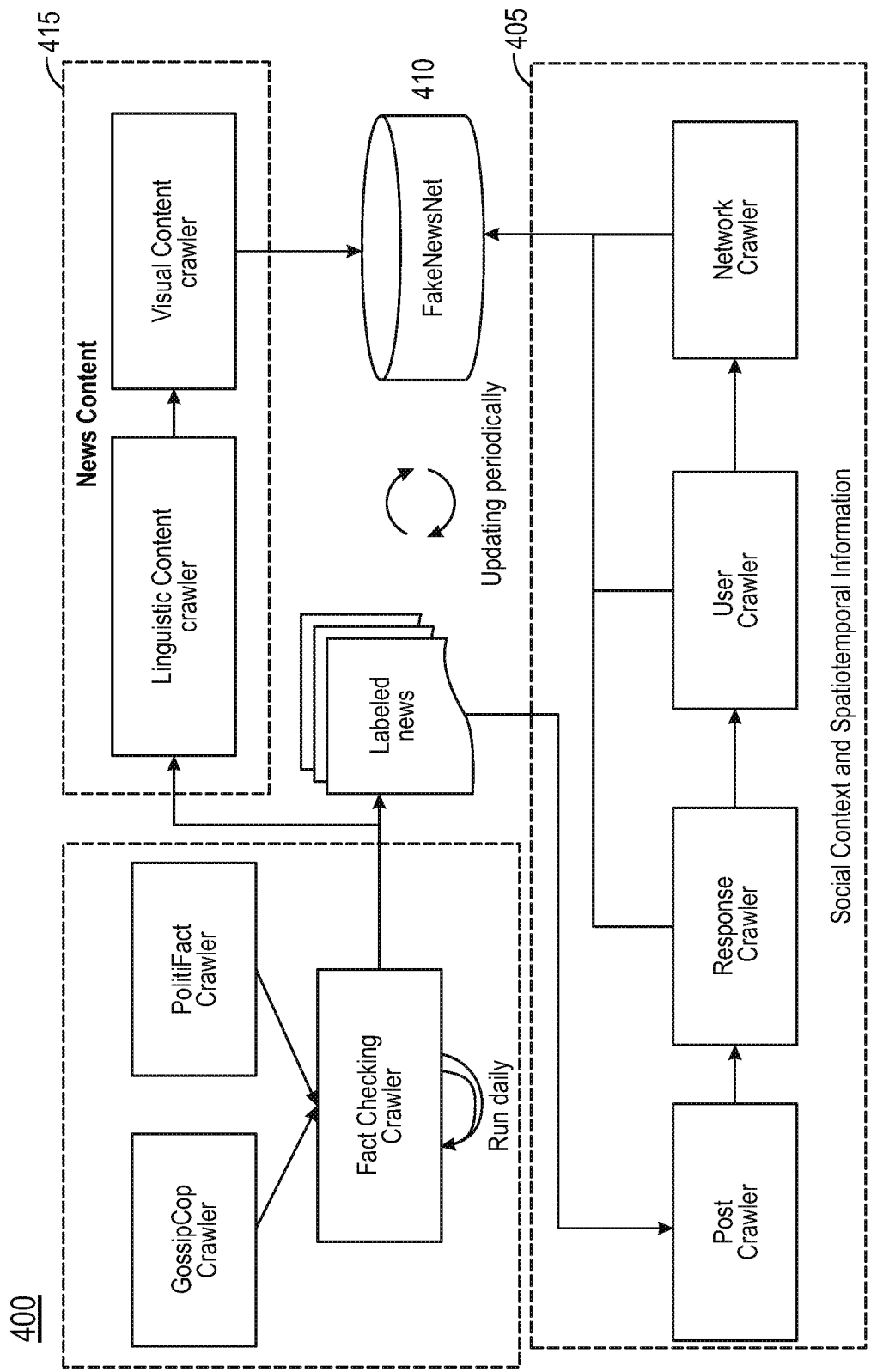
FIG. 4 is a functional block diagram for collecting news contents with reliable ground truth labels, and obtaining additional social media context and spatial temporal information, according to embodiments of the invention.

News Content: To collect reliable ground truth labels for fake news, with reference to FIG. 4, embodiments utilize fact-checking websites to obtain at 400 news content for fake news and real news such as PolitiFact and GossipCop. In PolitiFact, journalists and domain experts review the political news and provide fact-checking evaluation results to claim news articles as fake or real. Embodiments utilize these claims as ground truths for fake and real news pieces. In PolitiFact's fact-checking evaluation result, the source URLs of the web page that published the news articles are provided, which can be used to fetch the news content related to the news articles.

In some cases, the web pages of source news articles are removed and are no longer available. To solve this problem, embodiments i) check if the removed page was archived and automatically retrieve content at the Wayback Machine; and ii) make use of Google web search in an automated fashion to identify a news article that is most related to the actual news.

GossipCop is a website for fact-checking entertainment stories aggregated from various media outlets. GossipCop provides rating scores on a scale of 0 to 10 to classify a news story in degrees from fake to real. It is observed that almost 90% of the stories from GossipCop have scores less than 5, presumably because the primary purpose of GossipCop is to showcase more fake stories.

In order to collect real, or true, entertainment news pieces, one embodiment crawl the news articles from E! Online, which is a well-known trusted media website for publishing entertainment news pieces. One embodiment considers all the articles from E! Online as real news sources. One embodiment collects all the news stories from GossipCop with rating scores less than 5 as fake news stories.

Since GossipCop does not explicitly provide the URL of the source news article, embodiments search the news headline in Google or the Wayback Machine archive to obtain the news source information. The headline of the GossipCop story articles are generally written to reflect the actual fact and may not be used directly. For example, one of the headlines, "Jennifer Aniston NOT Wearing Brad Pitts Engagement Ring, Despite Report" mentions the actual fact instead of the original news articles title.

Embodiments utilize some heuristics to extract proper headlines such as i) using the text in a quoted string; ii) removing negative sentiment words. For example, some headlines include a quoted string which is the exact text from the original news source. In this case, embodiments extract the named entities through Stanford's CoreNLP tool from the headline, and quoted strings from the headline to form the search query. For example, in the headline Jennifer Aniston, Brad Pitt NOT "Just Married" Despite Report, embodiments extract named entities including Jennifer Aniston, Brad Pitt and quoted strings including Just Married and form the search query as "Jennifer Aniston Brad Pitt Just Married" because the quoted text in addition with the named entities mostly provides the context of the original news. As another example, the headline is written in the negative sense to correct the false information, e.g., "Jennifer Aniston NOT Wearing Brad Pitts Engagement Ring, Despite Report". So one embodiment removes negative sentiment words retrieved from SentiWordNet and some hand-picked words from the headline to form the search query, e.g., "Jennifer Aniston Wearing Brad Pitts Engagement Ring".

Social media context: The user engagements related to the fake and real news pieces from fact-checking websites are collected at 405 using a search API provided by social media platforms such as the Twitter's Advanced Search API. The search queries for collecting user engagements are formed from the headlines of news articles, with special characters removed from the search query to filter out the noise. After embodiments obtain the social media posts that directly spread news pieces, the embodiments further fetch the user response towards these posts such as replies, likes, and reposts. In addition, when embodiments obtain all the users engaging in news dissemination process, all the metadata for user profiles, user posts, and the social network information is also collected.

Spatiotemporal Information: includes spatial and temporal information. For spatial information, embodiments obtain the locations explicitly provided in user profiles. The temporal information indicates the timestamps of user engagements, which can be used to study how fake news pieces propagate on social media, and how the topics of fake news are changing over time. Since fact-checking websites periodically update newly coming news articles, embodiments dynamically collect these newly added news pieces and update the FakeNewsNet repository as well, at 410. In addition, embodiments keep collecting the user engagements for all the news pieces periodically in the FakeNewsNet repository such as the recent social media posts, and second order user behaviors such as replies, likes, and retweets. For example, one embodiment runs the news content crawler 415 and an update Tweet collector per day. The spatiotemporal information provides useful and comprehensive information for studying fake news problem from a temporal perspective.

B. Detecting Fake News

Detecting fake news can be a difficult task as, often times, fake news is intentionally written to falsify information. One embodiment of the invention provides a Social Article Fusion (SAF) model that uses the linguistic features of news content and features of social media context to classify fake news. This model formulates the fake news detection as a binary classification problem. A second embodiment exploits a tri-relationship between publishers, news, and social media engagements to detect fake news. A third embodiment examines the correlation between user profiles on social media and fake news. Each of these embodiments, in turn, is discussed below in sections B.1, B.2, and B.3.

B.1. Detecting Fake News Using Social Article Fusion

Figure 37:
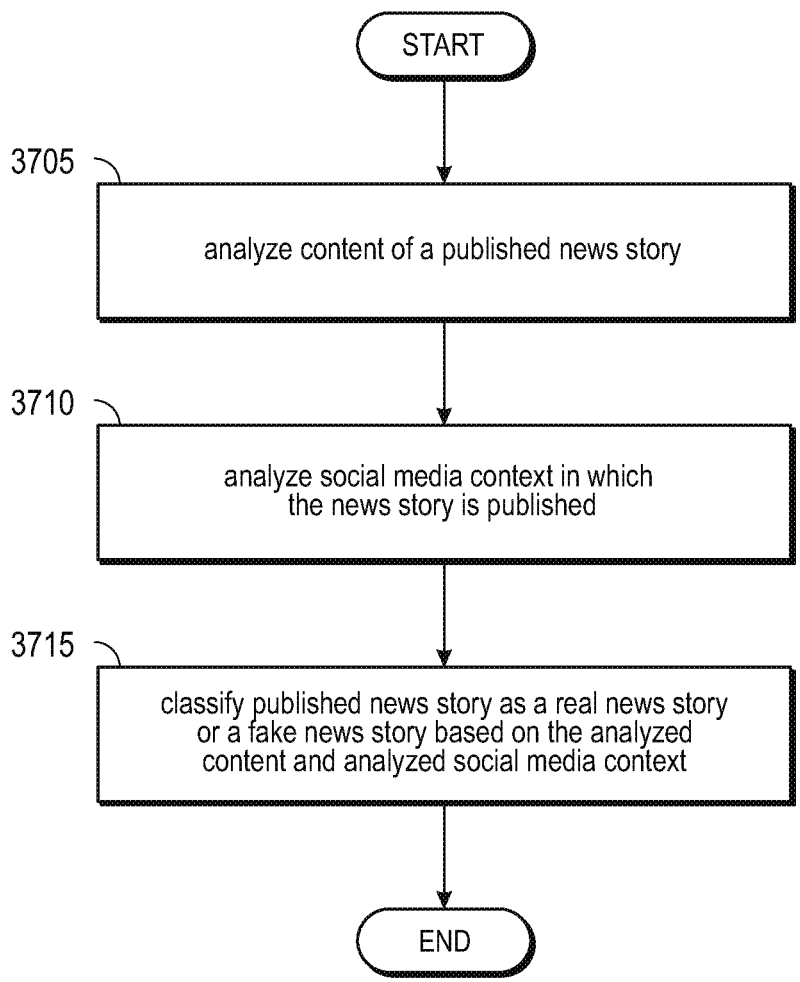
FIG. 37 is a flow chart, according to embodiments of the invention, for detecting fake news.

With reference to FIG. 37, embodiments of the invention 3700, as discussed in further detail below in this section, include logic for detecting fake news, comprising logic 3705 for analyzing content of a published news story; logic 3710 for analyzing a social media context in which the news story is published; and logic 3715 for classifying the published news story as one of a real news story and a fake news story based on the analyzed content and analyzed social media context.

Figure 38:
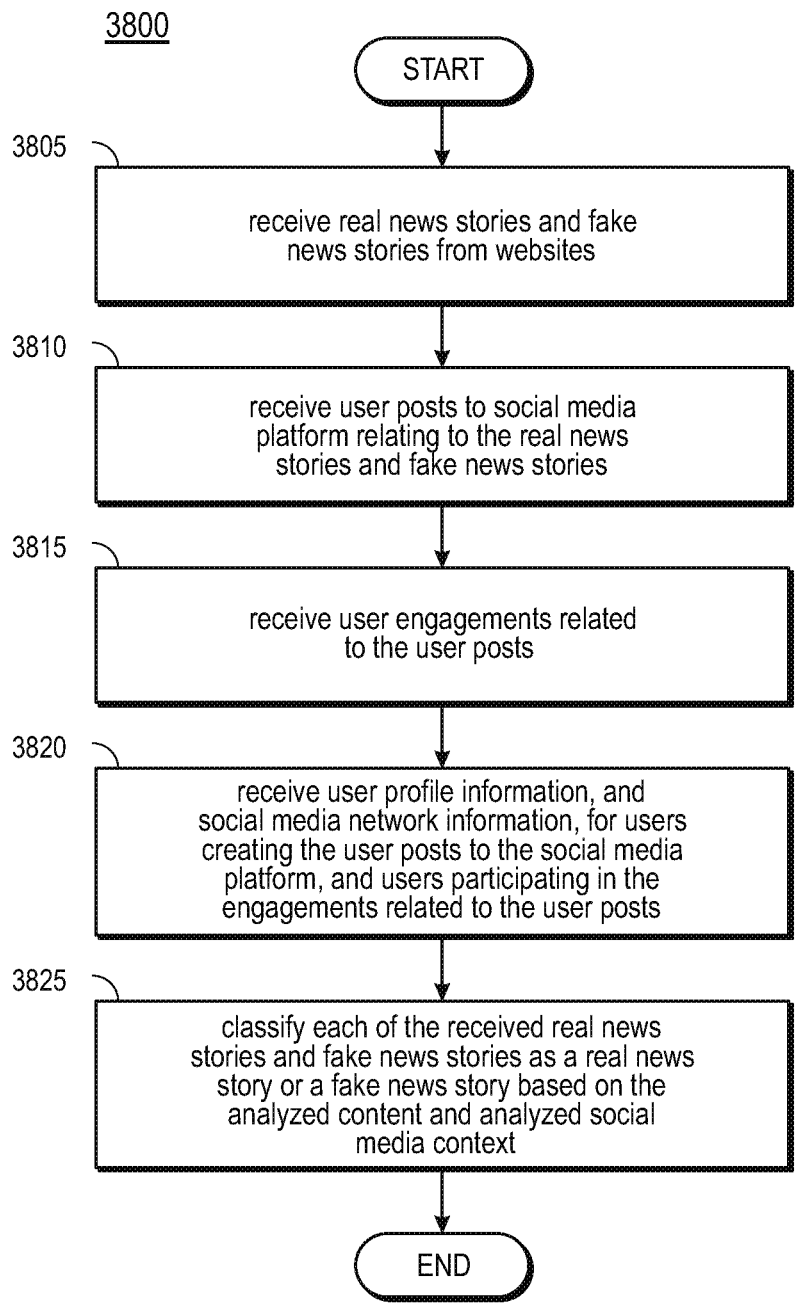
FIG. 38 is a flow chart, according to embodiments of the invention, for detecting fake news.

In particular, and with reference to FIG. 38, embodiments of the invention 3800 for detecting fake news comprises logic 3805 for receiving a plurality of allegedly real news stories and allegedly fake news stories from one or more websites; logic 3810 for receiving a plurality of user posts to a social media platform relating to the plurality of allegedly real news stories and allegedly fake news stories; logic 3815 for receiving a plurality of user engagements related to the plurality of user posts; logic 3820 for receiving user profile information, and social media network information, for users creating the plurality of user posts to the social media platform, and users participating in the engagements related to the plurality of user posts; and logic 3825 for classifying each of the received plurality of allegedly real news stories and allegedly fake news stories as one of a real news story and a fake news story based on an analysis of the content and the social media context.

In one embodiment, the logic 3810 for receiving the plurality of user posts to the social media platform relating to the plurality of allegedly real news stories and allegedly fake news stories comprises logic for collecting a plurality of user tweets on the Twitter social media platform relating to the allegedly real news stories and the allegedly fake news stories. In such an embodiment, the logic 3815 for receiving the plurality of user engagements related to the plurality of user posts comprises logic for collecting a plurality of user likes, replies, and retweets related to the plurality of user tweets.

B.1.1. News Representation Learning

Embodiments of the invention use linguistic features like news content to find the clues between fake news and real news. Although fake news is often times intentionally written to appear similar to fake news, studies have shown that the language style used to falsify information and the topic content could be a factor for determining fake news. For using the news content in a classification, embodiments of the invention use autoencoders to learn the news content in low dimensional latent feature space.

Auto-encoders are widely used to represent the text content in lower dimensional space. Likewise, embodiments of the invention use auto encoder to capture the text content of a news article in a lower dimensional space z. Given a new article text document $X=\{x^1, x^2, \ldots, x^m\}$ where $x^i$ is the $i^{th}$ word in the document, embodiments of the invention find the representation $z \in \mathbb{R}^{k \times 1}$. The encoder E: X→Z learns a mapping function to map an input document to the lower dimensional space z. The decoder D=Z→X learns the mapping to reconstruct the original document from the representation z.

The encoder network takes an input word at each time stamp and produces an output and the hidden state of the last timestamp represents the content representation z. The decoder receives the output from time stamp t−1 and the previous timestamp's hidden state for predicting the word at time stamp t. The output of the decoder is given as $$s_t = f_{dec}(s_{t-1}, \hat{x}_t)$$

where $s_{t-1}$ is the hidden state of the decoder at time t and $s_0 = z$ and $\hat{x}_t$ is the output symbol from the timestamp t−1 which becomes to the decoder at time t. The output of the decoder is fed to a fully connected dense layer for mapping it to one of the words in the vocabulary and it produces an output $y_t \in \mathbb{R}^{|v| \times 1}$ at time stamp t.

The autoencoder tries to minimize the reconstruction error from representation z to the original document X. The reconstruction error is given by $$\mathcal{L}_{AE} = L(x, D(E(x)))$$

Embodiments of the invention use cross entropy as the loss function. The cross-entropy error for the reconstruction of the document is given as $$\mathcal{L}_{AE} = \sum_{i}^{m} (y^i(\log(y_t^i)) - (1 - y^i)(\log(1 - y_t^i)))$$

B.1.2. Social Media Engagement Learning

Social media engagements are analyzed as part of the fake news detection task according to embodiments of the invention. Social media context provides valuable information about how users interact with the fake news and the true news. The interactions of the users on social media change over a period of time. To capture the temporal engagements of the users with the fake news, embodiments of the invention use Recurrent Neural Networks (RNN). Studies have shown that RNNs perform efficiently for capturing the temporal relationships and hence embodiments of the invention use RNN. Social media engagements like tweets and their replies are embedded in a certain format by the embedding layer before input to the network. The output of the RNN is considered as the social media context feature for classification. Long Short-Term Memory (LSTM) is used in embodiments as it solves the long-range dependencies and vanishing gradient problem.

Social media engagements involve users interacting with a news article over a period of time. In order to capture the user information for users who engaged with the news article, embodiments of the invention perform Singular Value Decomposition (SVD) on a user-news engagement matrix $E \in \mathbb{R}^{u \times a}$ where $E_{ij}=1$ if there is engagement by user i on the article j and $E_{ij}=0$ when there is no engagement by the user i on the article of j. Embodiments of the invention decompose the engagement matrix using SVD as follows:

$$E = U\Sigma V$$

Here, U is the latent user feature that captures the user article engagement matrix. The text content in the social media engagement provides useful information as a user may provide their viewpoint on the news articles. The text content is represented using the doc2vec algorithm, implemented in genism, an open-source library for unsupervised topic modeling and natural language processing, according to an embodiment.

B.1.3. Social Article Fusion

Figure 5:
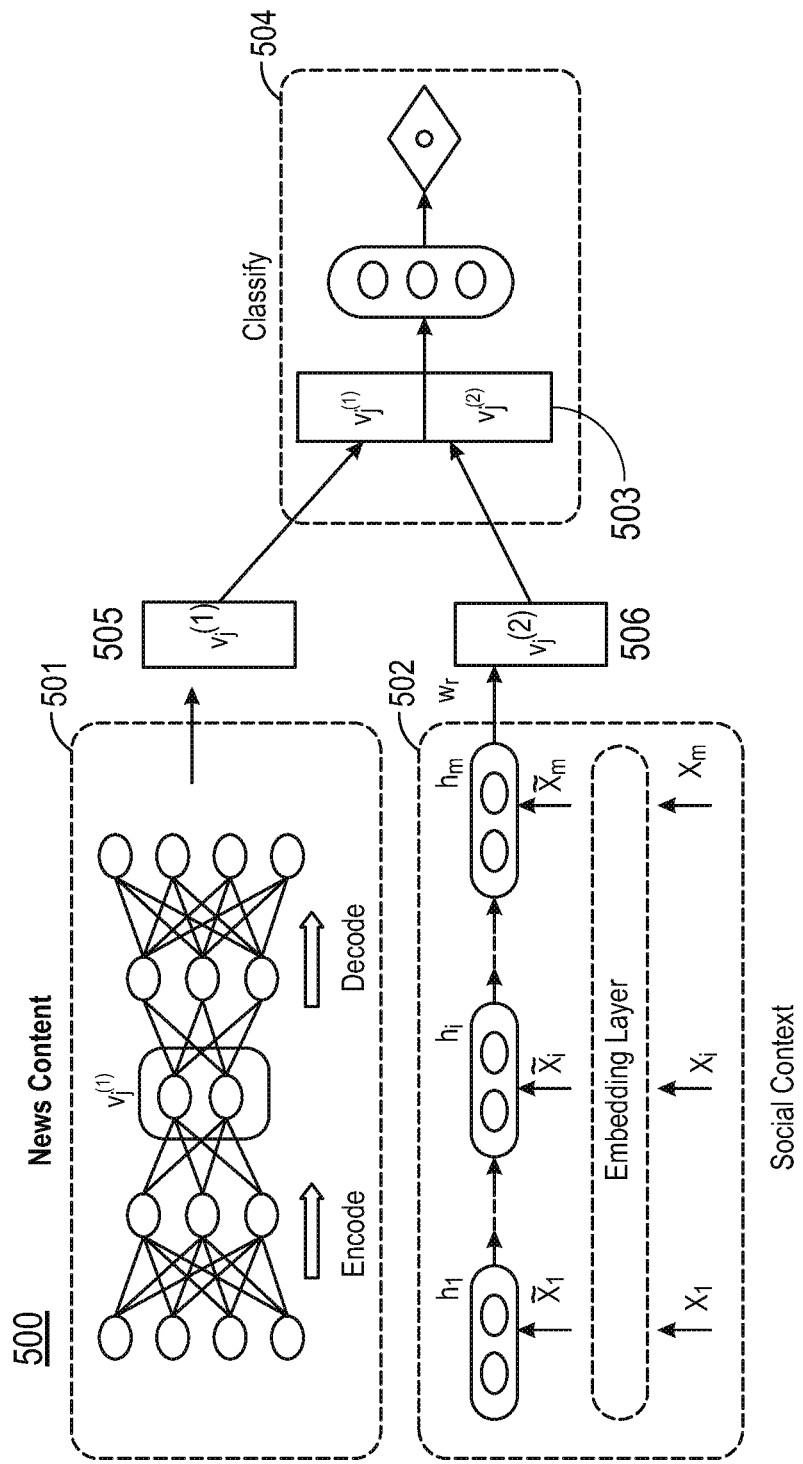
FIG. 5 illustrates a fake news detection model that integrates both news content and social media context into a coherent model to learn news feature for prediction according to embodiments of the invention.

With reference to FIG. 5, the Social Article Fusion model 500 combines at 503 the features 505 and 506 respectively generated by the auto-encoder 501 and social media context recurrent neural network 502 and concentrates them together to form a single concatenated feature vector $V_j$ for the classification at 503. Then weights are learned to map the combined features to classified labels. A softmax layer is used to classify the news articles in the output layer. The output of the SAF network is given by $$y_o = \text{softmax}(WV_j)$$

Embodiments of the invention train both the feature learning and classification tasks together so that the features are learned relative to the detection task rather than capturing plain linguistic differences and social media engagements. Embodiments of the invention use cross entropy as loss function for output prediction and it is given by $$\mathcal{L}_{pred} + (y_{label}^i(\log(y_o^i)) - (1 - y_{label}^i)(\log(1 - y_o^i))$$

Embodiments of the invention optimize the following loss function with regularization on the concatenated features in order to avoid overfitting.

$$\text{Loss} = \mathcal{L}_{pred} + \mathcal{L}_{AE} + \sum_{i=1}^{n} V_i^2$$

B.1.4. Experiments with Social Article Fusion

The following discussion presents the experimental results to evaluate the effectiveness of the Social Article Fusion model described above. Also, the following discussion attempts to answer the following questions through an evaluation.

1. Can social media data be used for the fake news detection tasks?
2. Can embodiments of the invention learn representation of the text content and social media engagements that could be effectively used for the fake news detection tasks?

B.1.4.1. Data

The dataset for the experiment is collected using the approach mentioned above. Embodiments of the invention collected the data from the fake checking websites in a streaming manner and search in Twitter for any social media engagements related to the news pieces. Also, second order engagements including favorites, retweets and replies are collected for recent tweets on a periodic basis to get comprehensive temporal engagements on the previously collected tweets. From the table in FIG. 6 it can be seen that there is rich social media information available from the dataset collected which could be further explored in different manners.

B.1.4.2. Experimental Design

In an experiment setting, for training the news article content, one embodiment of the invention sets a maximum threshold on the sequence length as a hyper-parameter with values at 100 because of long range dependencies problem in the RNN. In the encoder, embodiments of the invention use deep LSTMs with 2 layers with 100 cells at each layer and 200-dimensional word embeddings with an input vocabulary of 5000 words. Similarly, for the decoder embodiments of the invention have 2 layers of LSTMs with 100 cells in each layer. The word embeddings are randomly initialized and they are learned along with the network.

Similarly, for the social media engagements embodiments of the invention set a threshold of 100 engagements and selected the engagements based on a priority. For the twitter engagements, embodiments of the invention give first priority to the second order engagements like replies because they provide more useful information to identify fake news as users are more likely to provide their opinions on the news article that first level engagement where a user usually shares an article link. For social media context network, embodiments of the invention use a similar network architecture as used for the encoder.

B.1.4.3. Fake News Detection Performance Using SAF

To understand the importance of the social media and news context in the fake news detection task, experiments were conducted with embodiments of the invention, with some variations of the framework, detailed as follows.

SAF/S: which uses only news article content.
SAF/A: which utilizes only social media context.
SAF: which exploits both news article contents and social media engagements.

Figure 8:
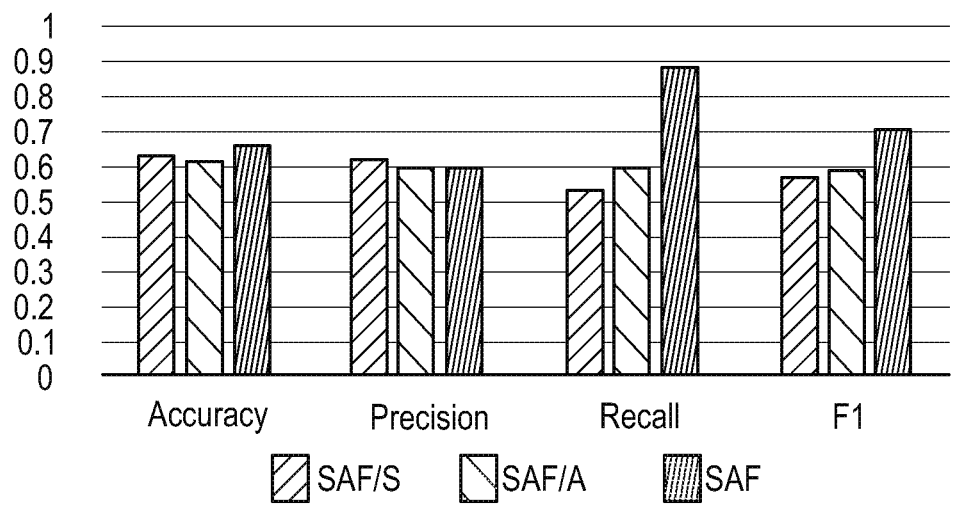
FIG. 8 is a graphic representation of performance comparison of fake news detection according to an embodiment of the invention.
Figure 9:
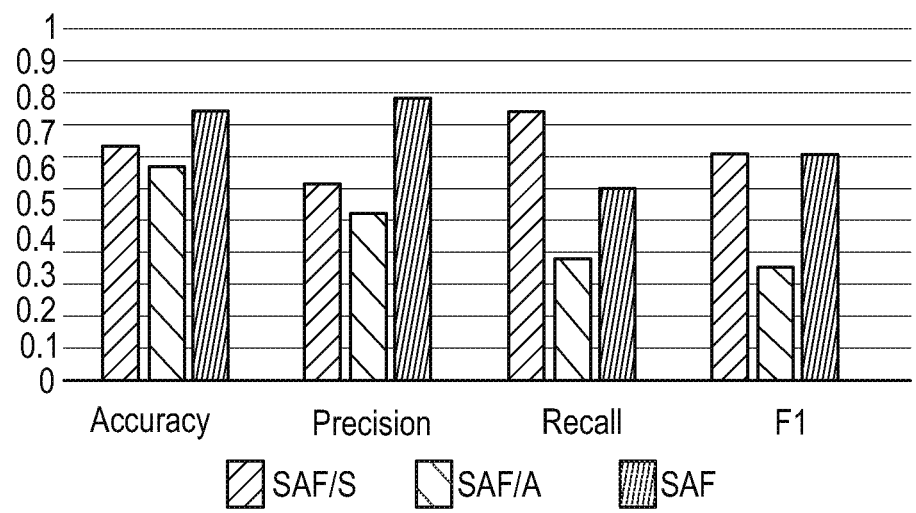
FIG. 9 is a graphic representation of performance comparison of fake news detection according to an embodiment of the invention.

With reference to the table in FIG. 7, and the graphs in FIG. 8 and FIG. 9, embodiments of the invention interpret the importance of each feature in the detection task. It is observed there is an improvement in performance in the PolitiFact dataset (FIG. 8) and the BuzzFeed dataset (FIG. 9) when both the news article content and social media context are used. From this, embodiments of the invention answer the first question that the social media engagements could be used to detect fake news.

To answer the second question, the features are learned in a semi supervised manner in the SAF setting. The concatenated feature vector from SAF network is taken as the learned feature for the classification task. To test the quality of the learned features, embodiments of the invention perform the classification task using the learned feature with standard machine learning algorithms like Support Vector Machine, Logistic Regression and Naïve Bayes. With reference to the table in FIG. 10, embodiments of the invention observe that the features learned are a good representation with respect to the classification of the fake news articles. Thus, embodiments of the invention learn features from the SAF network for the classification task.

Figure 39:
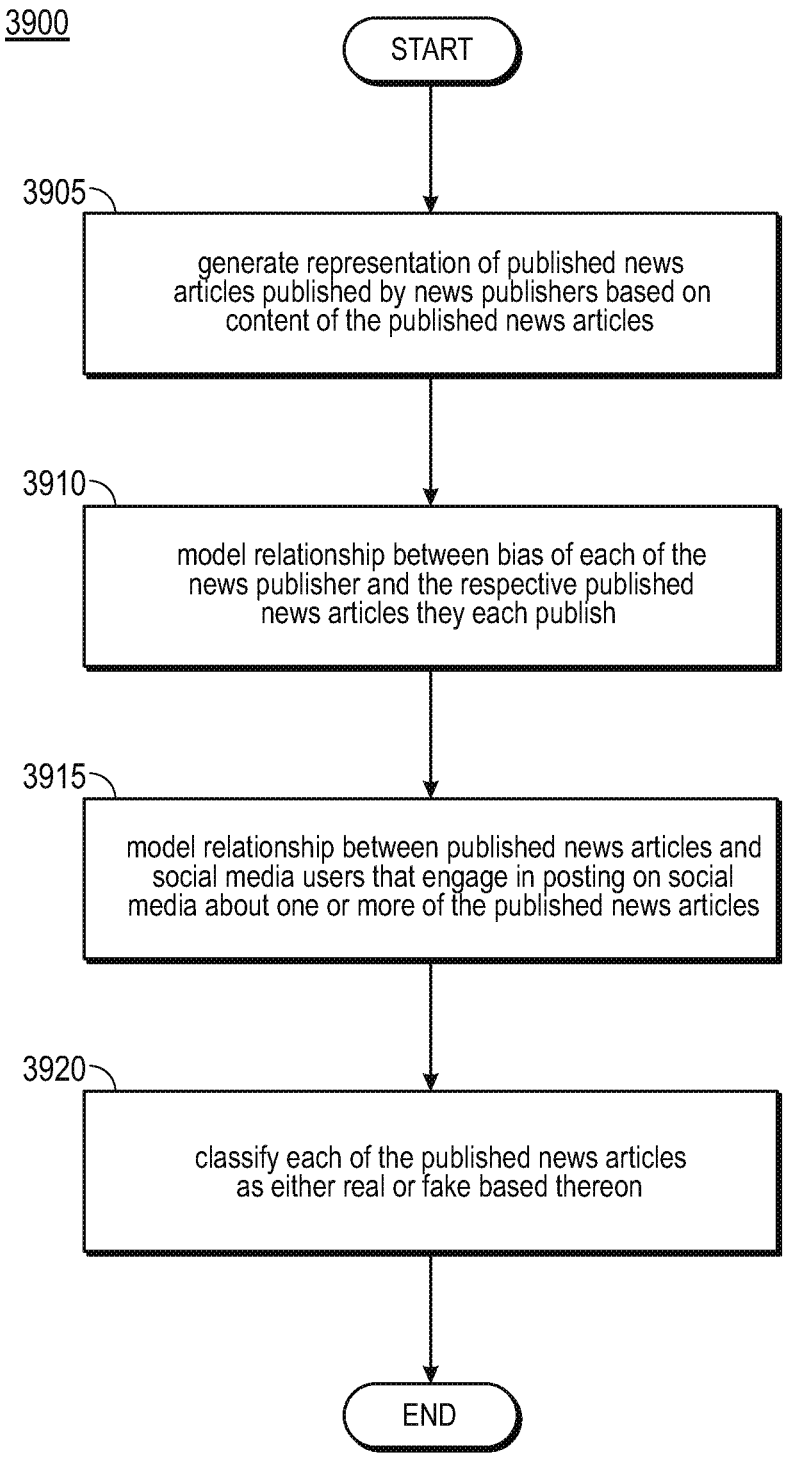
FIG. 39 is a flow chart, according to embodiments of the invention, for detecting fake news.

B.2. Detecting Fake News Based on Relationships Between Publishers, News, and Social Media Users With reference to FIG. 39, embodiments of the invention 3900, as discussed in further detail below in this section, include logic for detecting fake news, comprising logic 3905 to generate a representation of published news articles published by news publishers based on the content of the published news articles. Logic 3910 then models a relationship between a bias of each of the news publishers and the respective published news articles they each publish. Logic 3915 then models a relationship between the published news articles and social media users that engage in posting on social media about one or more of the published news articles. Finally, logic 3920 classifies each of the published news articles as either real or fake based on the generated representation of the published news articles, the modeled relationship between the bias of each of the news publishers and the respective published news articles they publish, and the modeled relationship between the published news articles and the social media users that engage in posting on social media about one or more of the published news articles.

In one embodiment, logic 3915 for modeling the relationship between the published news articles and social media users that engage in posting on social media about one or more of the published news articles includes logic to identify and encode a correlation between a credibility score for a social media user and the one or more published news articles posted on social media by the social media user. The social media user's credibility score is calculated, according to one embodiment, by examining content generated on social media by the social media user, detecting and grouping the social media user together with other social media users in a cluster based on similarities between the social media user and the other social media users that engage with the social media user, weighing the cluster based on cluster size, and calculating the social media user's credibility score based on the examined content, the cluster in which the social media user is grouped, and the weight of the cluster.

In one embodiment, logic 3915 for modeling the relationship between the published news articles and social media users that engage in posting on social media about one or more of the published news articles comprises logic for modeling a relationship between the published news articles and social media users that engage in posting on social media about one or more of the published news articles, without the social media user providing any comment about the posted one or more published news articles, thus inferring the social media user agrees with the content of the published news article about which they posted.

Embodiments of the invention explore the correlations of news publisher bias, news stance, and relevant user engagements simultaneously, and provide a Tri-Relationship Fake News detection framework (TriFN). Two comprehensive real-world fake news datasets were used in experiments to demonstrate the effectiveness of the TriFN embodiment, as further described below.

Figure 11:
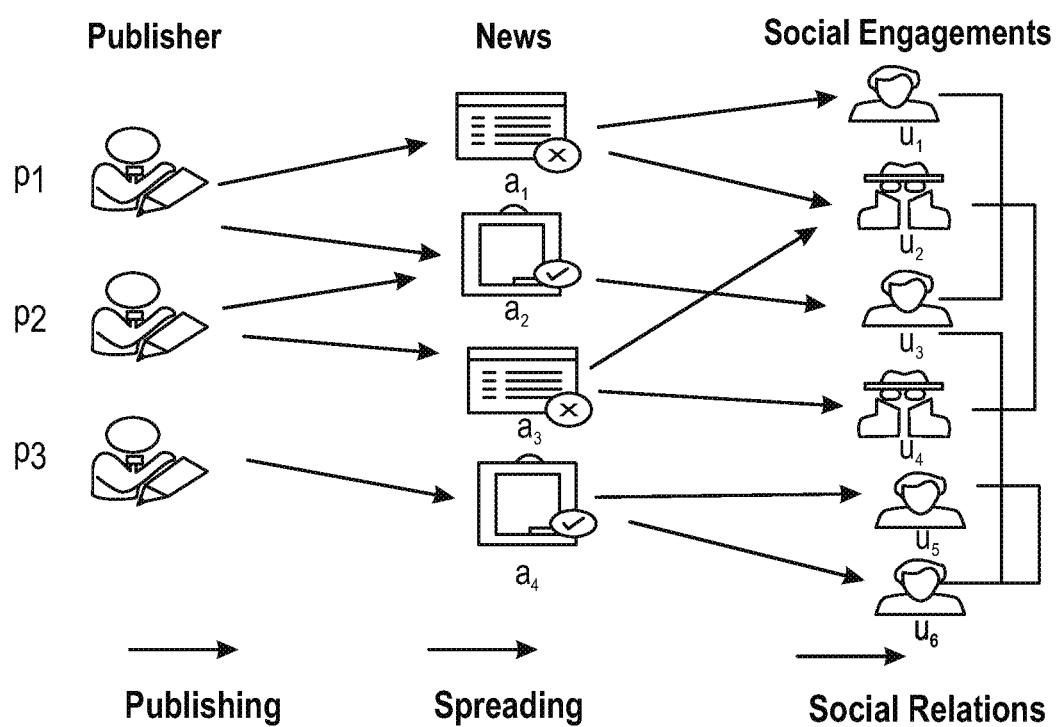
FIG. 11 depicts the tri-relationship among publishers, news pieces, and social media users for a news dissemination ecosystem according to embodiments of the invention.

The news ecosystem on social media involves three basic entities, i.e., news publisher, news content, and social media users. FIG. 11 illustrates such an ecosystem. In FIG. 11, $p_1$, $p_2$ and $p_3$ are news publishers who publish news articles $a_1, \ldots, a_4$, and $u_1, \ldots, u_5$ are users who have engaged in posting these news articles on a social media network or platform. In addition, users with similar interests can also form social media links with the users who posted the news articles. This tri-relationship among publishers, news, and social media engagements contains additional information to help detect fake news.

First, sociological studies on journalism have theorized the correlation between the partisanship bias of news publishers and the veracity of the news content they publish, where partisanship in this case means the perceived or actual bias of the publisher in the selection of how news is reported and covered. For example, in FIG. 11, for news publisher $p_1$ with extreme left partisanship bias and news publisher $p_2$ with extreme right partisanship bias, to support their own partisanship bias, they have a higher degree of motivation to report fake news, such as articles $a_1$ and $a_3$, denoted as fake by the presence of a circled "x" label applied to the lower right corner of the news article icons representing articles $a_1$ and $a_3$; while a mainstream publisher $p_3$ that presumably has the least partisanship bias, has a lower degree of motivation to manipulate news events, and is more likely to write a true, or real, news article $a_4$, as indicated by the presence of a check mark applied to the lower right corner of the news article icons representing news articles $a_2$ and $a_4$. Thus, detecting and exploiting publisher partisanship information can bring additional benefits to predicting fake news.

Second, mining user engagements on social media relating to the news also helps fake news detection. Different users have different credibility levels on social media, and a user's credibility score which means "the quality of being trustworthy" is a strong indication of whether the user is more likely to engage in fake news or not. Those less credible users, such as malicious accounts or users who are vulnerable to fake news, are more likely to spread fake news. For example, uses $u_2$ and $u_4$ are users with low credibility scores, and they tend to spread fake news more than other higher credibility users. In addition, users tend to form relationships with like-minded people. For example, users $u_5$ and $u_6$ are friends on social media, so they tend to engage with those news articles that confirm their own views, such as news article $a_4$.

Publisher partisanship information can bridge the publisher-news relationship, while social media engagements can capture the news-user relationship. In other words, they provide complementary information that improves fake news prediction. Thus, one embodiment integrates these two components and models the tri-relationship simultaneously.

Embodiments of the invention address the following challenges: (1) how to mathematically model the tri-relationship to extract news feature representations; and (2) how to take the advantage of tri-relationship learning for fake news detection. In an attempt to address these challenges, embodiments of the invention provide a novel framework, termed TriFN, which captures the Tri-relationship for Fake News detection. The main components are:

a principled way to model the tri-relationship among publishers, news, and relevant user engagements simultaneously; and a novel framework, TriFN, that exploits the tri-relationship for fake news prediction.

Effectiveness of the framework for fake news detection was demonstrated through extensive experiments on newly collected real-world datasets, as further described below.

Even though fake news has existed for long time, there is no commonly agreed definition. This embodiment of the invention adheres to the following definition of fake news used in recent research, which has been shown to be able to 1) provide theoretical and practical values for fake news topics; and 2) eliminate the ambiguities between fake news and related concepts: fake news is a news article that is intentionally and verifiably false. With this narrow definition in mind according to this embodiment:

Let $\mathcal{A} = \{a_1, a_2, \ldots, a_n\}$ be the set of n news articles and $\mathcal{U} = \{u_1, u_2, \ldots, u_m\}$ be the set of m users on social media engaging the news spreading process. Embodiments of the invention denote $X \in \mathbb{R}^{n \times t}$ as the news feature matrix. Users can become friends with other users. Embodiments of the invention use $A \in \{0, 1\}^{m \times m}$ to denote the user-user adjacency matrix. On social media sites, users can easily share, comment and discuss the news pieces. These kind of social media engagements provide auxiliary information for fake news detection. Embodiments of the invention denote the social media news engagement matrix as $W \in \{0, 1\}^{m \times n}$, where $W_{ij} = 1$ indicate that user $u_1$ has engaged in the spreading process of the news piece $a_j$; otherwise $W_{ij} = 0$. Embodiments of the invention focus on those engagements that show that users agree with the news. For example, embodiments of the invention utilize those users that directly post the news, or repost the news without adding comments. Embodiments of the invention also denote $\mathcal{P} = \{p_1, p_2, \ldots, p_l\}$ as the set of l news publishers. In addition, embodiments of the invention denote $B \in \mathbb{R}^{l \times n}$ as the publisher-news relation matrix, and $B_{kj} = 1$ means news publisher $p_k$ publishes the news article $a_j$; otherwise $B_{kj} = 0$. Embodiments of the invention assume that the partisanship labels of some publishers are given and available. Embodiments of the invention define $o \in \{-1, 0, 1\}^{l \times 1}$ as the partisanship label vectors, where -1, 0, 1 represents left-, neutral-, and right-partisanship bias.

Embodiments of the invention treat the fake news detection problem as a binary classification problem. In other words, each news piece can be classified as either true (real) or fake, and embodiments of the invention use $y = \{y_1; y_2; \ldots; y_n\} \in \mathbb{R}^{n \times 1}$ to represent the labels, and $y_j = 1$ means news piece $a_j$ is fake news; $y_j = -1$ means real, or true, news. With the notations given above, the problem is formally defined as:

given a news article feature matrix X, user adjacency matrix A, user social media engagement matrix W, publisher-news publishing matrix B, publisher partisanship label vector o, and a partial labeled news vector $y_L$, embodiments of the invention predict the remaining unlabeled news label vector $y_U$.

B.2.1. A Tri-Relationship Embedding Framework

Figure 12:
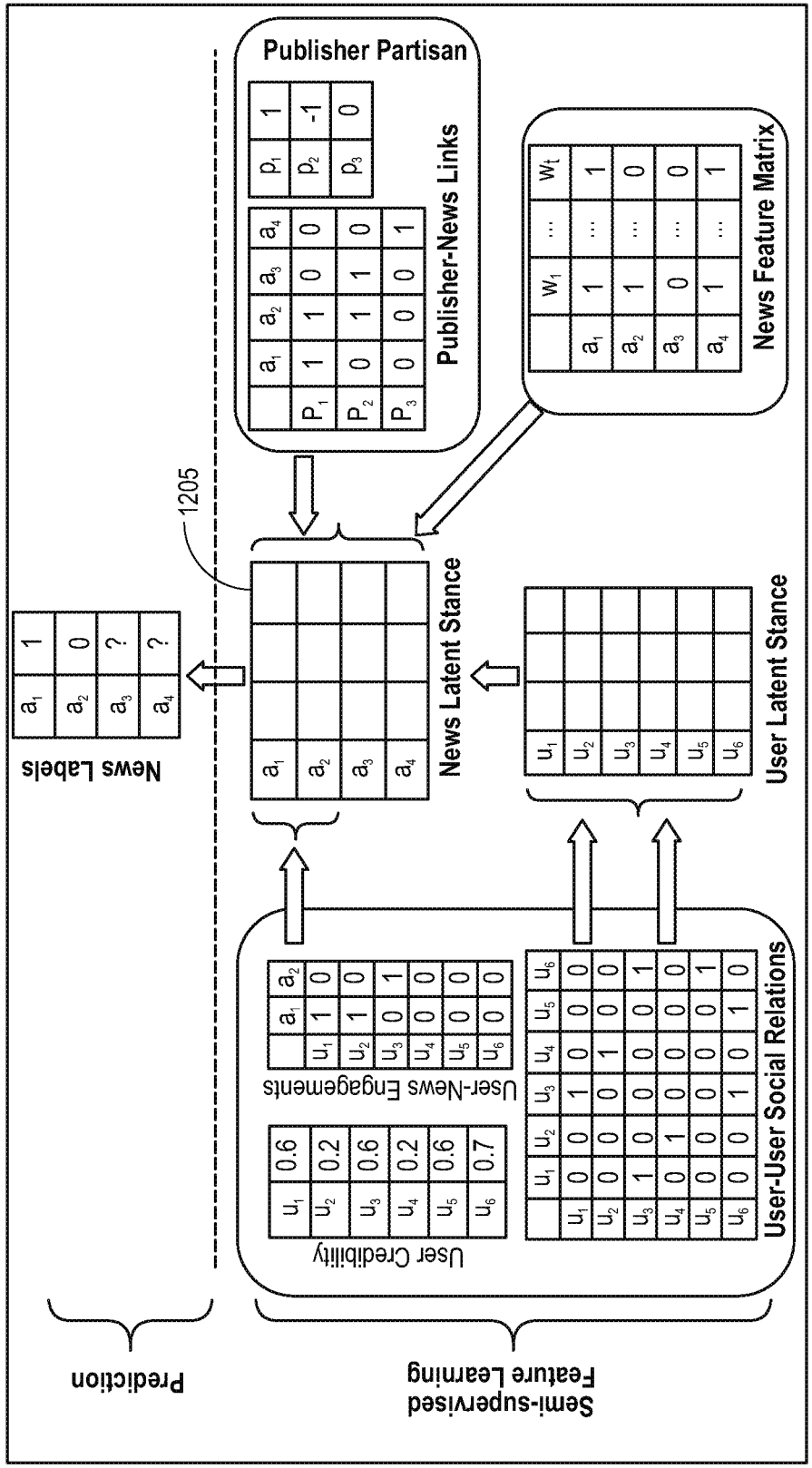
FIG. 12 depicts a tri-relationship embedding framework according to embodiments of the invention.

Embodiments of the invention provide a semi-supervised detection framework by exploiting the tri-relationship. The overall concept of modeling the tri-relationship is illustrated in FIG. 12. Specifically, embodiments of the invention 1200 first introduce the news latent feature embedding from news content, and then show how to model user social media engagements and publisher partisanship separately. At last, embodiments of the invention integrate the components to model the tri-relationship and provide a semi-supervised detection framework.

B.2.1.1. A Basic Model for News Content Embedding

The inherent manipulators of fake news can be reflected in the news content. Thus, it is important to extract basic feature representation from news text. Recently it has been shown that shown that nonnegative matrix factorization (NMF) algorithms are very practical and popular to learn document representations. Such algorithms try to project the document-word matrix to a joint latent semantic factor space with low dimensionality, such that the document-word relations are modeled as an inner product in the space. Specifically, giving the news-word matrix $X \in \mathbb{R}_+^{n \times t}$ NMF methods try to find two nonnegative matrices $D \in \mathbb{R}_+^{n \times d}$ and $V \in \mathbb{R}_+^{t \times d}$ by solving the following optimization problem.

$$\min_{D, V \geq 0} \|X - DV^T\|_F^2 + \lambda(\|D\|_F^2 + \|V\|_F^2)$$

where d is the dimension of the latent topic space. In addition, D and V are the nonnegative matrices indicating low-dimensional representations of news and words. Note that embodiments of the invention denote $D = [D_L; D_U]$, where $D_L \in \mathbb{R}^{r \times d}$ is the news latent feature matrix for labeled news: while $D_U \in \mathbb{R}^{(n-r) \times d}$ is the news latent feature matrix for unlabeled over-fitting. The term $\lambda(\|D\|_F^2 + \|V\|_F^2)$ is introduced to avoid over-fitting. With the basic model for news latent representation, embodiments of the invention model i) the relationship between news and user social media engagements, and ii) the relationship between news and publisher partisanship.

B.2.1.2. News—Social Media Users Engagements Embedding

The social media engagements of users relating to news articles have added value to guide the learning process of news latent features. Specifically, as shown in block 1205 in FIG. 12, embodiments of the invention explore i) user-user social media relations that are used to learn the basic user latent features: and ii) user-news engagement relations that encode the correlations between users' credibility and news features guided by news veracity labels.

Basic User Feature Representation. On social media, people tend to form relationship with like-minded friends, rather than those users who have opposing preferences and interests. Thus, users that are connected are more likely to share similar latent interests towards news pieces. Embodiments of the invention use nonnegative matrix factorization (NMF) method to learn the user latent representations. Specifically, giving user-user adjacency matrix $A \in$ $\{0, 1\}^{m \times m}$, embodiments of the invention learn nonnegative matrix $U \in \mathbb{R}_+^{n \times d}$ by solving the following optimization problem, $$\min_{U, T \geq 0} \|Y \odot (A - UTU^T)\|_V^2 + \lambda(\|D\|_F^2 + \|T\|_F^2)$$

where U is the user latent matrix, $T \in \mathbb{R}_+^{d \times d}$ is the user-user correlation matrix, and $Y \in \mathbb{R}^{m \times m}$ controls the contribution of A. Since only positive samples are given in A, embodiments first set Y=sign(A) and then perform negative sampling and generate the same number of unobserved links and set weights as $\lambda(\|U\|_F^2 + \|T\|_F^2)$ is to avoid over-fitting.

In regard to capturing relations of user engagements and news, user engagements of news on social media provides rich auxiliary information to help detect fake news. However, users can express rather different and diverse opinions toward the news when spreading it, such as agreeing with the news, expressing an opinion against the news, or expressing an opinion that offers a neutral stance. Embodiments of the invention focus on those engagements that agree with the news which can be directly implied in, or by, a user's actions. For example, embodiments of the invention only utilize those users that directly post the news, or repost the news without adding comments. Those users that have different opinions are usually unavailable and needed to be inferred.

To model the user engagements, embodiments of the invention consider the inherent relationship between the credibility of users and their posted/shared news pieces. Intuitively, embodiments of the invention assume that users with low credibility are more likely to spread fake news, while users with high credibility are less likely to spread fake news. For example, low credibility users could be users that 1) aim to spread the diffusion scope of fake news; or 2) are susceptible to fake news. Embodiments of the invention adopt various methods to measure user credibility scores. The basic idea is that less credible users are more likely to coordinate with each other and form big clusters, while more credible users are likely to form small clusters. Thus, basically, the credibility scores are measured through the following steps: 1) detect and cluster coordinate users based on user similarities; 2) weight each cluster based on the cluster size. Note that for a fake news detection task, embodiments of the invention do not assume that credibility is directly provided but infer the credibility score from widely available data, such as user-generated content.

Each user has a credibility score, and embodiments of the invention use $c = \{c_1, c_1, \ldots, c_m\}$ to denote the credibility score vector, where a larger $c_j \in [0, 1]$ indicates that user $u_j$ has a higher credibility. Since the latent features for low-credibility users are close to fake news latent features, while those of high credibility users are close to true news latent features, embodiments of the invention solve the following optimization problem, $$\min \underbrace{\sum_{i=1}^m \sum_{j=1}^r W_{ij} c_i \left(1 - \frac{1 + y_{L_j}}{2}\right) \|U_i - D_{L_j}\|_2^2}_{\text{True news}} + \underbrace{\sum_{i=1}^m \sum_{j=1}^r W_{ij} (1 - c_i) \left(\frac{1 + y_{L_j}}{2}\right) \|U_i - D_{L_j}\|_2^2}_{\text{Fake news}} \quad (3)$$

where $y_L \in \mathbb{R}^{r \times 1}$ is the label vector of all partial labeled news. Embodiments of the invention consider two situations: i) for true news, i.e., $y_{L_j}=-1$, embodiments of the invention ensure that the latent features of high credibility users are close to the true news latent features; ii) for fake news, i.e., $y_{L_j}=1$, embodiments of the invention ensure that the latent features of low-credibility users are close to the fake news latent features. For simplicity, equation (Eqn) 3 can be rewritten as, $$\min \sum_{i=1}^m \sum_{j=1}^r G_{ij} \|U_i - D_{L_j}\|_2^2 \quad (4)$$

$$\text{where } G_{ij} = W_{ij}\left(c_i\left(1 - \frac{1 + y_{L_1}}{2}\right) + (1 - c_i)\left(\frac{1 + y_{L_1}}{2}\right)\right).$$

If embodiments of the invention denote a new matrix $H=[U; D_L] \in \mathbb{R}^{(m+r) \times d}$, also rewrite Eqn. 4 as a matrix form as below, $$\min \sum_{i=1}^m \sum_{j=1}^r G_{ij} \|H_i - H_j\|_2^2 \Leftrightarrow \quad (5)$$

$$\min \sum_{i,j=1}^{m+r} F_{ij} \|H_i - H_j\|_2^2 \Leftrightarrow \min tr(H^T L H)$$

where L=S−F is the Laplacian matrix and S is a diagonal matrix with diagonal element $S_{ii} = \sum_{j=1}^{m+r} F_{ij}$. $F \in \mathbb{R}^{(m+r) \times (m+r)}$ is computed as follows, $$F_{ij} = \begin{cases} 0, & i, j \in [1, m] \text{ or } i, j \in [m+1, m+r] \\ G_{i(j-m)}, & i \in [1, m], j \in [m+1, m+r] \\ G_{(i-m)j}, & i \in [m+1, m+r], j \in [1, m] \end{cases} \quad (6)$$

B.2.1.3. News Publisher Partisanship Modeling

The partisanship preference of news publishers are usually not explicitly available. Embodiments of the invention obtain the list of publishers' partisanship labels from a well-known media bias fact checking website such as Media Bias/Fact Check (MBFC—//mediabiasfactcheck.com). The partisanship labels are checked with a principled methodology that ensures the reliability and objectivity of the partisanship annotations. The labels are categorized as five categories: "left", "left-Center", "least biased", "Right-Center" and "Right". To further ensure the accuracy of the labels, some embodiments of the invention only consider those news publishers with the annotations ["left", "least-biased", "Right"], and rewrite the corresponding labels as [−1, 0, 1]. Thus, embodiments of the invention can construct partisanship label vectors for news publishers as o.

Fake news is often written to convey opinions or claims that support the partisanship of the news publisher. Thus, a good news representation should be good at predicting the partisanship of a publisher. This information can be used to guide the learning process of news representation. As depicted in the area 1210 in FIG. 12, the basic idea is to utilize publisher partisanship labels vector $o \in \mathbb{R}^{l \times 1}$ and publisher-news matrix $B \in \mathbb{R}^{l \times 1}$ to optimize the news feature representation learning. Specifically, embodiments of the invention optimization following objective, $$\min \|\bar{B}DQ - o\|_2^2 + \Delta \|Q\|_2^2 \quad (7)$$

where embodiments of the invention assume that the latent feature of news publisher can be represented by the features of all the news it published, i.e., $\bar{B}D$. The term $\bar{B}$ is the normalized user-news publishing relation matrix, i.e.

$$\bar{B}_{kj} = \frac{B_{kj}}{\sum_{j=1}^{n} B_{kj}}, Q \in \mathbb{R}^{d \times 1}$$

is the weighting matrix that maps news publishers' latent features to corresponding partisanship label vector o. Note that embodiments of the invention only consider those news publishers that have been fact-checked and have partisanship labels in this regularization term.

B.2.1.4. Framework—TriFN

Embodiments of the invention learn news latent features by modeling different aspects of the tri-relationship. Embodiments of the invention further employ a semi-supervised linear classifier term to further guide the learning process of news latent features as, $$\min \|D_L P - y_L\|_2^2 + \lambda \|P\|_2^2 \quad (8)$$

where $P \in \mathbb{R}^{d \times 1}$ is the weighting matrix that maps news latent features to fake news labels. With all previous components, TriFN solves the following optimization problem, $$\min_{\theta} \underbrace{\|X - DV^T\|_F^2}_{\text{News Feature Learning}} + \quad (9)$$

$$\underbrace{\alpha \|Y \odot (A - UTU^T)\|_F^2}_{\text{User-User Relation Modeling}} + \underbrace{\beta tr(H^T L H)}_{\text{User-News Engagement Modeling}} +$$

$$\underbrace{\gamma \|\bar{B}DQ - o\|_2^2}_{\text{News Publisher Partisan Modeling}} + \underbrace{\eta \|D_L P - y_L\|_2^2}_{\text{Fake News Prediction}} +$$

$$\lambda(\|D\|_F^2 + \|V\|_F^2 + \|U\|_F^2 + \|T\|_F^2 + \|P\|_2^2 + \|Q\|_2^2) \text{ s.t. } D, U, V, T \geq 0$$

where the first term models the basic news latent features from news contents: the second and third terms incorporate the user social media engagement relationship: and the fourth term models the publisher-news relationship. The last term incorporates a semi-supervised classifier for news prediction. Therefore, this model provides a principled way to model a tri-relationship for fake news prediction.

B.2.1.5. An Optimization Algorithm

The following discussion provides the detailed optimization process for the framework TriFN according to embodiments of the invention. Note that if embodiments of the invention update the variables jointly, the objective function in Eq. 9 is not convex. Thus, embodiments of the invention use alternating least squares to update the variables separately. For simplicity, embodiments of the invention use L to denote the objective function in Eq. 9. Next, embodiments of the invention introduce the updating rules for each variable in details.

Update D Let $\Psi_D$ be the Lagrange multiplier for constraint $D \geq 0$, the Lagrange function related to D is, $$\min_D \|X - DV^T\|_F^2 + \beta tr(H^T L H) + \quad (10)$$

$$\gamma \|\bar{B}DQ - o\|_2^2 + \eta \|D_L P - y_L\|_2^2 + \lambda \|D\|_F^2 - tr(\Psi_D D^T)$$

Note that $D = [D_L; D_U]$ and $H = [U; D_L]$. Embodiments of the invention rewrite $L = [L_{11}, L_{12}; L_{21}, L_{22}]$, $X = [X_L, X_U]$ and take the partial derivative of $\mathcal{L}$ with respect to $D_L$ and $D_U$ separately, $$\frac{1}{2} \frac{\partial \mathcal{L}}{\partial D_L} = (D_L V^T - X_L) V + \beta L_{21} U + \beta L_{22} D_L + \quad (11)$$

$$\gamma \bar{B}_L^T (\bar{B}_L D_L Q - o) Q^T + \eta (D_L P - y_L) P^T + \lambda D_L - \Psi_D$$

$$\frac{1}{2} \frac{\partial \mathcal{L}}{\partial D_U} = (D_U V^T - X_U) V + \lambda D_U + \gamma \bar{B}_U^T (\bar{B}_U D_U Q - o) Q^T - \Psi_D \quad (12)$$

Thus, the updating derivatives of $\mathcal{L}$ w.r.t. D is, $$\frac{1}{2} \frac{\partial \mathcal{L}}{\partial D} = (DV^T - X)V + \lambda D + \gamma \bar{B}^T (\bar{B}DQ - o) Q^T + \quad (13)$$

$$[\beta L_{21} U + \beta L_{22} D_L + \eta (D_L P - y_L) P^T; 0] - \Psi_D$$

Due to KKT conditions (Boyd and Vandenberghe 2004) $\Psi_D(i,j) D_{ij} = 0$, embodiments of the invention set $$\frac{\partial \mathcal{L}}{\partial D} = 0$$

and have, $$D_{ij} \leftarrow D_{ij} \sqrt{\frac{\hat{D}(i,j)}{\tilde{D}(i,j)}} \quad (14)$$

where $\hat{D}$ and $\tilde{D}$ are defined as follows, $$\hat{D} = XV + \gamma (\bar{B}^T o Q^T)^+ + \gamma (\bar{B}^T \bar{B} DQQ^T)^- + [\eta(D_L PP^T)^- + \eta(y_L P^T)^+ + \beta(L_{21} U)^- + \beta(L_{22} D_L)^-; 0]$$

$$\tilde{D} = DV^T V + \lambda D + \gamma (\bar{B}^T \bar{B} DQQ^T)^+ + \gamma ((\bar{B}^T o Q^T)^- + [\beta(L_{21} U)^+ + \beta(L_{22} D_L)^+ + \eta(D_L PP^T)^+ + \eta(y_L P^T)^-; 0] \quad (15)$$

where for any matrix X, $(X)^+$ and $(X)^-$ denote the positive and negative parts of X, respectively. Specifically, embodiments of the invention have $$(X)^+ = \frac{ABS(X) + X}{2}$$

and $$(X)^- = \frac{ABS(X) - X}{2},$$

ABS(X) is the matrix with the absolute value of elements in X.

Update U, V and T The partial derivative of the Lagrange objective function w.r.t U is as follows, $$\frac{1}{2} \frac{\partial \mathcal{L}}{\partial U} = a(Y \odot (UTU^T - A)) UT^T + \quad (16)$$

$$a(Y \odot (UTU^T - A))^T UT + \lambda U - \Psi_U + \beta(L_{11} U + L_{12} D_L)$$

So the updating rule is as follows, $$U_{ij} \leftarrow U_{ij}\sqrt{\frac{[\hat{U}](i,j)}{[\tilde{U}](i,j)}} \qquad (17)$$

where $\hat{U}$ and $\tilde{U}$ are defined as follows, $$\hat{U}=\alpha(Y\lfloor A)UT^T+\alpha(Y\lfloor A)^TUT+\beta(L_{11}U)^-+\beta(L_{12}D_L)^-$$

$$\tilde{U}=\alpha(Y\lfloor UTU^T)UT^T+\alpha(Y\lfloor UTU^T)^TUT+\Delta U+\beta(L_{11}U)^++\beta(L_{12}D_L)^+ \qquad (18)$$

| Algorithm 1 The optimization process of TriFN framework |
|---|
| Require: X, A, B, W, Y, o, $y_L$, α, β, γ, λ, η |
| Ensure: $y_U$ |
| 1:   Randomly initialize U, V, T, D, P, Q |
| 2:   Precompute Laplacian matrix L |
| 3:   repeat |
| 4:       Update D with Eqn 14 |
| 5:       Update U with Equ 18 |
| 6:       Update V with Eqn 20 |
| 7:       Update T with Eqn 22 |
| 8:       Update P, Q with Eqn 23 |
| 9:   until convergence |
| 10:  Calculate $y_U$ = Sign($D_U P$) |

The partial derivatives of the Lagrange objective w.r.t V is, $$\frac{1}{2}\frac{\partial \mathcal{L}}{\partial V} = (DV^T - X)^T D + \lambda V - \Psi_V \qquad (19)$$

So the updating rule is as follows, $$V_{ij} \leftarrow V_{ij}\sqrt{\frac{[X^T D](i,j)}{[VD^T D + \lambda V](i,j)}} \qquad (20)$$

The partial derivative of the Lagrange objectives w.r.t T is, $$\frac{1}{2}\frac{\partial \mathcal{L}}{\partial T} = \alpha U^T(Y \odot (UTU^T - A))U + \lambda T - \Psi_T \qquad (21)$$

So the updating rule is as follows, $$T_{ij} \leftarrow T_{ij}\sqrt{\frac{[\alpha U^T(Y \odot A)U](i,j)}{[\alpha U^T(Y \odot UTU^T)U + \lambda T](i,j)}} \qquad (22)$$

Update P and Q Optimizing w.r.t P and Q are essentially a least square problem. By setting $$\frac{\partial \mathcal{L}}{\partial P} = 0$$

and $$\frac{\partial \mathcal{L}}{\partial Q} = 0,$$

the closed from solution of P and Q as follows, $$P=(\eta D_L^T D_L+\Delta I)^{-1}\eta D_L^T y_L$$

$$Q=(\gamma D^T B^T BD+\lambda I)^{-1}\gamma D^T B^T o \qquad (23)$$

B.2.1.6. Optimization Algorithm of TriFN

This section presents the details to optimize TriFN in Algorithm 1 according to embodiments of the invention. Embodiments of the invention first randomly initialize U, V, T, D, P, Q in line 1, and construct the Laplacian matrix L in line 2.

Then embodiments repeatedly update related parameters through Line 4 to Line 7 until convergence. Finally, embodiments predict the labels of unlabeled news $y_U$ in line 10. The convergence of Algorithm 1 is guaranteed because the objective function is nonnegative and in each iteration it will monotonically decrease the objective value, and finally it will converge to an optimal point.

The main computation cost comes from the fine-tuning variables for Algorithm 1. In each iteration, the time complexity for computing D is $\mathcal{O}(nd+nld^2+rd+rm+n^2)$. Similarly, the computation cost for V is approximately $\mathcal{O}(tnd)$, for U is $\mathcal{O}(m^4d^3+md)$, for D is about $\mathcal{O}(m^4d^3+m^2d^2)$. To update P and Q, the costs are approximately $\mathcal{O}(d^3+d^2+dr)$ and $\mathcal{O}(d^2 \ln+d^3+dl)$.

B.2.1.7. Experiments

The following discussion presents the experiments to evaluate the effectiveness of the TriFN framework according to embodiments of the invention. Specifically, the following discussion aims to answer the following research questions:

Is TriFN able to improve fake news classification performance by modeling publisher partisanship and user engagements simultaneously?

How effective are publisher partisanship bias modeling and user engagement learning, respectively, in improving the fake news detection performance of TriFN?

How can the method can handle early fake news detection when limited user engagement are provided?

Embodiments of the invention begin by introducing the datasets and experimental settings. Then the performance of TriFN is illustrated, followed by the parameter sensitivity analysis.

B.2.1.7.1. Datasets

Online news can be collected from different sources, such as news agency homepages, search engines, and social media sites. However, manually determining the veracity of news is a challenging task, usually requiring annotations with domain expertise who performs careful analysis of claims and additional evidence, context, and reports from authoritative datasets include. BuzzFeedNews, LIAR, BS Detector, CREDBANK. BuzzFeedNews only contains headlines and text for each news piece. LIAR includes mostly short statements, which may not be fake news because the speakers may not be news publishers. The ground truth labels for BS Detector data are generated from software rather than fact-checking from expert journalists, so any model trained on this data is really learning the parameters of BS Detector. Finally, CREDBANK include social media engagements for specific topics, without specific news pieces and publisher information.

Embodiments of the invention create two comprehensive fake news datasets, which both contain publishers, news contents and social media engagements information. The ground truth labels are collected from journalist experts from websites such as BuzzFeed and the well-recognized fact-checking website PolitiFact. For BuzzFeed news, it comprises a complete news headlines in Facebook. Embodiments of the invention further enrich the data by crawling the news contents of those Facebook web links. The related social media posts are collected from Twitter using API by searching the headlines of news. Similar to the previous setting, embodiments of the invention treat fake news as those news with original annotation as mostly false and mixture of true and false. For PolitiFact, the list of fake news articles is provided and corresponding news content can be crawled as well. Similar techniques can be applied to get related social media posts for PolitiFact.

The publishers' partisanship labels are collected from a well-known media bias fact-checking website such as MBFC. Note that embodiments of the invention balance the number of fake news and true news, so that embodiments of the invention avoid that trivial solution (e.g., classifying all news as the major class labels) to achieve high performance and for fair performance comparison. The details are shown in the table of FIG. 13.

B.2.1.7.2. Experimental Settings

To evaluate the performance of fake news detection algorithms, embodiments of the invention use the following metrics, which are commonly used to evaluate classifiers in related areas:

$$Accuracy = \frac{|TP| + |TN|}{|TP| + |TN| + |FP| + |FN|},$$

$$Precision = \frac{|TP|}{|TP| + |FP|},$$

$$Recall = \frac{|TP|}{|TP| + |FN|}$$

and $$1 = 2 \cdot \frac{Precision - Recall}{Precision + Recall},$$

where TP, FP, TN, FN represent true positive, false positive, true negative and false negative, respectively. Embodiments of the invention compare the framework with several state-of-the-art fake news detection methods, described as follows:

RST: RST extracts news style-based features by combines the vector space model and rhetorical structure theory. The SVM classifier is applied for classification.

LIWC: LIWC is widely used to extract the lexicons falling into psycholinguistic categories. It's based on a large sets of words that represent psycholinguistic processes, summary categories, and part-of-speech categories. This method can capture the deception features from a psychology perspective.

Castillo: This method predicts news veracity using social media engagements. The features are extracted from user profiles and friendship network. To ensure fair comparison, embodiments of the invention also add the credibility score of users inferred in Sec as an additional feature.

RST+Castillo: This method combine features from RST and Castillo. and considers both news contents and user social media engagements.

LIWC+Castillo: This method combine features from LIWC and Castillo. and considers both news contents and user social media engagements.

Note that for fair comparison and demonstration, embodiments of the invention choose baselines that 1) only consider news contents, such as RST, LIWC. TriFNC; 2) only consider social media engagements, such as Castillo: and 3) consider both news content and social media engagements, such as RST+Castillo, LIWC+Castillo. There are different variants of TriFN, i.e., TriFN\S, TriFN\P, TriFN\SP. The number in the brackets are the number of features extracted. Moreover, embodiments of the invention apply other different learning algorithms, such as decision tree, naive Bayes. SVM generally performs the best, so embodiments of the invention use SVM to perform prediction on all baseline methods. The results are reported with 5-fold cross validation. The details are shown in the table in FIG. 14.

B.2.1.7.3. Performance Comparison

In this subsection, embodiments of the invention evaluate the effectiveness of the framework TriFN in terms of fake news classification. The comparison results are shown in the table of FIG. 15. Note that embodiments of the invention determine model parameters with cross-validation strategy, and embodiments of the invention repeat the generating process of training/test set for three times and the average performance is reported. Embodiments of the invention first perform cross validation on parameters $\lambda \in \{0.001, 0.01, 0.1, 1, 10\}$, and choose those parameters that achieves best performance, i.e., $\lambda=0.1$. Embodiments of the invention also choose latent dimension d=10 for easy parameter tuning, and focus on the parameters that contribute the tri-relationship modeling components. The parameters for TriFN are set as $\{\alpha=1e-4, \beta=1e-5, \gamma=1, \eta=1\}$ for BuzzFeed and $\{\alpha=1e-5, \beta=1e-4, \gamma=10, \eta=1\}$ for PolitiFact. The parameter sensitivity analysis will be discussed in the following section. Based on the table in FIG. 15 and the graphs illustrated in FIG. 16, embodiments of the invention make the following observations:

For news content based methods RST and LIWC, it can be seen that LIWC performs better than RST, indicating that LIWC can better capture the deceptiveness in text. The good results of LIWC demonstrate that fake news pieces are very different from real news in terms of choosing words that can reveal psychometrics characteristics.

For methods based on news content and social media engagements (i.e., RST+Castillo, LIWC+Castillo, TriFN\P), it can be seen that TriFN\P performs the best. It indicates the effectiveness of modeling the latent news features and the correlation between user credibility and news veracity. For example, TriFN\P achieves relative improvement of 1.70%, 4.69% on BuzzFeed, and 2.31%, 4.35% on PolitiFact, comparing with LIWC+Castillo in terms of Accuracy and F1 score.

Generally, methods using both news content and social media engagements perform better than those methods purely based on news contents (i.e., RST, LIWC), and those methods only based on social media engagements (i.e., Castillo). This indicates that exploiting both news contents and corresponding social media engagements is important.

Embodiments of the invention consistently outperform the other two baselines that also exploit news contents and social media engagements, in terms of all evaluation metrics on both datasets. For example, TriFN, according to embodiments of the invention, achieves average relative improvement of 9.23%, 8.48% on BuzzFeed and 6.94%, 8.24% on PolitiFact, comparing with LIWC+Castillo in terms of Accuracy and F1 score. It supports the importance of modeling the tri-relationship of publisher-news and news-user engagements to better predict fake news.

B.2.1.7.4. User Engagements and Publisher Partisanship Impact

In the previous section, it was observed that the TriFN framework improves the classification results significantly. In addition to news content, embodiments of the invention also capture social media engagements and publisher partisanship. Now, the effects of these components is investigated by defining the variants of TriFN:

TriFN\P—This embodiment of the invention eliminates the effect of publisher partisanship modeling part $\|y\| \bar{B}DQ-o\|_2^2$ by setting $\gamma=0$.

TriFN\S—This embodiment of the invention eliminates the effects of user social media engagements components $\alpha\|Y\odot(A-UTU^T)H\|_F^2 + \beta tr(H^TLH)$ by setting $\alpha, \beta=0$.

TriFN\PS—This embodiment of the invention eliminates the effects of both publisher partisanship modeling and user social media engagements, by setting $\alpha, \beta, \gamma=0$. The model only considers news content embedding.

The parameters in all the variants are determined with cross-validation and the performance comparison is shown in FIG. 16. The following observations occur:

When embodiments of the invention eliminate the effect of social engagements component, the performance of TriFN\S degrades in comparison with TriFN. For example, the performance reduces 5.2% and 6.1% in terms of F1 and Accuracy metrics on BuzzFeed, 7.6% and 10.6% on PolitiFact. The results suggest that social media engagements in TriFN is important.

Similar observations for TriFN\P are made when one eliminates the effect of publisher partisanship component. The results suggest the importance of considering the publisher partisanship model in TriFN.

When embodiments of the invention eliminate both components in TriFN\PS, the results are further reduced compared to TriFN\S and TriFN\P. It also suggests that these components are complementary to each other.

Through the component analysis of TriFN, it is concluded that (i) both components can contribute to the performance improvement of TriFN; (ii) it is necessary to model both news contents and social media engagements because they contain complementary information.

B.2.1.7.5. Impact of Training Data Size

Figure 17:
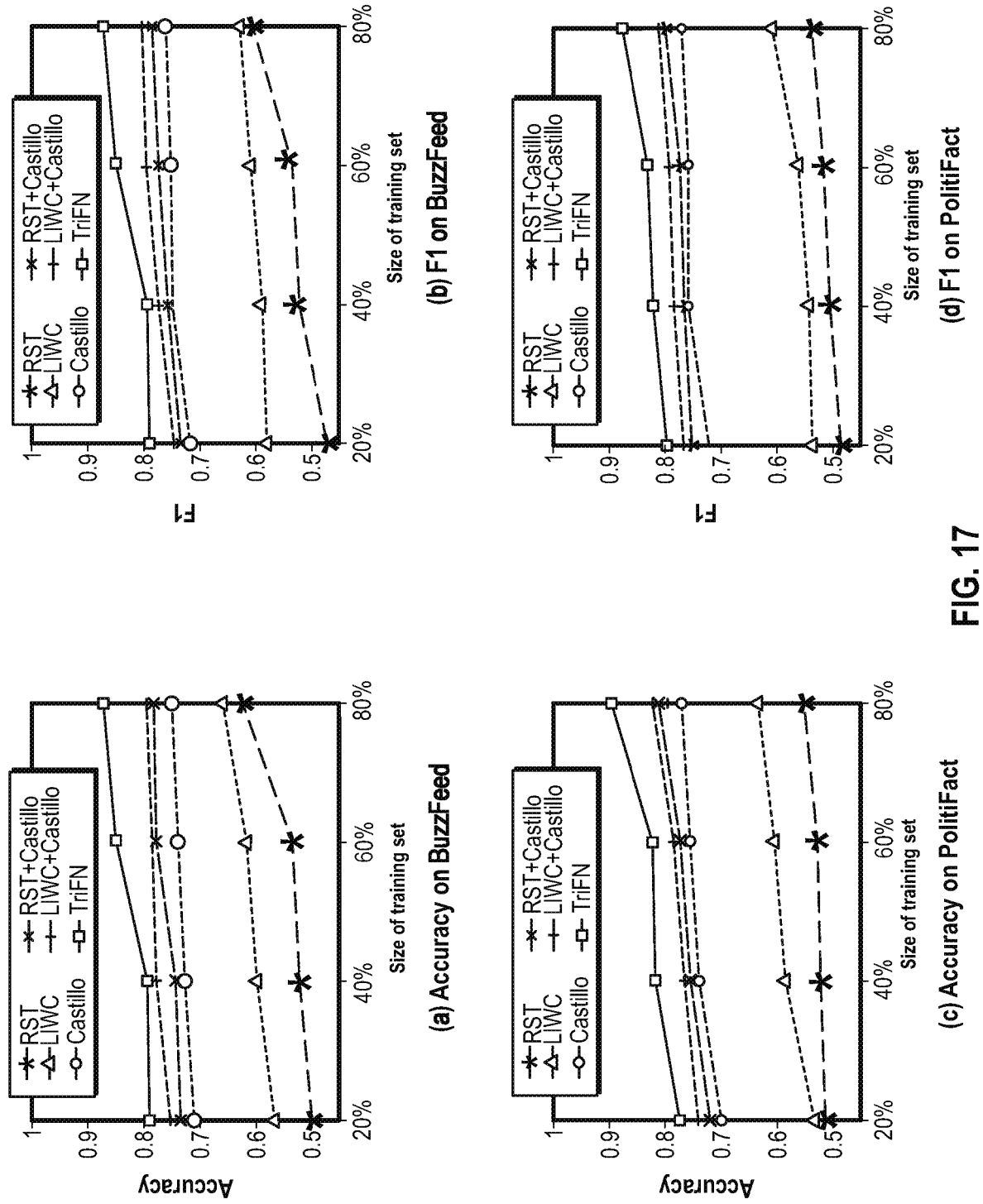
FIG. 17 illustrates a learning curve on websites such as Buzzfeed and Politifact according to embodiments of the invention.

It was further investigated whether larger amounts of training data can improve the identification of fake news. Plots of the learning curves with respect to different training data size, according to embodiments, are shown in FIG. 17. For TriFN, embodiments of the invention fix other parameters as mentioned in the previous section when embodiments of the invention change the training ratio. By plotting these learning curves, it can be seen that 1) generally, the fake news detection performance tends to increase with an increase of training ratio for all compared methods on both datasets; 2) for different training size settings, the TriFN framework consistently outperforms other baseline methods.

B.2.1.7.6. Model Parameter Analysis

Figure 18:
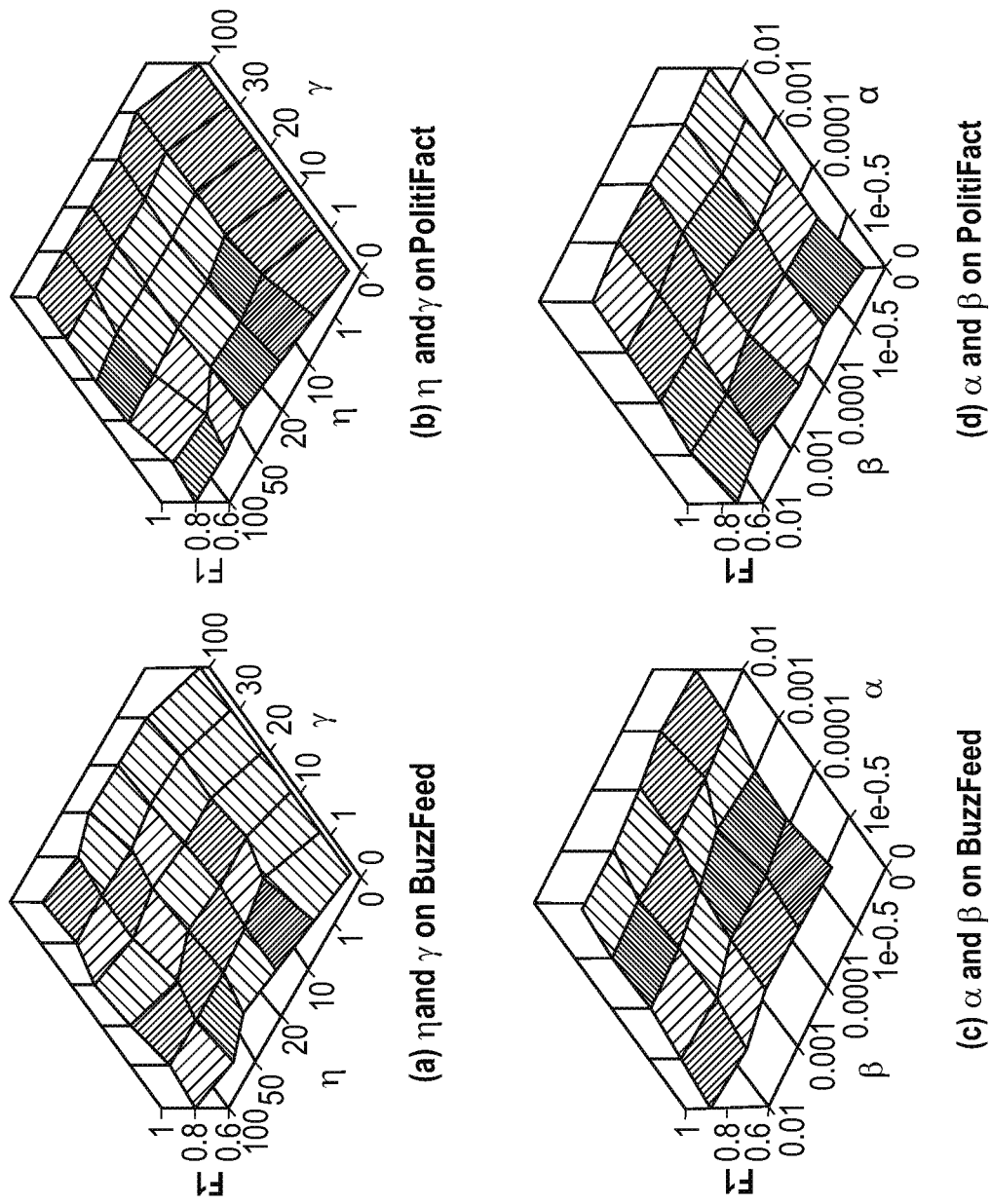
FIG. 18 illustrates a model parameter analysis according to embodiments of the invention.

The TriFN has four important parameters. The first two are $\alpha$ and $\beta$, which control the contributions from social media relationship and user-news engagements, $\gamma$ controls the contribution of publisher partisanship and $\eta$ controls the contribution of semi-supervised classifier. Embodiments of the invention first fix $\{\alpha=1e-4, \beta=1e-5\}$ and $\{\alpha=1e-5, \beta=1e-4\}$ for websites such as BuzzFeed and PolitiFact, respectively. Then embodiments of the invention vary i as $\{1, 10, 20, 50, 100\}$ and $\gamma$ in $\{1, 10, 20, 30, 100\}$. The performance variations are depicted in FIG. 18. It can be seen that i) when $\eta$ increases from 0, eliminating the impact of semi-supervised classification term, to 1, the performance increases dramatically in both datasets. These results support the importance of combining the semi-supervised classifier with feature learning; ii) generally, the increase of $\gamma$ will increase the performance in a certain region, $\gamma \in [1,50]$ and $q \in [1, 50]$ for both datasets. Next, embodiments of the invention fix $\{\gamma=1, \eta=1\}$ and $\{\gamma=10, \eta=1\}$ for BuzzFeed and PolitiFact, respectively. Then embodiments of the invention vary $\alpha, \beta \in [0, 1e-5, 1e-4, 1e-3, 0.001, 0.01]$. It can be seen that i) when $\alpha$ and $\beta$ increase from 0, which eliminate the social media engagements, to 1e-5, the performance increases relatively, which again supports the importance of social media engagements; and ii) the performance tends to increase first and then decrease, and it is relatively stable in [1e-5, 1e-3].

B.2.1.7.7. Early Fake News Detection

Figure 19:
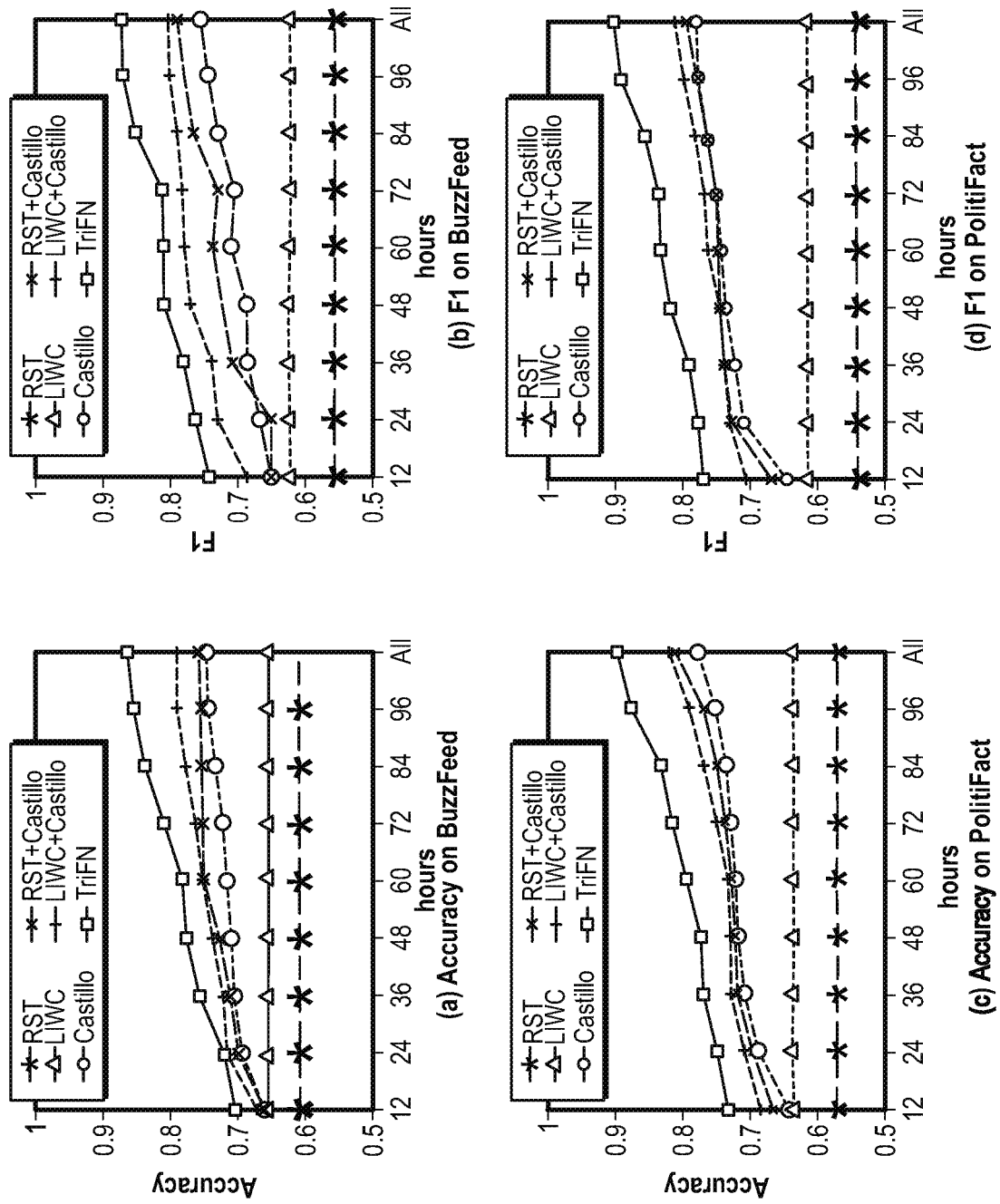
FIG. 19 illustrates the performance of early fake news detection on websites such as BuzzFeed and PolitiFact according to embodiments of the invention.

In a real world scenario, early detection of fake news is very desirable to restrict the dissemination scope of fake news and prevent the future propagation on social media. Early fake news detection aims to give an early alert of fake news, by only considering limited social media engagements within a specific range of time delay of original news posted. Specifically, embodiments of the invention change the delay time in [12, 24, 36, 48, 60, 72, 84, 96] hours. From FIG. 19, it can be seen that: 1) generally, the detection performance gets better when the delay time increases for those methods using social media engagements information, which indicates that more social media engagements on social media provide additional information for fake news detection; 2) TriFN always achieve best performance, which shows the importance of modeling user-user relationships and news-user relationships to capture effective feature representations; and 3) even in the very early stage after fake news has been published, TriFN can already achieve good performance. For example, TriFN can achieve an F1 score of more than 80% within 48 hours on both datasets.

B.3. Detecting Fake News Using User Profiles on Social Media

Figure 40:
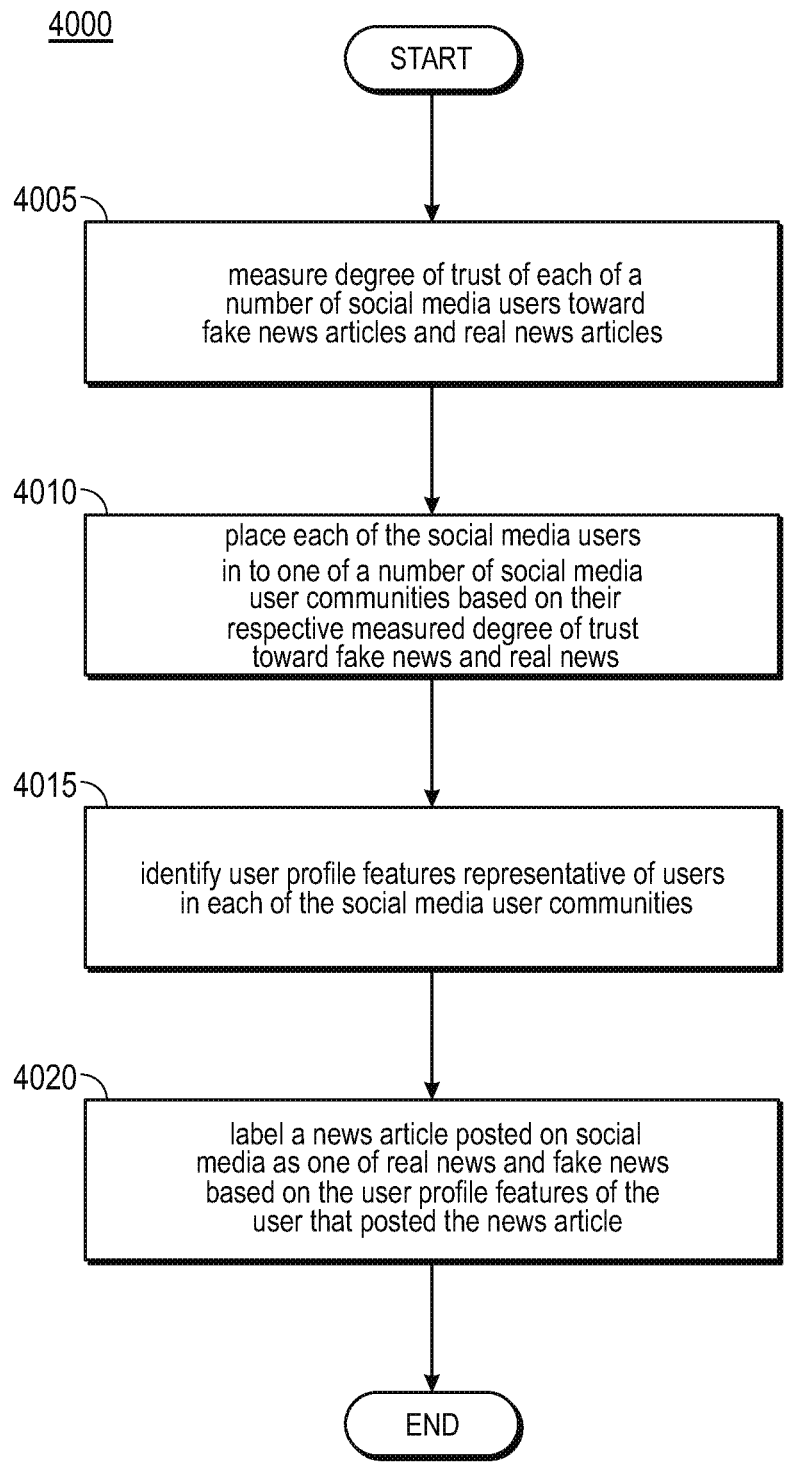
FIG. 40 is a flow chart, according to embodiments of the invention, for detecting fake news.

With reference to FIG. 40, embodiments of the invention 4000, as discussed in further detail below in this section, include logic for detecting fake news, comprising logic 4005 to measure a degree of trust of each of a number of social media users toward fake news articles and real news articles. Logic 4010 then places each of the social media users in to one of a number of social media user communities based on their respective measured degree of trust toward fake news and real news. Logic 4015 next identifies user profile features representative of users in each of the social media user communities. Finally, logic 4020 labels a news article posted on social media as one of real news and fake news based on the user profile features of the user that posted the news article.

According to the embodiment, logic 4005 that measures the degree of trust of each of the social media users toward fake news articles and real news articles includes logic to count the number of fake news articles that the social media user has posted on social media, logic to count the number of real news articles that the social media user has posted on social media, logic to identify each of the social media users as posting one of: only fake news articles, only real news articles, and both fake news articles and real news articles, and logic to measure the degree of trust of each of the social media users toward fake news articles and real news articles based on the number of fake, real, or both fake and real, news articles that the social media user has posted on social media.

According to the embodiment, the logic 4010 that places each of the social media users in to a social media user community based on their respective measured degree of trust toward fake news and real news includes logic to rank each of the users that post only fake news articles, rank each of the users that post only real news articles, rank each of the users that post both fake news articles and real news articles by a fake news to total news posting ratio; and logic to place each of the social media users in an appropriate social media user community based on their ranking.

The logic 4010 that places each of the social media users in to a social media user community based on their ranking comprises logic to place a subset of the social media users that post only fake news articles into a first social media community that is more likely to trust fake news based on the ranking of each of the plurality of users that post only fake news articles, and logic to place a subset of the social media users that post only real news articles into a second social media community that is more likely to trust real news based on the ranking of each of the plurality of users that post only real news articles.

Logic 4015 that identifies user profile features representative of users in each of the social media user communities includes logic that compares differences in user profile features representative of users in the first social media user community compared to users in the second social media community. The logic to compared the differences in user profile features includes logic to identify implicit and explicit user profile features representative of the users in the first social media community, logic to identify implicit and explicit user profile features representative of the users in the second social media community, logic to compare the identified implicit and explicit user profile features representative of the users in the first social media community with the identified implicit and explicit user profile features representative of the users in the second social media community, logic to establish a correlation between users in the first social media user community being more likely to trust fake news based on the comparison, and logic to establish a correlation between users in the second social media user community being more likely to trust real news based on the comparison.

The performance of detecting fake news based only on news content itself is generally not satisfactory. One embodiment of the invention incorporates user social media engagements as auxiliary information to improve fake news detection. The embodiment necessitates an in-depth understanding of the correlation between user profiles on social media and fake news. Embodiments of the invention construct real-world datasets measuring users trust level on fake news and select representative groups of both "experienced" users who are able to recognize fake news items as false and "naive" users who are more likely to believe fake news. Embodiments of the invention perform a comparative analysis over explicit and implicit profile features between these user groups, which reveals their potential to differentiate fake news.

Detecting fake news on social media is quite challenging because it may be written to intentionally mislead users, and attempt to distort truth with different styles while mimicking real news. Therefore, it's generally not satisfactory to detect fake news only from news content by itself, and auxiliary information is needed, such as user engagements on social media. Recent research make efforts to exploit user profiles by simply extracting features without a deep understanding of them, in which these features are like a black-box. Therefore, embodiments of the invention address the challenging problem of understanding user profiles on social media, which lays the foundation of using user profiles for fake news detection. In an attempt to understand the correlation between user profiles and fake news, embodiments of the invention explore the following questions:

Q1 Are some users more likely to trust/distrust fake news?

Q2 If yes to Q1, what are the characteristics of these users that are more likely to trust/distrust fake news and are there clear differences?

By investigating Q1, embodiments of the invention try to determine if user profiles can be used for fake news detection. By answering Q2, embodiments of the invention can further provide guidance on which features of user profiles are useful for fake news detection. To answer these two questions, embodiments of the invention perform extensive statistical analysis on two real-world datasets. Embodiments of the invention consider whether user profiles can be used for fake news detection, which lays the foundation for improving fake news detection with user profiles. Embodiments of the invention further consider which features of user profiles are helpful for fake news detection, which eases the user profile feature construction for fake news detection. Embodiments of the invention provide and experiment with two real-world datasets to consider the discriminative capacity of user profiles features.

Fake news detection methods generally focus on using news content and social media contexts. News content based approaches extract features from linguistic and visual information. Linguistic features aim to capture specific writing styles and sensational headlines that commonly occur in fake news content, such as lexical features and syntactic features. Visual features identify fake images that are intentionally created or capture specific characteristics of images in fake news. Social media context based approaches incorporate features from user profiles, social media post contents and social media networks. User-based features measure users' characteristics and credibility. Post-based features represent users' social media responses such as stances, and topics. Network-based features are extracted by constructing specific networks, such as a diffusion network, a co-occurrence network, and propagation models can be further applied over these features.

Existing approaches exploiting user profiles simply extract features to train classifiers without a deep understanding of these features, which makes this approach a black-box. Embodiments of the invention perform an in-depth investigation on various aspects of user profiles for their usefulness for fake news detection.

Embodiments of the invention that measure user profiles on social media use so-called explicit and implicit profile features. Explicit profile features, which are already provided in raw user metadata, are widely exploited in different tasks on social media, such as information credibility classification, and user identity linkage. Implicit profile features, which are not directly provided, are usually very useful to depict user profiles for specific tasks. Common implicit user features include age, gender, personality, etc. For gender prediction, various text-based features may be used from common explicit profile attributes, and SVM may be used to build a gender predictor. When user names are incorporated as features the method achieves a significant performance increase. Personality inference on social media uses linguistic, structure and LIWC features to predict the Big Five Personality Inventory for shaping users' personalities. An unsupervised personality prediction model using various linguistic features. For age prediction, features are extracted from text posted by users. A further prior art approach predicts gender, personality and/or age simultaneously with open-vocabulary approaches. Embodiments of the invention consider and extract both provided explicit and inferred implicit user profile features, to better capture the different demographics of users.

B.3.1. Assessing Users' Trust Level in News

The following discussion considers Q1 by measuring the degree of trust of users on social media toward fake and real news. First, embodiments of the invention introduce the datasets that contain news and corresponding user engagements. Next, embodiments of the invention identify user communities based on their trust levels in news.

B.3.1.1. Datasets

Embodiments of the invention construct two datasets with news content and social media context information. News content includes the meta-attributes of the news, and social media context includes the related user social media engagements of news items. Determining the ground truth for fake/real news is challenging, usually requiring annotations with domain expertise with careful analysis. Existing datasets contain abundant news content information, but the ground truth information of fake/real news is limited. Embodiments of the invention use the ground truth labels collected from journalist experts from, for example, Buzz-Feed and well recognized fact-checking websites such as PolitiFact. Embodiments of the invention bridge the gap between news content and social media context by enriching the corresponding social media engagements on social media. Embodiments of the invention generate the query using the news headlines and search them via the Twitter API. Embodiments of the invention attempt to sample an equal number of real news and fake news stories to construct a balanced dataset, so that embodiments of the invention can avoid a trivial approach for fake news detection. The details are shown in the table of FIG. 20.

B.3.1.2. Identifying User Groups

Figure 21:
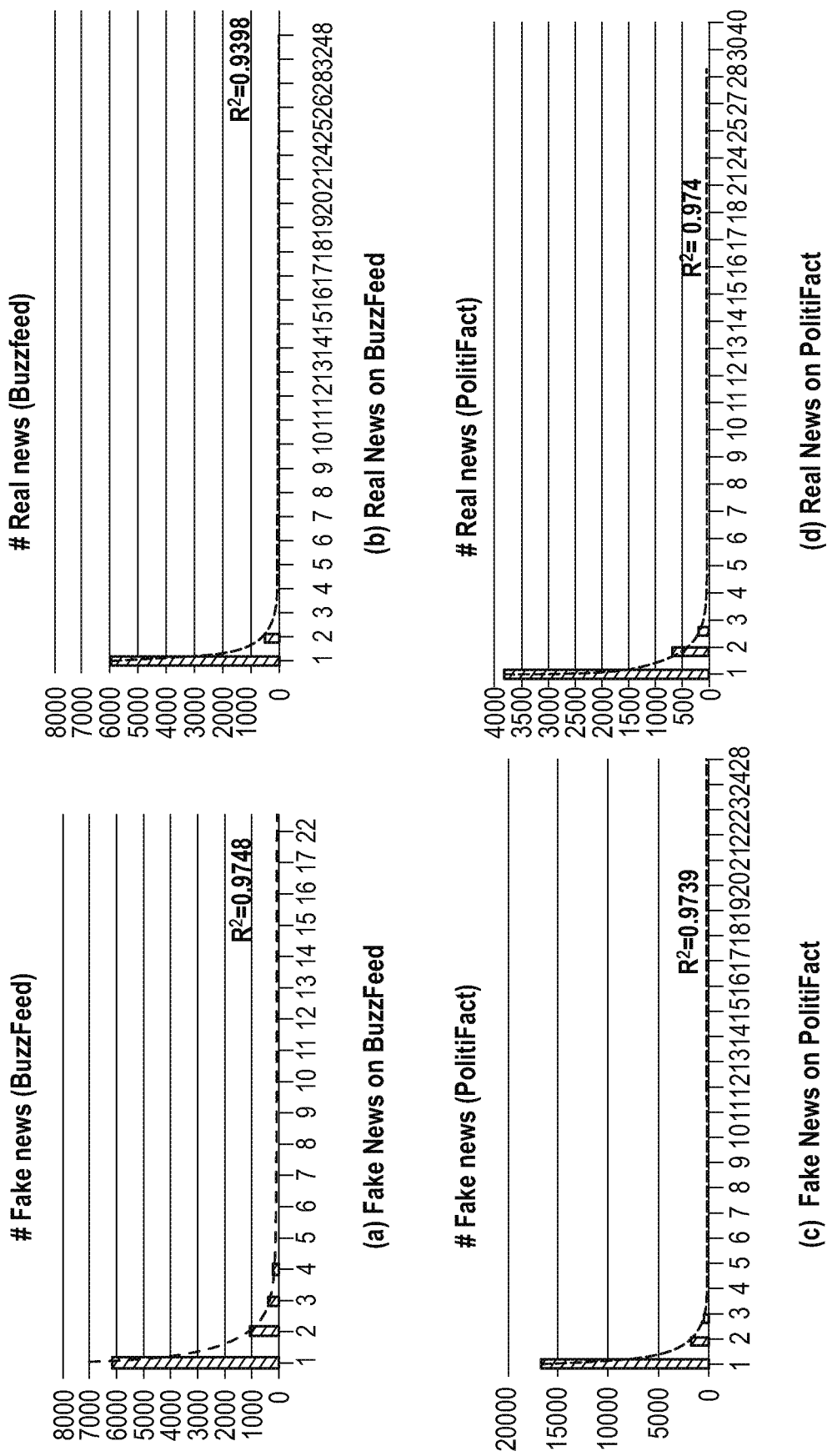
FIG. 21 illustrates a user engaging count distribution according to embodiments of the invention.

Embodiments of the invention investigate Q1 and identify different subset of users that reveal their trust degree in fake and real news. By finding these groups, embodiments of the invention build representative user sets that are more likely to trust fake/real news, from which embodiments of the invention can further compare the degree of the differences of their profiles to find useful profile features. To measure the trust of user $u_i$, embodiments of the invention analyze the user-news interactions, and compute the number of fake (real) news that user $u_i$ has shared, denoted as $n_i^{(f)}(n_i^{(r)})$. Intuitively, embodiments of the invention assume that if users share more fake news among all the users, they have higher trust degree of fake news; if users share more real news among all users, they have higher trust degree to real news. As shown in FIG. 21, embodiments of the invention plot the user count distribution with respect to the number of fake and real news articles they spread. Embodiments of the invention take into consideration the following observations: 1) in general, the majority of users only spread very few news pieces: 2) few users spread many fake or real news pieces: and 3) the distribution can fit in a power distribution with very high R2 scores (0.93) in all cases, which shows that the distribution generally satisfies a power-law distribution with high significance values.

To choose those users that are more likely to trust fake (or real) news, embodiments of the invention select those "long tail" users who share the most absolute number of fake (or real) news according to the distribution, and obtain two set of users $\mathcal{U}(f) \subset \mathcal{U}$ and $\mathcal{U}^{(r)} \subset \mathcal{U}$, where $\mathcal{U}$ is the set of all users. Embodiments of the invention compute $\mathcal{U}^{(r)}=\text{TopK}$ $(n_i^{(r)})$, indicating the top-K users that share the most real news pieces; $\mathcal{U}^{(f)}=\text{TopK}(n_i^{(f)})$ and, indicating the top-K users that share the most fake news pieces.

In addition, as another scenario, even though some users may not share many fake news items among all users, he/she may still share much more fake news than real news in his/her own history. To this end, embodiments of the invention first divide all users into subsets that contains users i) only spread fake news; ii) only spread real news: and iii) spread both fake and real news, as shown in the table of FIG. 22. Then embodiments of the invention use another metric, a fake news to total news posting ratio, named Fake News Ratio (FNR), defined as $$FNR(i) = \frac{n_i^{(f)}}{n_i^{(r)} + n_i^{(f)}},$$

where FNR denotes the FNR score of user $u_i$. The bigger the value, the larger the percentage that fake news items are being shared by user $u_i$. Embodiments of the invention focus on those users that share both fake and real news (see table in FIG. 22), and rank the FNR scores as shown in FIG. 23. Embodiments of the invention set a threshold as 0.5 and if FNR(i)>0.5 (darkest points in FIG. 23), it indicates $u_i$ shares more fake news than real news: if FNR(i)<0.5 (light gray points), it indicates $u_i$ shares more real news than fake news. Thus, embodiments of the invention can enrich $\mathcal{U}^{(f)}$ by adding those users that satisfy FNR(i)<0.5, enrich $\mathcal{U}^{(r)}$ by adding those users having FNR(i)>0.5.

Considering both the absolute number and FNR, embodiments of the invention select Top-K users from those users in "Only Fake" or "Only Real" category by ranking the absolute number, and select additional users in the "Fake & Real" category through FNR scores. Finally, embodiments of the invention empirically select $|\mathcal{U}^{(r)}|=|\mathcal{U}^{(f)}|=1000$ users on BuzzFeed and PolitiFact datasets and $\mathcal{U}^{(r)} \cap \mathcal{U}^{(f)}=\emptyset$. Embodiments of the invention have now obtained users that are more likely to trust fake news $\mathcal{U}^{(f)}$ and real news $\mathcal{U}^{(r)}$, answering question Q1. Note that embodiments of the invention select two subsets $\mathcal{U}^{(f)}$ and $\mathcal{U}^{(r)}$, to ease the analytical process to find discriminate features in next section. The remaining users are ambiguous users that do not reveal clear trust preference on fake/real news in a datasets, which are excluded for the feature discriminate capacity analysis.

B.3.2. Characterizing User Profiles

Embodiments of the invention select $\mathcal{U}^{(f)}$ and $\mathcal{U}^{(r)}$ because users in $\mathcal{U}^{(f)}$ are more likely to trust and share fake news, and those in $\mathcal{U}^{(r)}$ are more likely to share real news. However, to what extent and aspect these users are different is unknown. Thus, embodiments of the invention continue to address Q2, which involves measuring if there are clear differences among $\mathcal{U}^{(f)}$ and $\mathcal{U}^{(r)}$.

To this end, embodiments of the invention collect and analyze user profile features from different aspects, i.e., explicit and implicit. Explicit features are obtained directly from metadata returned by querying social media site API. While implicit features are not directly available but inferred from user meta-information or online behaviors, such as historical tweets. The selected feature sets are by no means the comprehensive list of all possible features. However, embodiments of the invention focus on those explicit features that can be easily accessed and almost available for all public users, and implicit features that are widely used to depict user profiles for better understanding user characteristics for guiding informative features.

B.3.2.1. Explicit Profile Features

Embodiments of the invention first analyze those profile fields in the meta-information that describe a user on social media. A list of representative attributes include:

Profile-Related: The basic user description fields.
Verified: indicating whether it is a verified user;
RegisterTime: the number of days past since the accounted is registered;
Content-Related: The attributes of user activities.
StatusCount: The number of posts;
FavorCount: The number of favorite action the user performs.
Network-Related: The social media networks attributes;
FollowerCount: The number of follower count; and
FollowingCount: The number of following count.

Next, embodiments of the invention compare these fields to demonstrate whether the users in $\mathcal{U}^{(r)}$ and $\mathcal{U}^{(f)}$ have clear differences. If a feature f reveals clear differences between $\mathcal{U}^{(r)}$ and $\mathcal{U}^{(f)}$, then f has the potential usefulness for detecting fake news; otherwise, f may not be useful for fake news detection.

Profile-related features are compared in FIG. 24. Embodiments of the invention rank RegisterTime values of all users in $\mathcal{U}^{(f)}$ and $\mathcal{U}^{(r)}$ and perform two-tail statistical t-test with significant level 0.05 on the corresponding ranking pairs. If the p value is less than significance level (i.e., 0.05), then it exhibit significant difference between $\mathcal{U}^{(r)}$ and $\mathcal{U}^{(f)}$. It can be seen that there are more verified users in $\mathcal{U}^{(r)}$ than $\mathcal{U}^{(f)}$ on BuzzFeed and PolitiFact significantly, which shows that verified users are more likely to trust real news. In addition, the box-and-whisker diagram shows the distribution of user register time exhibit a significant difference between both user groups. The observations on both datasets demonstrate that users registered earlier are more likely to trust fake news, and newer accounts tend to spread more real news.

Figure 26:
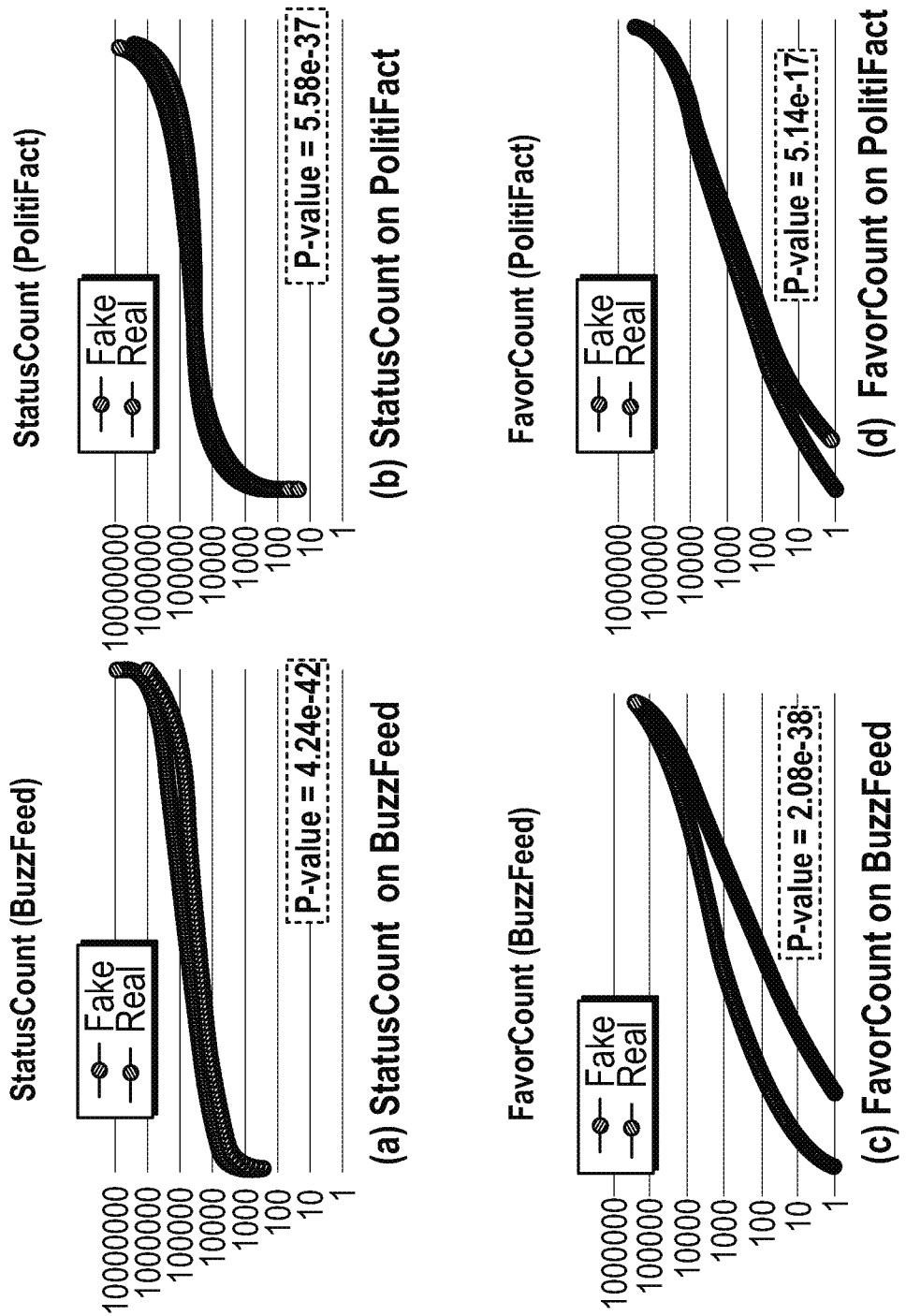
FIG. 26 illustrates a content feature comparison according to embodiments of the invention.

Embodiments of the invention compare content-related profile features in FIG. 26. Similarly, embodiments of the invention rank the StatusCount and FavorCount and perform t-test, and embodiments of the invention provide for the following observations on both datasets; 1) the users in $\mathcal{U}^{(f)}$ generally publish fewer posts that users in $\mathcal{U}^{(r)}$, which indicates those users trusting more real news are more likely to be active and express themselves; and 2) the users in $\mathcal{U}^{(f)}$ tends to express more "favor" actions to tweets posted by other users, indicating their willingness to reach out to other users.

Figure 25:
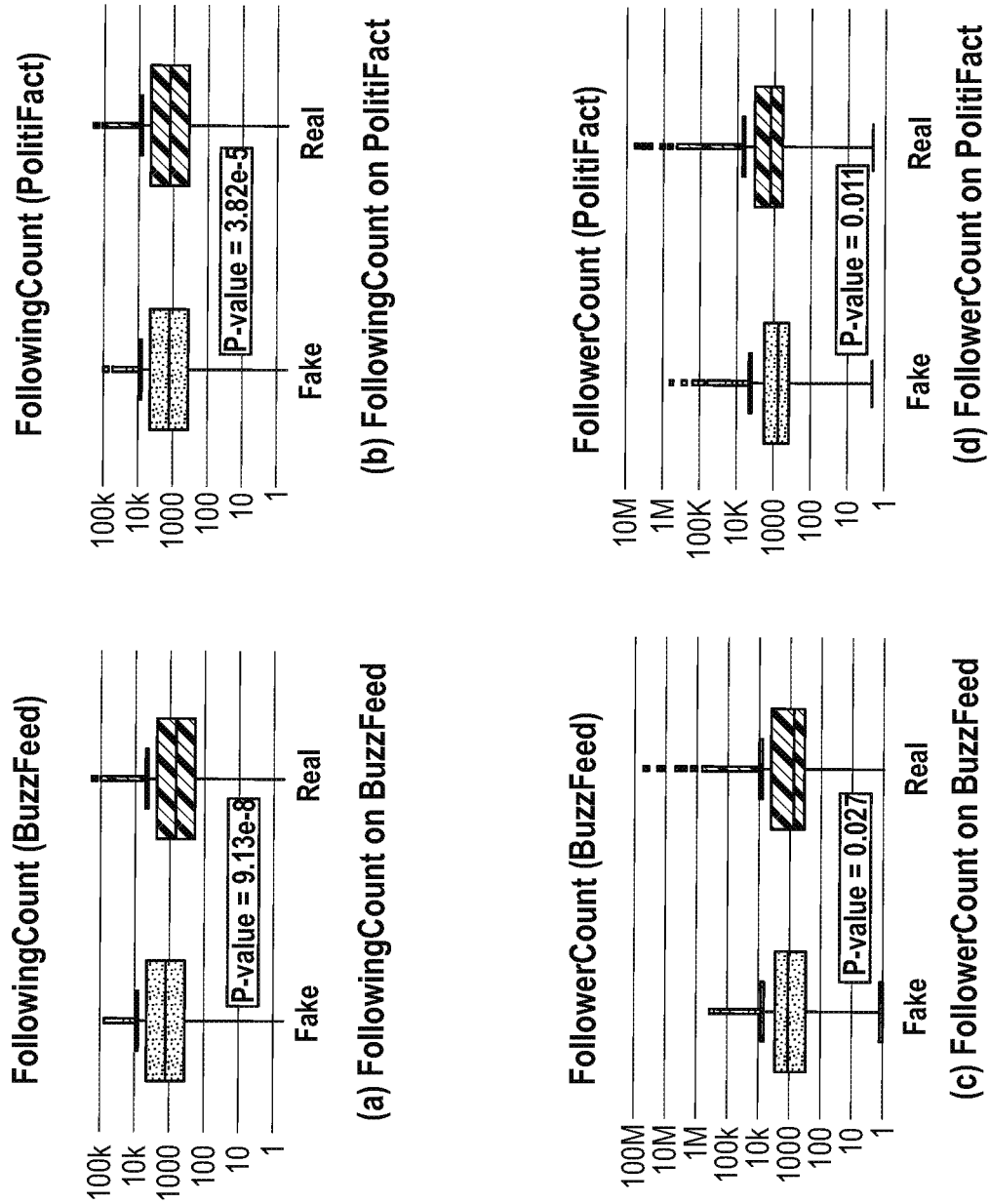
FIG. 25 illustrates a network feature comparison according to embodiments of the invention.
Figure 27:
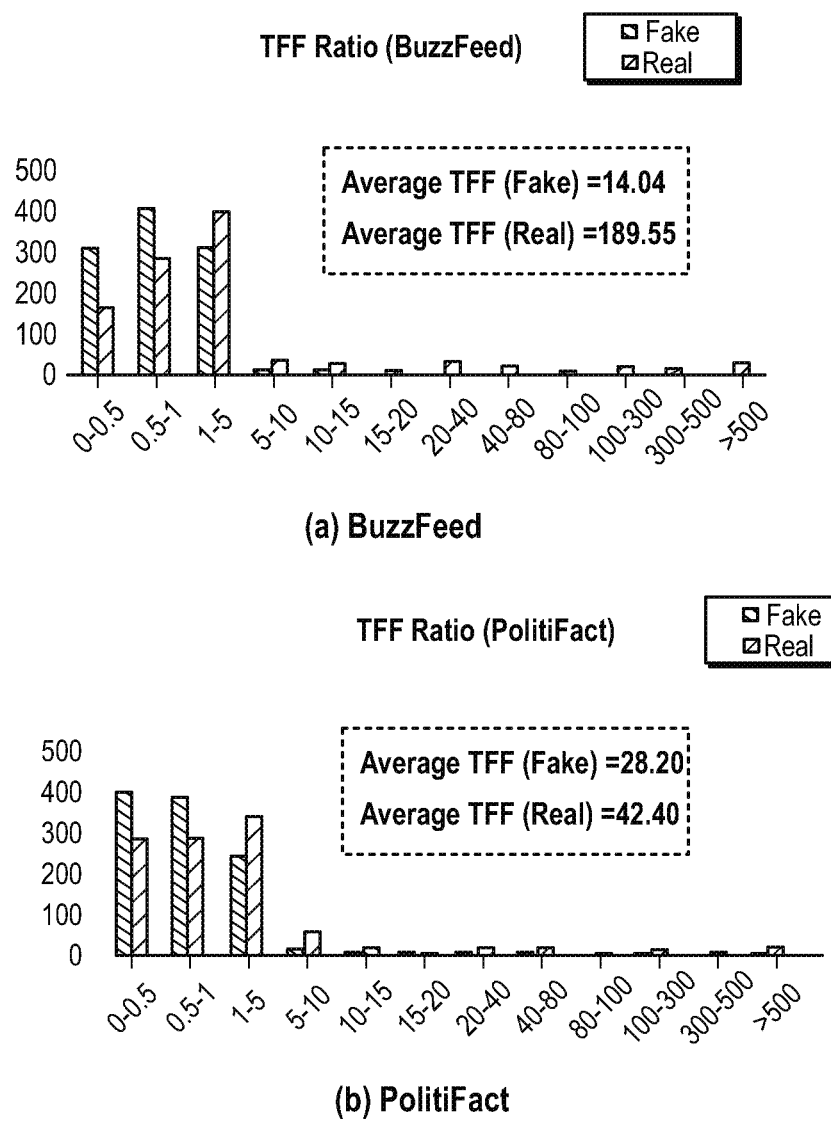
FIG. 27 illustrates a TFF ratio score comparison according to embodiments of the invention.

Embodiments of the invention compare network-related profile features as in FIG. 25 and FIG. 27. From FIG. 25, it can be seen that user in $\mathcal{U}^{(f)}$ have fewer followers and more following counts (as absolute values) from various metrics such as Median, MAX and Mean values on both datasets. To further measure the relative number of following and followers, embodiments of the invention also compute the TFF Ratio, indicating the ratio of follower to following counts 6. The distribution of TFF ratio values is in FIG. 27, which shows that: 1) $\mathcal{U}^{(f)}$ includes more users that with TFF<1, indicating less followers than followings; and 2) $\mathcal{U}^{(r)}$ consistently has more users with TFF>1, indicating users trust real news are more likely to be more popular.

B.3.2.2. Implicit Profile Features

To further investigate the characteristics and $\mathcal{U}^{(f)}$ and $\mathcal{U}^{(r)}$, embodiments of the invention explore several implicit profile features: gender, age, and personality. Embodiments of the invention choose these three features because they are not directly provided with user meta data but they are commonly used to better describe users.

Gender and Age. Studies have shown that gender and age have major impacts on people's psychology and cognition. For example, men and women generally differ markedly in their interests and work preferences. With age gradually change, people typically become less open to experiences but more agreeable and conscientious. Embodiments of the invention answer the questions: 1) are female or male users more likely to trust fake news; and 2) are users in different ages have different abilities to differentiate fake news?

To this end, embodiments of the invention infer the gender and age of users using existing state-of-the-art approach. The idea is to build a linear regression model with the collected predictive lexica (with words and weights). Embodiments of the invention utilize the recent post Tweets as the corpus to extract relevant words in the lexica. The results are shown as in FIGS. 28 and 29:

Generally, the predicted ages are slightly bigger for users in $\mathcal{U}^{(f)}$ than those in $\mathcal{U}^{(r)}$. It shows older people are more likely to trust fake news.

More male users than female users on social media are engaging in news consumption. In addition, the ratio of male to female is higher among those users in $\mathcal{U}^{(r)}$, which indicates female users are more likely to trust fake news than male users.

Personality. Personality refers to the traits and characteristics that make an individual different from others. Following traditional setting, embodiments of the invention draw on the popular Five Factor Model (or "Big Five"), which classifies personality traits into five dimensions: Extraversion (e.g., outgoing, talkative, active), Agreeableness (e.g., trusting, kind, generous), Conscientiousness (e.g., self-controlled, responsible, thorough), Neuroticism (e.g., anxious, depressive, touchy), and Openness (e.g., intellectual, artistic, insightful). Embodiments of the invention work toward answering the following question: do personalities clearly exist between users that are more likely to trust fake news and those more likely to trust real news?

To predict users' personalities while no ground truth available, embodiments of the invention apply an unsupervised personality prediction tool named Pear, a pre-trained model using the recent tweets posted by users. It is one of the state-of-the-art unsupervised text-based personality prediction model. As shown in FIG. 30, it can be seen that on both datasets: 1) the users tend to have relatively high Extraversion and Openness, and low Neuroticism scores, indicating more outgoing and intellectual, and less calm for personality; and 2) users in $\mathcal{U}^{(r)}$ tends to have higher Extraversion and Agreeableness scores than those in $\mathcal{U}^{(f)}$, indicating that users are extrovert and friendly are more likely to trust real news.

In sum, it is concluded that users in $\mathcal{U}^{(f)}$ and $\mathcal{U}^{(r)}$ reveal different feature distributions in most explicit and implicit feature fields, answering Q2.

C. Visualizing Fake News

Embodiments of the invention provide a web-based visualization for analyzing the collected dataset as well as visualizing the features of the dataset. Embodiments visualize the trends of fake news, e.g., fake tweets versus real tweets over time from the dataset. Word cloud visualization allows for seeing the topics of fake news and real news. Verified users visualization allows for comparing how verified and unverified users spread fake news. A social media network explorer enables visualizing the social media network of users who spread fake news and real news. A geolocation tab allows for identifying the geographical distribution of the users who spread fake news and real news. Also, the user interface (UI) allows one to compare the effectiveness of the features used for the model. All the features mentioned above may be combined in an embodiment to provide a complete end-to-end system for collecting, detecting, and visualizing fake news.

Figure 31:
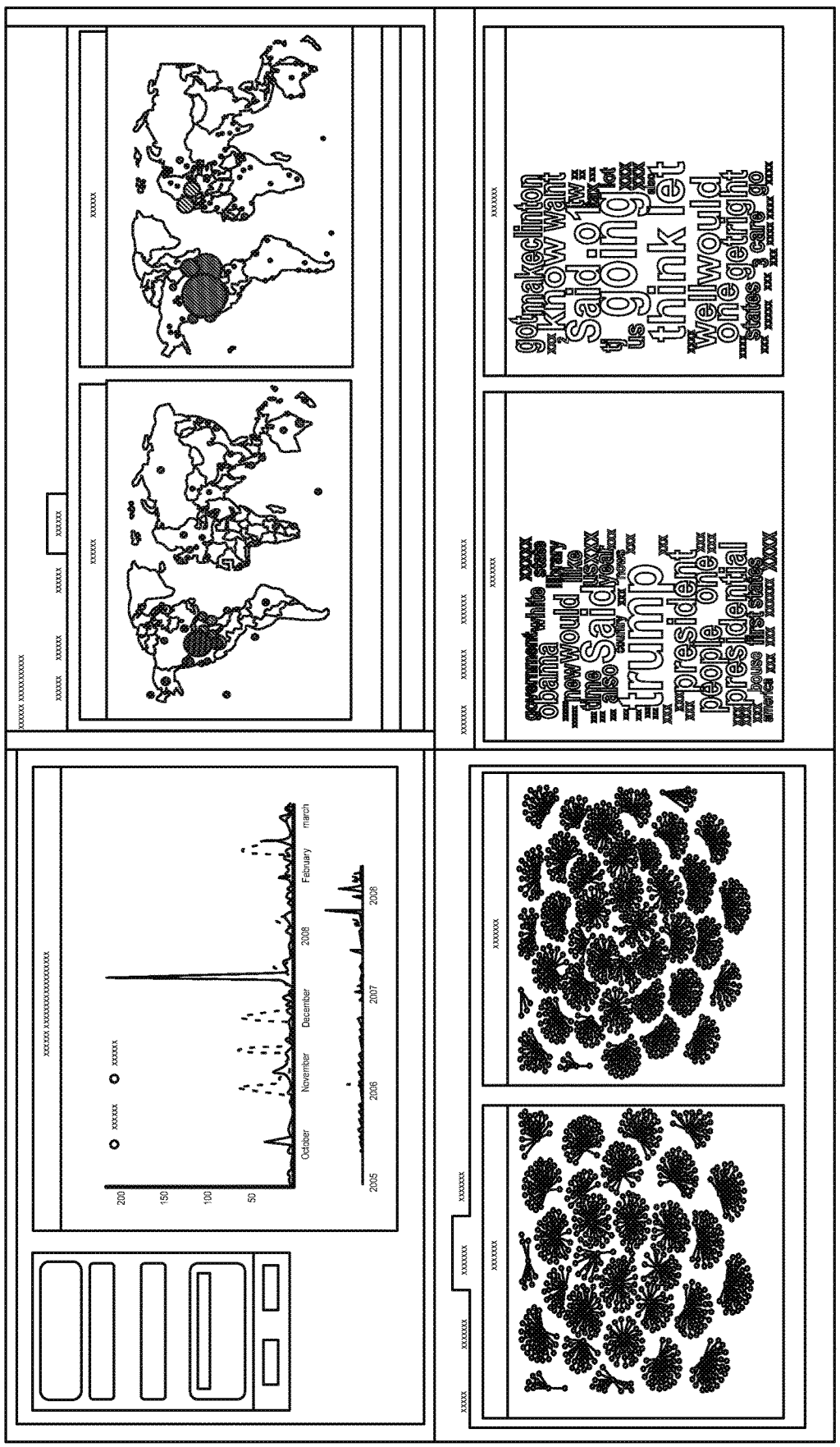
FIG. 31 illustrates a fake news tracking visualization user interface according to embodiments of the invention.
Figure 32:
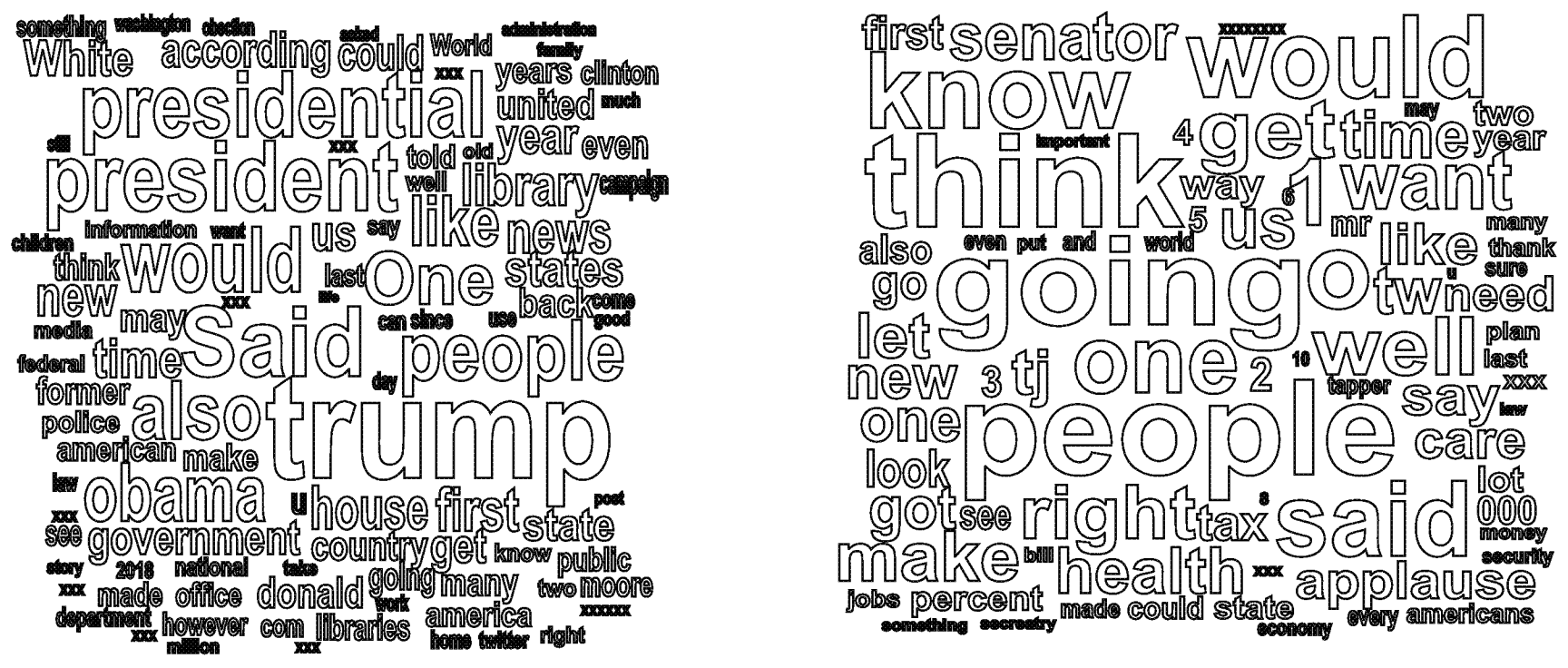

Embodiments of the invention provide for fake news visualization as shown in FIG. 31 to develop insights on the data. Embodiments of the invention provide various interfaces for visualizing the data from a dataset. For identifying the differences in the news content of the true news and the fake news, embodiments of the invention use a word cloud representation of the words for the textual data, as illustrated in FIG. 32. With reference to FIG. 31, embodiments of the invention search for fake news within a time frame and identify the relevant data. Also, embodiments of the invention provide the comparison of feature significance and model performance as part of the dashboard.

Using geo-located fake tweets as shown in FIG. 33, embodiments of the invention identify how fake news is spread around certain areas of United States as the news pieces collected were mostly related to US politics. Using the network of the users as shown in FIG. 34, embodiments of the invention visualize the social media network to identify the differences between the users who interact with the fake news and the true news. Using these visualizations, embodiments of the invention see differences between the user characteristics such as the social media network and geolocation.

II. Illustrative Computing Environment in Accordance with Certain Embodiments

Figure 35:
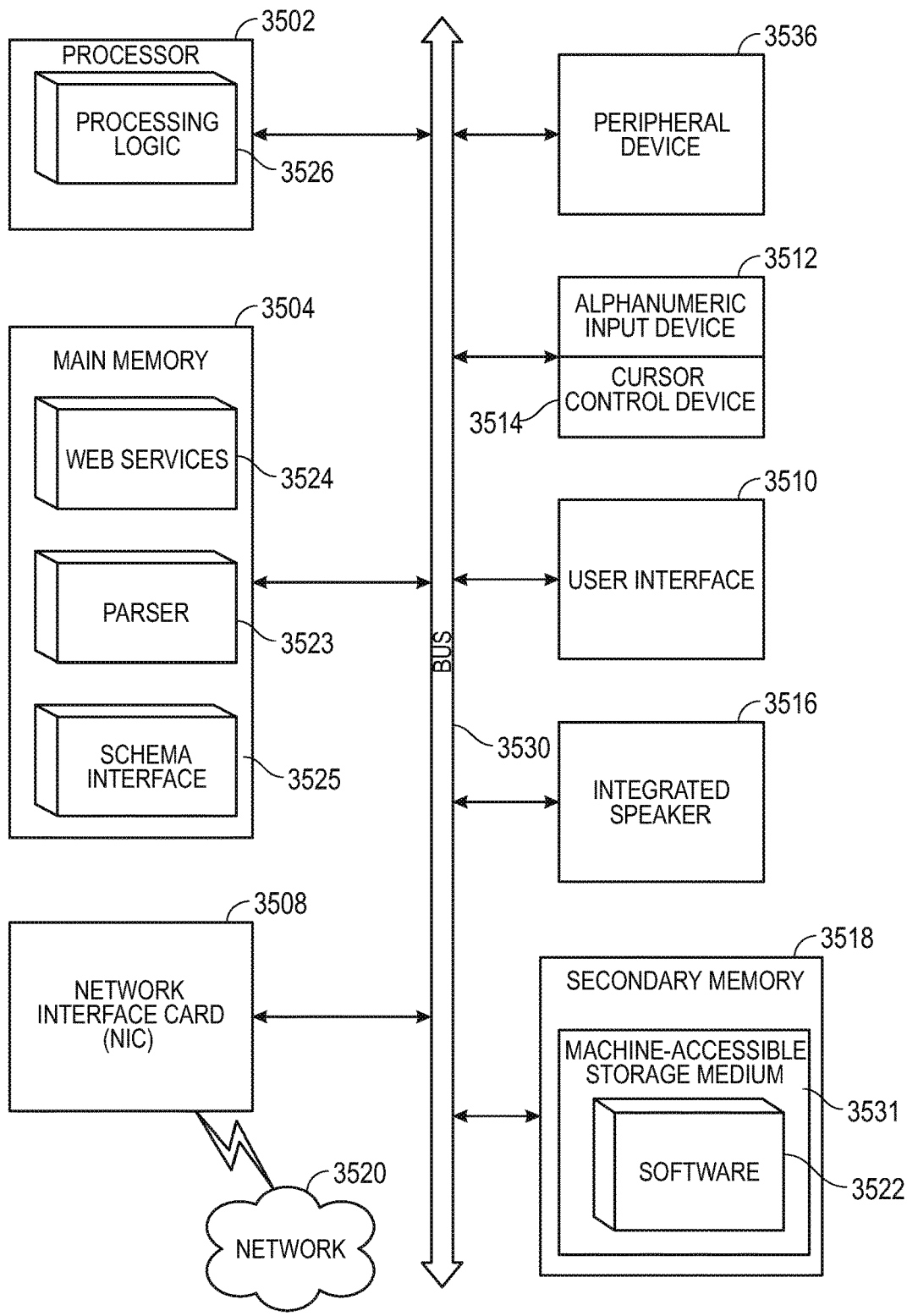
FIG. 35 illustrates a diagrammatic representation of a machine 3500 in the exemplary form of a computer system, in accordance with one embodiment, within which a set of instructions, for causing the machine 3500 to perform any one or more of the methodologies discussed herein, may be executed.

FIG. 35 illustrates a diagrammatic representation of a machine 3500 in the exemplary form of a computer system, in accordance with one embodiment, within which a set of instructions, for causing the machine 3500 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 3500 includes a processor 3502, a main memory 3504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 3518, which communicate with each other via a bus 3530. Main memory 3504 includes information and instructions and software program components necessary for performing and executing the functions with respect to the various embodiments of the systems, methods for implementing embodiments of the invention described herein. Instructions may be stored within main memory 3504. Main memory 3504 and its sub-elements are operable in conjunction with processing logic 3526 and/or software 3522 and processor 3502 to perform the methodologies discussed herein.

Processor 3502 represents one or more devices such as a microprocessor, central processing unit, or the like. More particularly, the processor 3502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 3502 may also be one or more devices such as an application specific integrated circuit (ASIC), a field programmable gate array (FPGA), a digital signal processor (DSP), network processor, or the like. Processor 3502 is configured to execute the processing logic 3526 for performing the operations and functionality which are discussed herein.

The computer system 3500 may further include one or more network interface cards 3508 to interface with the computer system 3500 with one or more networks 3520. The computer system 3500 also may include a user interface 3510 (such as a video display unit, a liquid crystal display (LCD), or a cathode ray tube (CRT)), an alphanumeric input device 3512 (e.g., a keyboard), a cursor control device 3514 (e.g., a mouse), and a signal generation device 3516 (e.g., an integrated speaker). The computer system 3500 may further include peripheral device 3536 (e.g., wireless or wired communication devices, memory devices, storage devices, audio processing devices, video processing devices, etc.).

The secondary memory 3518 may include a non-transitory machine-readable storage medium (or more specifically a non-transitory machine-accessible storage medium) 3531 on which is stored one or more sets of instructions (e.g., software 3522) embodying any one or more of the methodologies or functions described herein. Software 3522 may also reside, or alternatively reside within main memory 3504, and may further reside completely or at least partially within the processor 3502 during execution thereof by the computer system 3500, the main memory 3504 and the processor 3502 also constituting machine-readable storage media. The software 3522 may further be transmitted or received over a network 3520 via the network interface card 3508.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method comprising:
   transmitting a query over a network to a search Application Programming Interface (search API) provided by a social media platform;
   determining, in response to the query, a count of a quantity of articles posted by each of a plurality of social media users toward articles based on information lacking a high degree of evidential basis and articles based on information having a high degree of evidential basis;
   classifying each of the plurality of social media users into one of a plurality of social media user communities based on their respective count of the quantity of articles posted by each social media user toward information lacking a high degree of evidential basis and information having a high degree of evidential basis;
   identifying user profile features representative of users in each of the plurality of social media user communities;
   configuring an auto-encoder of a fake news detection model using sequence-to-sequence learning to encode the articles by providing as input to the auto-encoder, each word of a respective article and a latest hidden state of a Long Short-Term Memory (LSTM) neural network providing a latent representation of the LSTM neural network;
   configuring a decoder of the fake news detection model to generate an attempted reconstruction of the respective article using as input to the decoder, the latent representation of the LSTM neural network;
   detecting, by the decoder of the fake news detection model, the respective article posted on social media is either (i) one with information having a high degree of evidential basis or alternatively, (ii) one with information lacking a high degree of evidential basis based on a combination of the user profile features of the user that posted the respective article and the latent representation provided as input to the LSTM neural network;
   calculating a credibility score for a subset of the social media users on the basis of user-adjacency and utilizing only the subset of the social media users having directly posted the respective news article or having reposted the respective article without adding comments;
   clustering, by the fake news detection model, each of the subset of the social media users into clusters according to the user-adjacency of each of the respective ones of the subset of the social media users having user profile features having sharing similarities with others within the subset of the social media users;
   weighting, by the fake news detection model, each of the clusters according to cluster size, wherein the social media users within larger clusters correspond to a higher credibility score and wherein the social media users within smaller clusters correspond to a lower credibility score; and
   outputting, by the fake news detection model, a classification for the respective article as either (i) the respective article as one with information having a high degree of evidential basis or alternatively, (ii) the respective article as one with information lacking a high degree of evidential basis according to the credibility score calculated for the social media user having posted the respective article to social media.

2. The method of claim 1, further comprising:
   counting the number of articles based on information lacking a high degree of evidential basis that each respective social media user has posted on social media;
   counting the number of articles based on information having a high degree of evidential basis that each respective social media user has posted on social media;
   identifying each of the plurality of social media users as posting one of: only articles based on information lacking a high degree of evidential basis, only articles based on information having a high degree of evidential basis, and both articles based on information lacking a high degree of evidential basis and articles based on information having a high degree of evidential basis; and classifying, by the fake news detection model, each of the plurality of social media users based on (i) the number of articles posted by each respective social media user based on information lacking a high degree of evidential basis or (ii) the number of articles posted based on information having a high degree of evidential basis, or (iii) based on both.

3. The method of claim 1, further comprising:
ranking each of the plurality of social media users that post only articles based on information lacking a high degree of evidential basis;
ranking each of the plurality of social media users that post only articles based on information having a high degree of evidential basis;
ranking each of the plurality of social media users that post both articles based on information lacking a high degree of evidential basis and articles based on information having a high degree of evidential basis according to a ratio of information lacking a high degree of evidential basis to a total number of news postings; and
placing each of the plurality of social media users into one of the plurality of social media user communities based on their ranking.

4. The method of claim 3, further comprising:
placing a first subset of the plurality of social media users into a first social media community;
placing a second subset of the plurality of social media users into a second social media community; and
ranking the first social media community higher than the second social media community;
wherein the first social media community is formed from any of the plurality of social media users which post only articles based on information lacking a high degree of evidential basis; and
wherein the second social media community is formed from any of the plurality of social media users which post only articles based on information having a high degree of evidential basis.

5. The method of claim 4, further comprising:
comparing differences in user profile features representative of users in the first social media user community compared to users in the second social media community.

6. The method of claim 5, further comprising:
identifying implicit and explicit user profile features representative of the users in the first social media community;
identifying implicit and explicit user profile features representative of the users in the second social media community;
comparing the identified implicit and explicit user profile features representative of the users in the first social media community with the identified implicit and explicit user profile features representative of the users in the second social media community;
establishing a correlation between users in the first social media user community being more likely to trust information lacking a high degree of evidential basis based on the comparison; and establishing a correlation between users in the second social media user community being more likely to trust information having a high degree of evidential basis based on the comparison.

7. Non-transitory computer readable storage media having instructions stored thereon that, when executed, configure processing circuitry to:
transmit a query over a network to a search Application Programming Interface (search API) provided by a social media platform;
determine, in response to the query, a count of a quantity of articles posted by each of a plurality of social media users toward articles based on information lacking a high degree of evidential basis and articles based on information having a high degree of evidential basis;
classify each of the plurality of social media users into one of a plurality of social media user communities based on their respective count of the quantity of articles posted by each social media user toward information lacking a high degree of evidential basis and information having a high degree of evidential basis;
identify user profile features representative of users in each of the plurality of social media user communities;
configuring an auto-encoder of a fake news detection model using sequence-to-sequence learning to encode the articles by providing as input to the auto-encoder, each word of a respective article and a latest hidden state of a Long Short-Term Memory (LSTM) neural network providing a latent representation of the LSTM neural network;
configuring a decoder of the fake news detection model to generate an attempted reconstruction of the respective article using as input to the decoder, the latent representation of the LSTM neural network;
detect, by the decoder of the fake news detection model, the respective article posted on social media is either (i) one with information having a high degree of evidential basis or alternatively, (ii) one with information lacking a high degree of evidential basis based on a combination of the user profile features of the user that posted the respective article and the latent representation provided as input to the LSTM neural network;
calculate a credibility score for a subset of the social media users on the basis of user-adjacency and utilizing only the subset of the social media users having directly posted the respective article or having reposted the respective article without adding comments;
cluster, by the fake news detection model, each of the subset of the social media users into clusters according to the user-adjacency of each of the respective ones of the subset of the social media users having user profile features having sharing similarities with others within the subset of the social media users;
weight, by the fake news detection model, each of the clusters according to cluster size, wherein the social media users within larger clusters correspond to a higher credibility score and wherein the social media users within smaller clusters correspond to a lower credibility score; and
output, by the fake news detection model, a classification for the respective article as either (i) the respective article as one with information having a high degree of evidential basis or alternatively, (ii) the respective article as one with information lacking a high degree of evidential basis according to the credibility score calculated for the social media user having posted the respective article to social media.

8. The non-transitory computer-readable storage media of claim 7, wherein the instructions configure the processing circuitry to:
- count the number of articles based on information lacking a high degree of evidential basis that each respective social media user has posted on social media;
- count the number of articles based on information having a high degree of evidential basis that each respective social media user has posted on social media;
- identify each of the plurality of social media users as posting one of: only articles based on information lacking a high degree of evidential basis, only articles based on information having a high degree of evidential basis, and both articles based on information lacking a high degree of evidential basis and articles based on information having a high degree of evidential basis; and
- classify, by the fake news detection model, each of the plurality of social media users based on (i) the number of articles posted by each respective social media user based on information lacking a high degree of evidential basis or (ii) the number of articles posted based on information having a high degree of evidential basis, or (iii) based on both.

9. The non-transitory computer-readable storage media of claim 8,
- wherein the instructions configure the processing circuitry to:
- rank each of the plurality of social media users that post only articles based on information lacking a high degree of evidential basis;
- rank each of the plurality of social media users that post only articles based on information having a high degree of evidential basis;
- rank each of the plurality of social media users that post both articles based on information lacking a high degree of evidential basis and articles based on information having a high degree of evidential basis according to a ratio of information lacking a high degree of evidential basis to a total number of news postings; and
- place each of the plurality of social media users into one of the plurality of social media user communities based on their ranking.

10. The non-transitory computer-readable storage media of claim 9, wherein the instructions configure the processing circuitry to:
- place a first subset of the plurality of social media users into a first social media community;
- place a second subset of the plurality of social media users into a second social media community; and
- rank the first social media community higher than the second social media community;
- wherein the first social media community is formed from any of the plurality of social media users which post only articles based on information lacking a high degree of evidential basis; and
- wherein the second social media community is formed from any of the plurality of social media users which post only articles based on information having a high degree of evidential basis.

11. The non-transitory computer-readable storage media of claim 10, wherein the instructions configure the processing circuitry to:
- compare differences in user profile features representative of users in the first social media user community compared to users in the second social media community.

12. The non-transitory computer-readable storage media of claim 11, wherein the instructions configure the processing circuitry to:
- identify implicit and explicit user profile features representative of the users in the first social media community;
- identify implicit and explicit user profile features representative of the users in the second social media community;
- compare the identified implicit and explicit user profile features representative of the users in the first social media community with the identified implicit and explicit user profile features representative of the users in the second social media community;
- establish a correlation between users in the first social media user community being more likely to trust information lacking a high degree of evidential basis based on the comparison; and
- establish a correlation between users in the second social media user community being more likely to trust information having a high degree of evidential basis based on the comparison.

13. A system comprising:
- processing circuitry; and
- non-transitory computer readable media storing instructions;
- wherein the instructions, when executed by the processing circuitry, configure the processing circuitry to:
- transmit a query over a network to a search Application Programming Interface (search API) provided by a social media platform;
- determine, in response to the query, a count of a quantity of articles posted by each of a plurality of social media users toward articles based on information lacking a high degree of evidential basis and articles based on information having a high degree of evidential basis;
- classify each of the plurality of social media users into one of a plurality of social media user communities based on their respective count of the quantity of articles posted by each social media user toward information lacking a high degree of evidential basis and information having a high degree of evidential basis;
- identify user profile features representative of users in each of the plurality of social media user communities;
- configuring an auto-encoder of a fake news detection model using sequence-to-sequence learning to encode the articles by providing as input to the auto-encoder, each word of a respective article and a latest hidden state of a Long Short-Term Memory (LSTM) neural network providing a latent representation of the LSTM neural network;
- configuring a decoder of the fake news detection model to generate an attempted reconstruction of the respective article using as input to the decoder, the latent representation of the LSTM neural network;
- detect, by the decoder of the fake news detection model, the respective article posted on social media is either (i) one with information having a high degree of evidential basis or alternatively, (ii) one with information lacking a high degree of evidential basis based on a combination of the user profile features of the user that posted the respective article and the latent representation provided as input to the LSTM neural network;
- calculate a credibility score for a subset of the social media users on the basis of user-adjacency and utilizing only the subset of the social media users having directly posted the respective article or having reposted the respective news article without adding comments;

cluster, by the fake news detection model, each of the subset of the social media users into clusters according to the user-adjacency of each of the respective ones of the subset of the social media users having user profile features having sharing similarities with others within the subset of the social media users;

weight, by the fake news detection model, each of the clusters according to cluster size, wherein the social media users within larger clusters correspond to a higher credibility score and wherein the social media users within smaller clusters correspond to a lower credibility score; and output, by the fake news detection model, a classification for the respective article as either (i) the respective article as one with information having a high degree of evidential basis or alternatively, (ii) the respective article as one with information lacking a high degree of evidential basis according to the credibility score calculated for the social media user having posted the respective article to social media.

14. The system of claim 13, wherein the instructions configure the processing circuitry to:

count the number of articles based on information lacking a high degree of evidential basis that each respective social media user has posted on social media;

count the number of articles based on information having a high degree of evidential basis that each respective social media user has posted on social media;

identify each of the plurality of social media users as posting one of: only articles based on information lacking a high degree of evidential basis, only articles based on information having a high degree of evidential basis, and both articles based on information lacking a high degree of evidential basis and articles based on information having a high degree of evidential basis; and classify, by the fake news detection model, each of the plurality of social media users based on (i) the number of articles posted by each respective social media user based on information lacking a high degree of evidential basis or (ii) the number of articles posted based on information having a high degree of evidential basis, or (iii) based on both.

15. The system of claim 14, wherein the instructions configure the processing circuitry to:

rank each of the plurality of social media users that post only articles based on information lacking a high degree of evidential basis;

rank each of the plurality of social media users that post only articles based on information having a high degree of evidential basis;

rank each of the plurality of social media users that post both articles based on information lacking a high degree of evidential basis and articles based on information having a high degree of evidential basis according to a ratio of information lacking a high degree of evidential basis to a total number of news postings; and place each of the plurality of social media users into one of the plurality of social media user communities based on their ranking.

16. The system of claim 15, wherein the instructions configure the processing circuitry to:

place a first subset of the plurality of social media users into a first social media community;

place a second subset of the plurality of social media users into a second social media community; and rank the first social media community higher than the second social media community;

wherein the first social media community is formed from any of the plurality of social media users which post only articles based on information lacking a high degree of evidential basis; and wherein the second social media community is formed from any of the plurality of social media users which post only articles based on information having a high degree of evidential basis.

17. The system of claim 16, wherein the instructions configure the processing circuitry to:

compare differences in user profile features representative of users in the first social media user community compared to users in the second social media community.

18. The system of claim 17, wherein the instructions configure the processing circuitry to:

identify implicit and explicit user profile features representative of the users in the first social media community;

identify implicit and explicit user profile features representative of the users in the second social media community;

compare the identified implicit and explicit user profile features representative of the users in the first social media community with the identified implicit and explicit user profile features representative of the users in the second social media community;

establish a correlation between users in the first social media user community being more likely to trust information lacking a high degree of evidential basis based on the comparison; and establish a correlation between users in the second social media user community being more likely to trust information having a high degree of evidential basis based on the comparison.

* * * * *

UNITED STATES PATENT AND TRADEMARK OFFICE
CERTIFICATE OF CORRECTION

| | | |
|---|---|---|
| PATENT NO. | : 12,141,878 B2 | Page 1 of 1 |
| APPLICATION NO. | : 17/267765 | |
| DATED | : November 12, 2024 | |
| INVENTOR(S) | : Kai Shu, Deepak Mahudeswaran and Huan Liu | |

It is certified that error appears in the above-identified patent and that said Letters Patent is hereby corrected as shown below:

On the Title Page

Item (73) Assignee, Please change "None" to --Arizona Board of Regents on behalf of Arizona State University, Scottsdale, AZ (US)--.

Signed and Sealed this
Twenty-eighth Day of October, 2025

John A. Squires
*Director of the United States Patent and Trademark Office*